(12) United States Patent
Vollbracht et al.

(10) Patent No.: US 12,500,350 B2
(45) Date of Patent: *Dec. 16, 2025

(54) DIELECTRIC LOADED WAVEGUIDE FOR LOW LOSS SIGNAL DISTRIBUTIONS AND SMALL FORM FACTOR ANTENNAS

(71) Applicant: Aptiv Technologies AG, Schaffhausen (CH)

(72) Inventors: Dennis Vollbracht, Hilden (DE); Sachit Varma, Duisburg (DE)

(73) Assignee: Aptiv Technologies AG, Schaffhausen (CH)

( * ) Notice: Subject to any disclaimer, the term of this patent is extended or adjusted under 35 U.S.C. 154(b) by 22 days.

This patent is subject to a terminal disclaimer.

(21) Appl. No.: 18/780,049

(22) Filed: Jul. 22, 2024

(65) Prior Publication Data

US 2024/0380124 A1    Nov. 14, 2024

Related U.S. Application Data

(63) Continuation of application No. 17/661,398, filed on Apr. 29, 2022, now Pat. No. 12,046,818.

(Continued)

(51) Int. Cl.
*H01Q 21/00* (2006.01)
*G01S 13/931* (2020.01)
(Continued)

(52) U.S. Cl.
CPC ......... *H01Q 21/005* (2013.01); *G01S 13/931* (2013.01); *H01Q 1/3233* (2013.01); *H01Q 1/525* (2013.01); *H01Q 21/068* (2013.01)

(58) Field of Classification Search
CPC .. H01Q 21/005; H01Q 21/064; H01Q 21/068; H01Q 21/0037; H01Q 21/0043;
(Continued)

(56) References Cited

U.S. PATENT DOCUMENTS 2,840,818 A    6/1958   Reed et al.
3,462,713 A    8/1969   Knerr
(Continued)

FOREIGN PATENT DOCUMENTS

CA    2654470 A1    12/2007
CN    1620738 A     5/2005
(Continued)

OTHER PUBLICATIONS

"Extended European Search Report", EP Application No. 22170487.7, Sep. 8, 2022, 11 pages.

(Continued)

*Primary Examiner* — Robert Karacsony
(74) *Attorney, Agent, or Firm* — Harness, Dickey & Pierce, P.L.C.

(57) ABSTRACT

This document describes radiation channels filled with a dielectric using a surface with a pattern of radiation elements to allow electromagnetic energy to enter or escape the dielectric. An absorption channel is paired with the radiation channel. The absorption channel is loaded with an absorber material to allow for a transfer of electromagnetic energy between the radiation channels and the respective absorption channel. A surface of each of the absorption channels has a pattern of absorbing elements that allows the electromagnetic energy that enters or exits the dielectric to be absorbed by the absorber material.

7 Claims, 20 Drawing Sheets

Related U.S. Application Data

(60) Provisional application No. 63/182,726, filed on Apr. 30, 2021.

(51) Int. Cl.
*H01Q 1/32* (2006.01)
*H01Q 1/52* (2006.01)
*H01Q 21/06* (2006.01)

(58) Field of Classification Search
CPC .......... H01Q 21/0068; H01Q 21/0087; H01Q 1/3233; H01Q 1/36; H01Q 1/525; H01P 3/16; H01P 3/121; G01S 13/931
See application file for complete search history.

(56) References Cited

U.S. PATENT DOCUMENTS

| | | |
|---|---|---|
| 3,579,149 A | 5/1971 | Ramsey |
| 4,157,516 A | 6/1979 | van de Grijp |
| 4,453,142 A | 6/1984 | Murphy |
| 4,562,416 A | 12/1985 | Sedivec |
| 5,065,123 A | 11/1991 | Heckaman et al. |
| 5,350,499 A | 9/1994 | Shibaike et al. |
| 5,414,394 A | 5/1995 | Gamand et al. |
| 5,637,521 A | 6/1997 | Rhodes et al. |
| 5,923,225 A | 7/1999 | De Los Santos |
| 5,929,728 A | 7/1999 | Barnett et al. |
| 5,982,250 A | 11/1999 | Hung et al. |
| 5,982,256 A | 11/1999 | Uchimura et al. |
| 5,986,527 A | 11/1999 | Ishikawa et al. |
| 6,064,350 A | 5/2000 | Uchimura et al. |
| 6,072,375 A | 6/2000 | Adkins et al. |
| 6,127,901 A | 10/2000 | Lynch |
| 6,414,573 B1 | 7/2002 | Swineford et al. |
| 6,489,855 B1 | 12/2002 | Kitamori et al. |
| 6,535,083 B1 | 3/2003 | Hageman et al. |
| 6,622,370 B1 | 9/2003 | Sherman et al. |
| 6,658,233 B1 | 12/2003 | Ikeda |
| 6,788,918 B2 | 9/2004 | Saitoh et al. |
| 6,794,950 B2 | 9/2004 | du Toit et al. |
| 6,859,114 B2 | 2/2005 | Eleftheriades et al. |
| 6,867,660 B2 | 3/2005 | Kitamori et al. |
| 6,958,662 B1 | 10/2005 | Salmela et al. |
| 6,995,726 B1 | 2/2006 | West et al. |
| 7,142,165 B2 | 11/2006 | Sanchez et al. |
| 7,276,988 B2 | 10/2007 | Stoneham |
| 7,420,442 B1 | 9/2008 | Forman |
| 7,439,822 B2 | 10/2008 | Shimura et al. |
| 7,495,532 B2 | 2/2009 | McKinzie, III |
| 7,626,476 B2 | 12/2009 | Kim et al. |
| 7,659,799 B2 | 2/2010 | Jun et al. |
| 7,886,434 B1 | 2/2011 | Forman |
| 7,973,616 B2 | 7/2011 | Shijo et al. |
| 7,994,879 B2 | 8/2011 | Kim et al. |
| 8,013,694 B2 | 9/2011 | Hiramatsu et al. |
| 8,089,327 B2 | 1/2012 | Margomenos et al. |
| 8,159,316 B2 | 4/2012 | Miyazato et al. |
| 8,395,552 B2 | 3/2013 | Geiler et al. |
| 8,451,175 B2 | 5/2013 | Gummalla et al. |
| 8,451,189 B1 | 5/2013 | Fluhler |
| 8,680,936 B2 | 3/2014 | Purden et al. |
| 8,692,731 B2 | 4/2014 | Lee et al. |
| 8,717,124 B2 | 5/2014 | Vanhille et al. |
| 8,803,638 B2 | 8/2014 | Kildal |
| 8,948,562 B2 | 2/2015 | Norris et al. |
| 9,007,269 B2 | 4/2015 | Lee et al. |
| 9,203,155 B2 | 12/2015 | Choi et al. |
| 9,246,204 B1 | 1/2016 | Kabakian |
| 9,258,884 B2 | 2/2016 | Saito |
| 9,356,238 B2 | 5/2016 | Norris et al. |
| 9,450,281 B2 | 9/2016 | Kim |
| 9,647,313 B2 | 5/2017 | Marconi et al. |
| 9,653,773 B2 | 5/2017 | Ferrari et al. |
| 9,673,532 B2 | 6/2017 | Cheng et al. |
| 9,806,393 B2 | 10/2017 | Kildal et al. |
| 9,813,042 B2 | 11/2017 | Xue et al. |
| 9,843,301 B1 | 12/2017 | Rodgers et al. |
| 9,935,065 B1 | 4/2018 | Baheti et al. |
| 9,947,981 B1 | 4/2018 | Strassner, II et al. |
| 9,991,606 B2 | 6/2018 | Kirino et al. |
| 9,997,842 B2 | 6/2018 | Kirino et al. |
| 10,027,032 B2 | 7/2018 | Kirino et al. |
| 10,042,045 B2 | 8/2018 | Kirino et al. |
| 10,090,600 B2 | 10/2018 | Kirino et al. |
| 10,114,067 B2 | 10/2018 | Lam et al. |
| 10,153,533 B2 | 12/2018 | Kirino |
| 10,158,158 B2 | 12/2018 | Kirino et al. |
| 10,164,318 B2 | 12/2018 | Seok et al. |
| 10,164,344 B2 | 12/2018 | Kirino et al. |
| 10,218,078 B2 | 2/2019 | Kirino et al. |
| 10,230,173 B2 | 3/2019 | Kirino et al. |
| 10,263,310 B2 | 4/2019 | Kildal et al. |
| 10,312,596 B2 | 6/2019 | Gregoire |
| 10,320,083 B2 | 6/2019 | Kirino et al. |
| 10,333,227 B2 | 6/2019 | Kirino et al. |
| 10,374,323 B2 | 8/2019 | Kamo et al. |
| 10,381,317 B2 | 8/2019 | Maaskant et al. |
| 10,381,741 B2 | 8/2019 | Kirino et al. |
| 10,439,298 B2 | 10/2019 | Kirino et al. |
| 10,468,736 B2 | 11/2019 | Mangaiahgari |
| 10,505,282 B2 | 12/2019 | Lilja |
| 10,534,061 B2 | 1/2020 | Vassilev et al. |
| 10,559,889 B2 | 2/2020 | Kirino et al. |
| 10,594,045 B2 | 3/2020 | Kirino et al. |
| 10,601,144 B2 | 3/2020 | Kamo et al. |
| 10,608,345 B2 | 3/2020 | Kirino et al. |
| 10,622,696 B2 | 4/2020 | Kamo et al. |
| 10,627,502 B2 | 4/2020 | Kirino et al. |
| 10,651,138 B2 | 5/2020 | Kirino et al. |
| 10,651,567 B2 | 5/2020 | Kamo et al. |
| 10,658,760 B2 | 5/2020 | Kamo et al. |
| 10,670,810 B2 | 6/2020 | Sakr et al. |
| 10,705,294 B2 | 7/2020 | Guerber et al. |
| 10,707,584 B2 | 7/2020 | Kirino et al. |
| 10,714,802 B2 | 7/2020 | Kirino et al. |
| 10,727,561 B2 | 7/2020 | Kirino et al. |
| 10,727,611 B2 | 7/2020 | Kirino et al. |
| 10,763,590 B2 | 9/2020 | Kirino et al. |
| 10,763,591 B2 | 9/2020 | Kirino et al. |
| 10,775,573 B1 | 9/2020 | Hsu et al. |
| 10,811,373 B2 | 10/2020 | Zaman et al. |
| 10,826,147 B2 | 11/2020 | Sikina et al. |
| 10,833,382 B2 | 11/2020 | Sysouphat |
| 10,833,385 B2 | 11/2020 | Mangaiahgari |
| 10,892,536 B2 | 1/2021 | Fan et al. |
| 10,957,971 B2 | 3/2021 | Doyle et al. |
| 10,957,988 B2 | 3/2021 | Kirino et al. |
| 10,971,824 B2 | 4/2021 | Baumgartner et al. |
| 10,983,194 B1 | 4/2021 | Patel et al. |
| 10,985,434 B2 | 4/2021 | Wagner et al. |
| 10,992,056 B2 | 4/2021 | Kamo et al. |
| 11,061,110 B2 | 7/2021 | Kamo et al. |
| 11,088,432 B2 | 8/2021 | Seok et al. |
| 11,088,464 B2 | 8/2021 | Sato et al. |
| 11,114,733 B2 | 9/2021 | Doyle et al. |
| 11,121,475 B2 | 9/2021 | Yang et al. |
| 11,169,325 B2 | 11/2021 | Guerber et al. |
| 11,171,399 B2 | 11/2021 | Alexanian et al. |
| 11,196,171 B2 | 12/2021 | Doyle et al. |
| 11,201,414 B2 | 12/2021 | Doyle et al. |
| 11,249,011 B2 | 2/2022 | Challener |
| 11,283,162 B2 | 3/2022 | Doyle et al. |
| 11,289,787 B2 | 3/2022 | Yang |
| 11,349,183 B2 | 5/2022 | Rahiminejad et al. |
| 11,349,220 B2 | 5/2022 | Alexanian et al. |
| 11,378,683 B2 | 7/2022 | Alexanian et al. |
| 11,411,292 B2 | 8/2022 | Kirino |
| 11,495,811 B2 | 11/2022 | Yoshitomi |
| 11,563,259 B2 | 1/2023 | Alexanian et al. |
| 11,611,138 B2 | 3/2023 | Ogawa et al. |
| 11,616,306 B2 | 3/2023 | Brandenburg et al. |
| 11,626,652 B2 | 4/2023 | Vilenskiy et al. |
| 12,046,818 B2 * | 7/2024 | Vollbracht ........... H01Q 1/3233 |

(56) References Cited

U.S. PATENT DOCUMENTS

| | | |
|---|---|---|
| 2002/0021197 A1 | 2/2002 | Elco |
| 2004/0069984 A1 | 4/2004 | Estes et al. |
| 2006/0113598 A1 | 6/2006 | Chen et al. |
| 2006/0145777 A1 | 7/2006 | Mueller |
| 2008/0129409 A1 | 6/2008 | Nagaishi et al. |
| 2008/0150821 A1 | 6/2008 | Koch et al. |
| 2009/0040132 A1 | 2/2009 | Sridhar et al. |
| 2009/0207090 A1 | 8/2009 | Pettus et al. |
| 2009/0243762 A1 | 10/2009 | Chen et al. |
| 2010/0193935 A1 | 8/2010 | Lachner et al. |
| 2011/0140810 A1 | 6/2011 | Leiba et al. |
| 2011/0140979 A1 | 6/2011 | Dayan et al. |
| 2012/0013421 A1 | 1/2012 | Hayata |
| 2012/0050125 A1 | 3/2012 | Leiba et al. |
| 2012/0068316 A1 | 3/2012 | Ligander |
| 2012/0163811 A1 | 6/2012 | Doany et al. |
| 2012/0242421 A1 | 9/2012 | Robin et al. |
| 2012/0256707 A1 | 10/2012 | Leiba et al. |
| 2012/0256796 A1 | 10/2012 | Leiba |
| 2013/0057358 A1 | 3/2013 | Anthony et al. |
| 2013/0256849 A1 | 10/2013 | Danny et al. |
| 2014/0015709 A1 | 1/2014 | Shijo et al. |
| 2014/0048310 A1 | 2/2014 | Montevirgen et al. |
| 2014/0091884 A1 | 4/2014 | Flatters |
| 2014/0106684 A1 | 4/2014 | Burns et al. |
| 2015/0097633 A1 | 4/2015 | DeVries et al. |
| 2015/0229017 A1 | 8/2015 | Suzuki et al. |
| 2015/0295297 A1 | 10/2015 | Cook et al. |
| 2015/0357698 A1 | 12/2015 | Kushta |
| 2015/0364804 A1 | 12/2015 | Tong et al. |
| 2015/0364830 A1 | 12/2015 | Tong et al. |
| 2016/0043455 A1 | 2/2016 | Seler et al. |
| 2016/0049714 A1 | 2/2016 | Ligander et al. |
| 2016/0056541 A1 | 2/2016 | Tageman et al. |
| 2016/0111764 A1 | 4/2016 | Kim |
| 2016/0118705 A1 | 4/2016 | Tang et al. |
| 2016/0204495 A1 | 7/2016 | Takeda et al. |
| 2016/0276727 A1 | 9/2016 | Dang et al. |
| 2016/0293557 A1 | 10/2016 | Topak et al. |
| 2016/0301125 A1 | 10/2016 | Kim et al. |
| 2017/0084554 A1 | 3/2017 | Dogiamis et al. |
| 2017/0099705 A1 | 4/2017 | Mazzon |
| 2017/0324135 A1 | 11/2017 | Blech et al. |
| 2018/0131084 A1 | 5/2018 | Park et al. |
| 2018/0226709 A1 | 8/2018 | Mangaiahgari |
| 2018/0226727 A1 | 8/2018 | Sato |
| 2018/0233465 A1 | 8/2018 | Spella et al. |
| 2018/0284186 A1 | 10/2018 | Chadha et al. |
| 2018/0301816 A1 | 10/2018 | Kamo et al. |
| 2018/0343711 A1 | 11/2018 | Wixforth et al. |
| 2018/0351261 A1 | 12/2018 | Kamo et al. |
| 2018/0375185 A1 | 12/2018 | Kirino et al. |
| 2019/0006743 A1 | 1/2019 | Kirino et al. |
| 2019/0013563 A1 | 1/2019 | Takeda et al. |
| 2019/0194452 A1 | 6/2019 | Schrauwen |
| 2019/0207286 A1 | 7/2019 | Moallem |
| 2020/0021001 A1 | 1/2020 | Mangaiahgari |
| 2020/0153108 A1 | 5/2020 | Uemichi |
| 2020/0220273 A1 | 7/2020 | Ahmadloo |
| 2020/0235453 A1 | 7/2020 | Lang |
| 2020/0287293 A1 | 9/2020 | Shi et al. |
| 2020/0343612 A1 | 10/2020 | Shi |
| 2020/0412012 A1 | 12/2020 | Zhao et al. |
| 2021/0028549 A1 | 1/2021 | Doyle et al. |
| 2021/0036393 A1 | 2/2021 | Mangaiahgari |
| 2021/0159577 A1 | 5/2021 | Carlred et al. |
| 2021/0305667 A1 | 9/2021 | Bencivenni |
| 2021/0367352 A1 | 11/2021 | Izadian et al. |
| 2022/0094071 A1 | 3/2022 | Doyle et al. |
| 2022/0109246 A1 | 4/2022 | Emanuelsson et al. |
| 2023/0253717 A1* | 8/2023 | Petersson ............... H01Q 13/10 343/702 |

FOREIGN PATENT DOCUMENTS

| | | |
|---|---|---|
| CN | 1682404 A | 10/2005 |
| CN | 2796131 Y | 7/2006 |
| CN | 201383535 Y | 1/2010 |
| CN | 102696145 A | 9/2012 |
| CN | 103515682 A | 1/2014 |
| CN | 104900956 A | 9/2015 |
| CN | 105098295 A | 11/2015 |
| CN | 105609909 A | 5/2016 |
| CN | 105680133 A | 6/2016 |
| CN | 105958167 A | 9/2016 |
| CN | 106711616 A | 5/2017 |
| CN | 106785424 A | 5/2017 |
| CN | 109716861 A | 5/2019 |
| CN | 109750201 A | 5/2019 |
| CN | 209389219 U | 9/2019 |
| DE | 4241635 A1 | 6/1994 |
| DE | 102016213202 A1 | 1/2018 |
| DE | 102019200893 A1 | 7/2020 |
| EP | 2500978 A1 | 9/2012 |
| EP | 2843758 A1 | 3/2015 |
| EP | 2945222 A1 | 11/2015 |
| EP | 3460903 A1 | 3/2019 |
| GB | 2489950 A | 10/2012 |
| JP | 2000357916 A | 12/2000 |
| JP | 2003243902 A | 8/2003 |
| JP | 2003289201 A | 10/2003 |
| JP | 3923360 B2 | 5/2007 |
| KR | 20030031585 A | 4/2003 |
| KR | 20080044752 A | 5/2008 |
| WO | 2013189513 A1 | 12/2013 |
| WO | 2018003932 A1 | 1/2018 |
| WO | 2018095541 A1 | 5/2018 |
| WO | 2019085368 A1 | 5/2019 |
| WO | 2021122725 A1 | 6/2021 |

OTHER PUBLICATIONS

Ghahramani, et al., "Reducing Mutual Coupling of SIW Slot Array Antenna Using Uniplanar Compact EBG {UC-EBG) Structure", The 8th European Conference on Antennas and Propagation (EuCAP 2014), Apr. 6, 2014, pp. 2002-2004.

"Extended European Search Report", EP Application No. 18153137.7, Jun. 15, 2018, 8 pages.

Extended European Search Report, EP Application No. 20166797, Sep. 16, 2020, 11 pages.

"Extended European Search Report", EP Application No. 21203201.5, Apr. 7, 2022, 12 pages.

"Extended European Search Report", EP Application No. 22159217.3, Aug. 19, 2022, 11 pages.

"Extended European Search Report", EP Application No. 22188348.1, Mar. 14, 2023, 8 pages.

"Foreign Office Action", CN Application No. 201810122408.4, Jan. 26, 2022, 15 pages.

"Foreign Office Action", CN Application No. 201810122408.4, Jan. 30, 2023, 21 pages.

"Foreign Office Action", CN Application No. 201810122408.4, May 6, 2022, 15 pages.

Foreign Office Action, CN Application No. 201810122408.4, Jun. 2, 2021, 15 pages.

"Foreign Office Action", CN Application No. 201810122408.4, Sep. 20, 2022, 19 pages.

"Foreign Office Action", CN Application No. 201810122408.4, Oct. 18, 2021, 19 pages.

"Foreign Office Action", CN Application No. 202111321802.9, Mar. 31, 2023, 16 pages.

"Foreign Office Action", CN Application No. 202111321802.9, Nov. 22, 2022, 17 pages.

Bauer, et al., "A wideband transition from substrate integrated waveguide to differential microstrip lines in multilayer substrates", Sep. 2010, pp. 811-813.

Dai, et al., "An Integrated Millimeter-Wave Broadband Microstrip-to-Waveguide Vertical Transition Suitable for Multilayer Planar Circuits", IEEE Microwave and Wireless Components Letters, vol. 26, No. 11, 2016, pp. 897-899.

(56) References Cited

OTHER PUBLICATIONS

Deslandes, et al., "Integrated Transition of Coplanar to Rectangular Waveguides", 2001 IEEE MTT-S International Microwave Sympsoium Digest, pp. 619-622.
Deutschmann, et al., "A Full W-Band Waveguide-to-Differential Microstrip Transition", Jun. 2019, pp. 335-338.
Giese, et al., "Compact Wideband Single-ended and Differential Microstrip-to-waveguide Transitions at W-band", Jul. 2015, 4 pages.
Henawy, et al., "Integrated Antennas in eWLB Packages for 77 GHZ and 79 GHZ Automotive Radar Sensors", 2011 11st European Microwave Conference, Oct. 10, 2011, pp. 1312-1315.
Jankovic, et al., "Stepped Bend Substrate Integrated Waveguide to Rectangular Waveguide Transitions", Jun. 2016, 2 pages.
Rajo-Iglesias, et al., "Gap Waveguide Technology for Millimeter-Wave Antenna Systems", IEEE Communications Magazine, vol. 56, No. 7, Jul. 2018, pp. 14-20.
Schellenberg, et al., "CAD Models for Suspended and Inverted Microstrip", IEEE Transactions on Microwave Theory and Techniques, vol. 43, No. 6, Jun. 1995, pp. 1247-1252.
Tong, et al., "A Vertical Transition Between Rectangular Waveguide and Coupled Microstrip Lines", IEEE Microwave and Wireless Components Letters, vol. 22, No. 5, May 2012, pp. 251-253.
Tong, et al., "A Wide Band Transition from Waveguide to Differential Microstrip Lines", Dec. 2008, 5 pages.
Topak, et al., "Compact Topside Millimeter-Wave Waveguide-to-Microstrip Transitions", IEEE Microwave and Wireless Components Letters, vol. 23, No. 12, Dec. 2013, pp. 641-643.
Nang, et al., "Mechanical and Dielectric Strength of Laminated Epoxy Dielectric Graded Materials", Mar. 2020, 15 pages.
Yuasa, et al., "A millimeter wave wideband differential line to waveguide transition using short ended slot line", Oct. 2014, pp. 1004-1007.
"Foreign Office Action", CN Application No. 202111321802.9, Jul. 29, 2023, 17 pages.
"Foreign Office Action", CN Application No. 202210282861.8, Jun. 1, 2023, 13 pages.
"Foreign Office Action", EP Application No. 21203201.5, Jun. 15, 2023, 11 pages.
"Extended European Search Report", EP Application No. 23167063.9, Sep. 11, 2023, 12 pages.
"Extended European Search Report", EP Application No. 23167836.8, Sep. 11, 2023, 10 pages.
Ferrando-Rocher Miguel et al: "A Half-Mode Groove Gap Waveguide for Single-Layer Antennas in the Millimeter-Wave Band", IEEE Antennas and Wireless Propagation Letters, IEEE, Piscataway, NJ, US, vol. 21, No. 12, Jul. 27, 2022, pp. 2402-2406, XP011928651, ISSN: 1536-1225, DOI: 10.1109/LAWP.2022.3194665.

\* cited by examiner

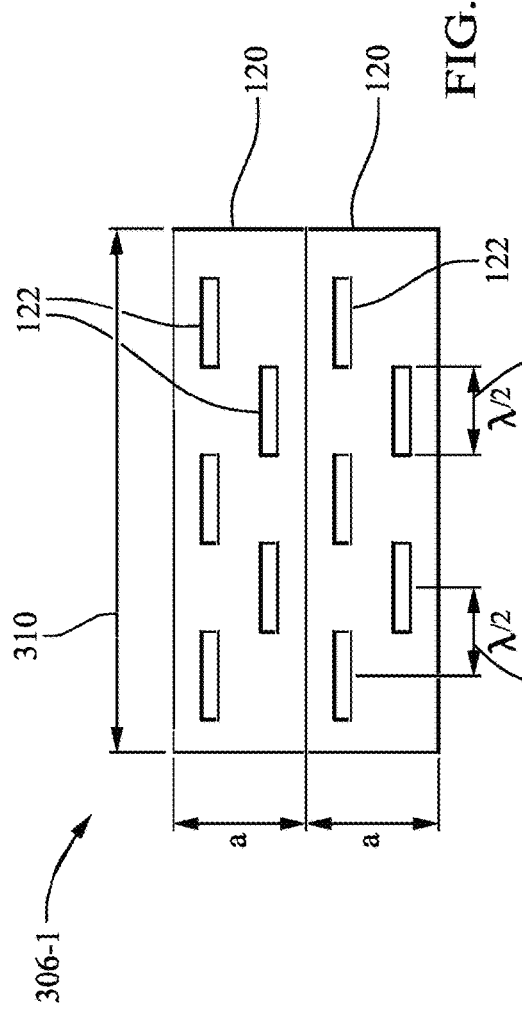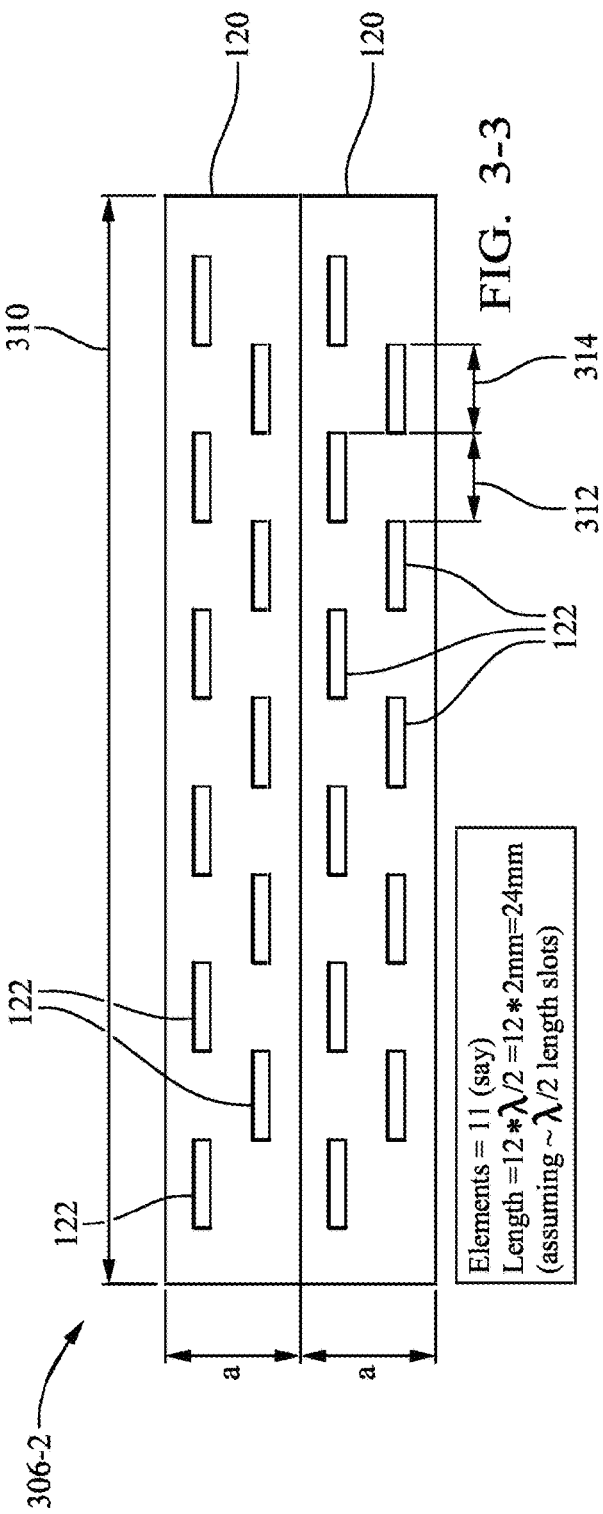

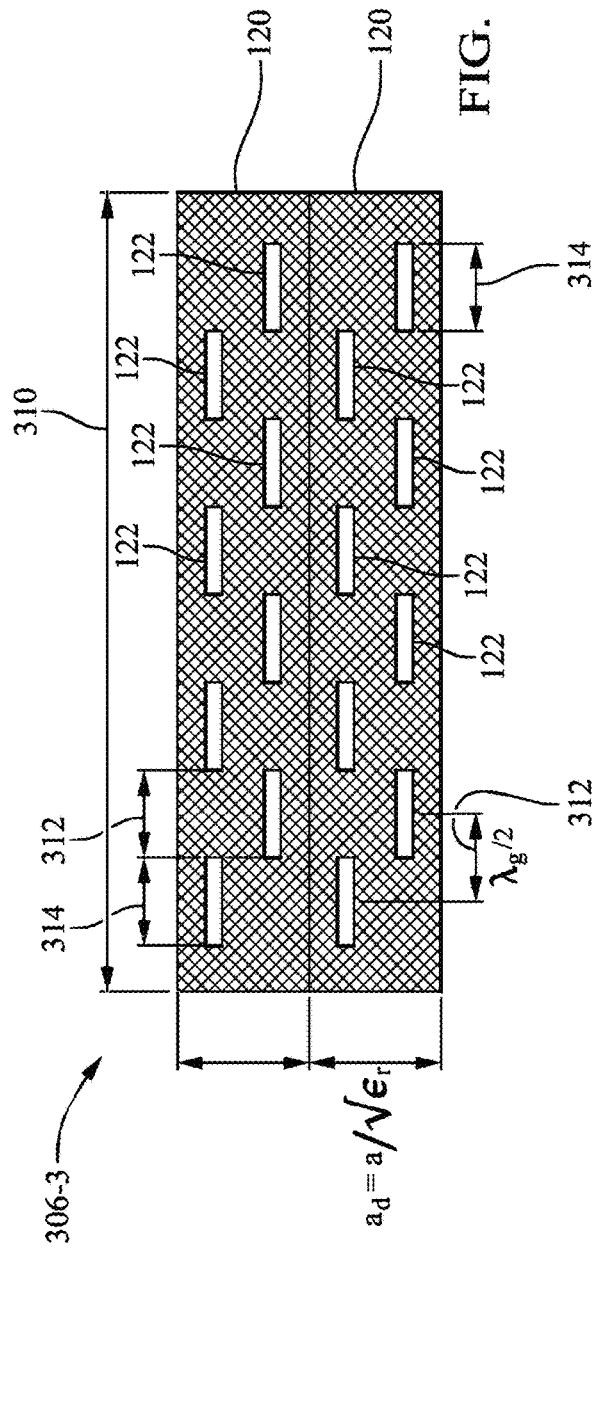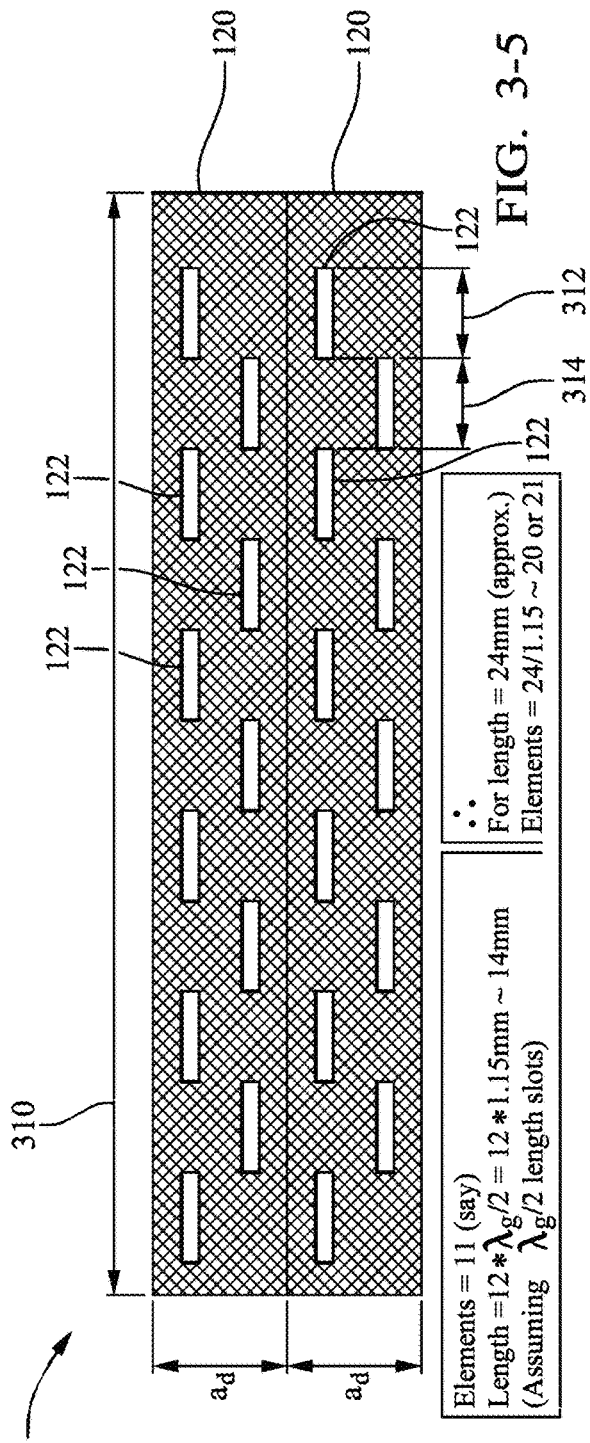

DIELECTRIC LOADED WAVEGUIDE FOR LOW LOSS SIGNAL DISTRIBUTIONS AND SMALL FORM FACTOR ANTENNAS

CROSS-REFERENCE TO RELATED APPLICATION

This application is a divisional application that claims the benefit of U.S. patent application Ser. No. 17/661,398, entitled DIELECTRIC LOADED WAVEGUIDE FOR LOW LOSS SIGNAL DISTRIBUTIONS AND SMALL FORM FACTOR ANTENNAS, and filed on Apr. 29, 2022, which claims the benefit of U.S. Provisional Patent Application No. 63/182,726, filed Apr. 30, 2021, the disclosure of which is incorporated by reference in its entirety herein.

BACKGROUND

Antenna systems are used in automotive applications to detect objects, such as road features, obstacles or other vehicles, in a surrounding environment of a vehicle. These antenna systems usually comprise one or more antennas that are configured to emit electromagnetic (EM) energy in the form of electromagnetic radiation towards the environment and to capture reflections of the electromagnetic energy by the objects to be detected. The antenna systems may be part of a radar system.

The antenna systems are usually placed at the body of the vehicle, such as within or behind a bumper or an emblem of the vehicle, at corners or sides of the body, or the like. Antenna characteristics of antenna patterns of the antenna systems, such as directivity, gain, or side-lobe suppression, usually depend on the size, shape, distance and placement of the individual antennas of the antenna system. To enhance the antenna characteristics and/or to allow for flexible adaption of the antenna characteristics to different environmental scenarios it is usually desirable to incorporate a large number of antennas and/or a large number of individual radiation elements within the antenna system.

Since the size of the individual antennas and/or radiation elements is given by the operating wavelength of the antenna system and usually is on the same order of magnitude as the operating wavelength, the individual antennas and/or radiation elements may not be arbitrarily small. On the other hand, size constraints at the positions that are suitable for placing the antenna systems at the vehicle body limit the maximum size of the antenna system. Therefore, the total number of individual antennas and/or radiation elements that may incorporated into an antenna system is usually limited.

Furthermore, when placing individual antennas in close vicinity next to each other, for example at distances comparable to or smaller than the operating wavelength, mutual electromagnetic coupling between individual antennas may occur that deteriorates the antenna characteristics by guiding electromagnetic energy in unwanted or unfavorable directions. This mutual coupling thus poses a constraint on the minimum distance at which individual antennas of an antenna system may be placed next to each other and therefore also a constraint on the minimum size of the antenna system.

Finally, the detection efficiency of antenna systems also depends on the losses that occur within the antenna system when guiding the electromagnetic energy between the antenna elements and coupling ports of the antenna systems that interface the antennas with a radar system. These losses typically limit the maximum power at which the antenna system may be operated.

Accordingly, there is a need for antenna systems that provide for flexible adaption of the antenna characteristics, such as directivity, gain and/or side-lobe suppression, without significantly changing or increasing form factor and/or losses.

SUMMARY

The present disclosure relates to antenna systems, for example, for automotive applications. Furthermore, the present disclosure relates to apparatuses comprising such antenna systems, methods for fabricating such antenna systems, and methods for performing driving operations based on radar detections using such antenna systems.

In a first aspect, the present disclosure is directed at an antenna system that includes a feed portion configured to connect the antenna system to a radar device, such as a radar chip; and a waveguide portion, such as a radiation portion, including one or more radiation channels, wherein each of the radiation channels is configured to be coupled to a channel of the radar device. The radiation channels are filled with a first dielectric. The radiation channels comprise respective surfaces which each have at least one radiation element that allows electromagnetic energy to escape and/or enter the first dielectric. The antenna system furthermore comprises one or more additional channels, the additional channels being filled with a second dielectric that differs from the first dielectric. The additional channels are electromagnetically coupled to the radiation channels to allow for a transfer of at least a part of the electromagnetic energy between the radiation channels and the additional channels.

By electromagnetically coupling the radiation channels of the antenna system to additional channels and by filling the radiation channels and the additional channels with different dielectrics, the antenna system according to the present disclosure allows for flexible adaption of the radiation characteristics of the radiation channels irrespective of the form factor of and the losses occurring within the antenna system.

For example, the first dielectric may be adapted to reduce the size of the radiation channels compared to empty or air-filled radiation channels. The first dielectric may reduce the wavelength of the electromagnetic energy propagating within the radiation channels at the operating frequencies of the antenna system compared to empty radiation channels. Consequently, also the size and spacing of the radiation elements decreases since the radiation elements are usually adapted to the wavelength of the electromagnetic energy within the radiation channels for efficient energy transfer. Smaller sized and more closely spaced radiation elements offer, on the one hand, the possibility to decrease the dimensions of the radiation channels and thus free up space within the antenna system for the placement of additional elements, such as beamforming elements. On the other hand, smaller sized radiation elements allow for the placement of a larger number of radiation elements within a given volume of the antenna system, thus increasing the gain provided by the antenna system.

Providing additional channels that are electromagnetically coupled to the radiation channels and that are filled with a dielectric that differs from the dielectric of the radiation channels then allows the adaption of the transmission properties of the radiation channels independent of the transmission properties of other parts of the antenna system, such as the additional channels.

For example, the second dielectric may have a loss tangent that differs from the loss tangent of the first dielectric. For example, the loss tangent may differ by a factor of at least 10, at least 20, at least 50 or at least 100. The loss tangent of the second dielectric may, for example, be smaller than the loss tangent of the first dielectric, for example by one of said factors. The additional channels then provide propagation channels that allow for efficient transmission of the electromagnetic energy. The additional channels may then, for example, be routing channels that couple the radiation channels to the radar device.

The loss tangent of the second dielectric may also be larger than the loss tangent of the first dielectric, for example by one of said factors. The additional channels then may be configured, for example, as absorption channels that absorb portions of the electromagnetic energy, for example portions that otherwise would deteriorate the radiation characteristics of the antenna system. Such portions may be, for example, portions that are reflected back towards the radiation channels, for example by a radome placed in front of the radiation elements, or portions that travel as surface currents, for example along the surface comprising the radiation elements.

The first dielectric may be a non-air dielectric, such as a non-gaseous dielectric, a non-liquid dielectric, for example a solid dielectric. These dielectrics may have a relative permittivity different from 1 and are at the same time easy to fabricate and handle during the assembly of the antenna system. The first dielectric may be a polymer, such as a polyimide. For example, the first dielectric may be polyetherimide (PEI), such as an unreinforced or a reinforced polyetherimide. The reinforced polyetherimide may, for example comprise glass fiber. In general, the first dielectric may be an amorphous and/or thermoplastic material.

The second dielectric may be a non-solid dielectric, such as a liquid dielectric, such as a gaseous dielectric, such as an air-dielectric, such as air. These dielectrics may have low electromagnetic losses within the additional channels due to their small polarizability.

The second dielectric may also be a non-air dielectric, such as a non-gaseous dielectric, a non-liquid dielectric, for example a solid dielectric. The second dielectric may, for example, be an absorber material that is configured to absorb the electromagnetic energy at the operating frequencies of the antenna system. The absorber material has a loss tangent that is larger than the loss tangent of air and/or the first dielectric. For example, the absorber material may have a loss tangent of at least 0.05, 0.1 or 0.2.

The at least one radiation channel may be at least partly, for example completely, filled with the first dielectric. Similarly, the at least one additional channel may be at least partly, such as completely, filled with the second dielectric.

Besides the one or more radiation channels that are filled with the first dielectric, the antenna system may also comprise one or more other radiation channels that do not comprise the first dielectric. The other radiation channels may be filled with a different dielectric, such as air.

Besides the one or more additional channels that are filled with the second dielectric, the antenna system may also comprise one or more of the additional channels that do not comprise the second dielectric.

The electromagnetic coupling between the at least one radiation channel and the at least one additional channel may be a direct coupling, such as via a transition section that transfers between electromagnetic modes traveling within the radiation channel and electromagnetic modes traveling within the additional channel. Such transition sections may, for example be configured as tapered and/or twisted sections. The electromagnetic coupling may also be a radiative coupling. For example, the transferred electromagnetic energy may travel as radiation between the radiation channel and the additional channel, for example, via the radiation elements. The electromagnetic coupling may also be a conductive coupling. For example, the transferred electromagnetic energy may travel as currents, such as surface currents, between the radiation channels and the additional channels.

The radiation channel and the additional channel may be placed next to each other, for example transversely next to each other. For example, the radiation channel and the additional channel may share a common adjoining wall. The additional channel and the radiation channel may, for example be orientated parallel to each other.

The radiation channel and the additional channel may also be placed next to each other along the propagation direction of the electromagnetic energy within the radiation channel. For example, the radiation channel and the additional channel may be longitudinally aligned with each other. For example, the additional channel may form a routing channel connected to the radiation channel that exchanges the electromagnetic energy with the radiation channel.

Each of the radiation channels may be part of an individual antenna of the antenna system. Individual radiation channels may, for example, constitute individual antennas of the antenna system. Additionally or alternatively, one or more of the radiation channels may together form one of the antennas of the antenna system. In general, individual antennas of the antenna system comprise all radiation elements and/or radiation channels that are configured to coherently transfer electromagnetic energy between the antenna system and a radiation field of the antenna system.

Each one of the radiation elements may constitute an antenna element of the antenna system. The radiation elements may be configured to transduce the electromagnetic energy between the inside of the radiation channels and an environment of the antenna system. Within the environment, the electromagnetic energy may propagate as radiation. The individual radiation elements may be configured as slots, cones or the like.

The radiation channels and/or the additional channels may be configured as waveguides for guiding the electromagnetic energy at the operating frequencies of the antenna system. For example, the waveguides may be configured as three-dimensional waveguides that comprise a cavity that is delimited by conducting structures, such as metal structures, in at least both transverse directions. The waveguide allows for propagation of the electromagnetic energy in at least one direction, such as in a propagation direction. Within the waveguide, the electromagnetic energy propagates in the form of normal modes of the waveguide that are defined by the dimensions of the waveguides. Such normal modes may be, for example, TE or TM modes.

The conducting structures surrounding the cavity or channel are opaque for the electromagnetic energy travelling within the channel. They may be formed, at least partly, such as entirely, by solid walls. They may also be formed at least partly, such as entirely, by spaced-apart structures, such as vias forming sidewalls in a substrate integrated waveguide. A spacing between the spaced-apart structures may be smaller, for example at least five times or at least ten times smaller, than a wavelength of the electromagnetic energy propagating within the waveguide.

The conducting structures delimiting the cavities of the waveguides may comprise openings to couple electromagnetic energy between the outside and the inside of the cavity. Such openings may, for example, be formed by the radiation elements for emitting and/or receiving electromagnetic radiation or by ports to couple the electromagnetic energy between the respective channel and another guiding structure, such as another channel or any other conducting structure, such as a transmission line.

The radiation elements may be formed at side surfaces of the radiation channels that delimit the radiation channels parallel to a propagation direction of the electromagnetic energy within the radiation channels. The radiation elements may also be formed at end surfaces of the radiation channels that delimit the radiation channels perpendicular to the propagation direction. At least a part of the radiation elements, such as all radiation elements, may be placed on the same surface of the antenna system. The surface may be a front surface of the antenna system orientated towards a field of view of the antenna system.

The radiation channels may be configured to generate a standing wave pattern in their dielectric material. For example, the radiation channels may be closed by a conducting structure at at least one longitudinal end, such as at both longitudinal ends. The at least one radiation element, such as each individual radiation element, may be placed at a longitudinal position that corresponds to a maximum of the electric field of a standing wave pattern within the radiation channels. These longitudinal positions are spaced apart along the longitudinal direction at distances that correspond to half of the wavelength of the electromagnetic energy within the first dielectric.

The waveguide portion of the antenna system may comprise at least one absorbing member. The absorbing member may be configured to absorb portions of the electromagnetic energy. Those portions may be portions that would otherwise deteriorate the radiation pattern of the antenna system. The absorbed portions may be surface currents on the surfaces at which the radiation elements are placed and/or back reflections from other parts of the antenna system, such as a radome placed in front of the radiation elements.

The absorbing members may be located at the surfaces comprising the radiation elements. For example, the absorbing members may be exposed at those surfaces.

The absorbing members may be located next to, for example parallel to, the radiation channels. They may be configured to receive the absorbed portions of the electromagnetic energy at the surfaces at which the radiation elements are placed. The absorbing members may be configured as isolation portions and/or as absorption channels.

The absorbing members may be located next to the radiation channel. For example, an absorbing member may be located in between two neighboring radiation channels. An absorbing member may also be located between a radiation channel and an edge of an antenna board of the antenna system.

The absorbing members may be connected to an absorption layer that is configured to absorb electromagnetic energy captured by the absorbing members. The absorption layer may extend parallel to a propagation direction of the electromagnetic energy within the radiation channels. For example, the absorption layer may extend over all radiation channels, for example in a transverse direction perpendicular to the propagation direction. The absorption layer may be placed at a side of the radiation channels that is opposite the surface comprising the radiation elements.

A connection between the isolation members and the absorption layer may be provided in between two of the radiation channels.

The isolation members, such as the isolation portions and/or the absorption channels, may comprise an absorber material. The absorber material may be a plastic. The absorber material may, for example, be a polyester, such as polylactic acid (PLA). The absorber material may also be a polystyrene, such as a high impact polystyrene (HIPS).

The radar device may be a transmitter and/or a receiver, such as a transceiver. The radar device may comprise integrated circuits. For example, the radar device may be configured as a monolithic microwave integrated circuit (MMIC) or at least two coupled MMICs. The channels of the radar device may be individual ports of the radar device. The radar device may be configured, for example, to independently transmit and/or receive individual radar signals via the individual channels.

The feed portions may comprise one or more coupling ports that provide an interface between the radar device and the antenna system. Each individual radiation channel may be coupled to one of the coupling ports via an intermediate signal path, such as a routing channel. The intermediate signal paths may be configured as transmission lines and/or waveguides.

According to an embodiment, the first dielectric has a relative permittivity or dielectric constant that is larger than 1. For example, the relative permittivity of the first dielectric may be at least 1.5, at least 2, at least 2.5 or at least 3, such as, for example, 2 or 3. With a relative permittivity larger than 1, the wavelength of the electromagnetic energy propagating within the radiation channels is smaller than the wavelength within an air-filled channel. Consequently, a size of the radiation elements can also be kept smaller than with an air-filled channel. The radiation channels therefore may have a small size and/or accommodate a large number of radiation elements.

According to an embodiment, one or more of the additional channels form routing channels, such as hollow channels, of a routing portion of the antenna system. The feed portion then is configured to connect each of the routing channels to a channel of the radar device and the electromagnetic coupling between the additional channels and the radiation channels couples each of the one or more radiation channels to one of the routing channels. Providing different dielectrics within routing channels and radiation channels of the antenna system allows to adapt the routing channels for low loss propagation of the electromagnetic energy and to adapt the radiation channels for a small size and close spacing of the radiation elements.

A loss tangent of the second dielectric may be smaller than a loss tangent of the first dielectric. Additionally or alternatively, a relative permittivity or dielectric constant of the second dielectric may be smaller than the relative permittivity or dielectric constant of the first dielectric. For example, the first dielectric may be a solid dielectric and the second dielectric may be air.

According to an embodiment, the second dielectric is a liquid dielectric, such as an air dielectric, such as air and/or the first dielectric is a non-air dielectric, such as a non-liquid dielectric, such as a solid.

According to an embodiment, the antenna system further includes a transition portion configured to transfer, between the second dielectric of the routing channels and the first dielectric of the radiation channels, the electromagnetic (EM) energy that is allowed to escape and/or enter the radiation elements. The transition portion may comprise transition sections that couple the electromagnetic energy from the individual routing channels to the individual radiation channels. The transition sections may, for example, comprise tapered sections and/or power dividers and/or phase shifters or the like.

According to an embodiment, a first radiation channel and a second radiation channel are connected to a same one of the routing channels. This allows to connect both the first and second radiation channel to the same channel of the radar device. Therefore, the first and second radiation channel may form part of a single antenna of the antenna device that is controlled via the same channel of the radar device.

According to an embodiment, a first radiation channel and a second radiation channel are connected to different routing channels. This allows to connect the first and second radiation channel to different channels of the radar device. Therefore, the first and second radiation channels may act as independent antennas of the antenna system.

According to an embodiment, the routing portion is provided in a routing layer and the waveguide portion comprises a radiation layer. The radiation layer thereby is adjacent to a side of the routing layer and the surfaces of the individual radiation channels having the at least one radiation element that allows electromagnetic energy to escape and/or enter the first dielectric are located at a side of the radiation layer that is opposite the routing layer.

Providing the routing portion and the waveguide or radiation portion in individual layers results in an antenna system having a small height, for example in a radiation direction and/or in a propagation direction of the electromagnetic energy within the individual channels. The individual layers may have a smaller extend in the height direction than in the transverse directions perpendicular to the height direction.

Each individual layer may comprise a separate opening or cavity for each individual radiation channel or for each individual routing channel. The individual radiation elements may be formed by individual ends of the openings of the individual radiation channels, whereby the ends are located at the side of the radiation layer that is opposite the side of the radiation layer that faces the routing layer. Within the individual layers, the openings or cavities may be placed next to each other in the transverse directions.

The individual radiation channels within the radiation layer may each form a horn antenna. The horn antennas may comprise tapered sidewalls. For example, the horn antennas may be configured as corrugated horn antennas.

The radiation layer may be placed on top of the routing layer, for example directly on top of the routing layer or with one or more intermediate layers in between the routing layer and the radiation layer.

The radiation layer may comprise several sublayers that are stacked on top of each other. A size of openings within the individual sublayers may increase from the side of the radiation layer facing the routing layer towards the side of the radiation layer that is located opposite the routing layer. This size increase may provide a tapered cross-section of the individual radiation channels, for example, to form individual horn antennas.

According to an embodiment, the waveguide portion comprises a further radiation layer, wherein the further radiation layer is adjacent to a side of the radiation layer that is opposite the routing layer, and wherein the further radiation layer includes the surfaces of the individual radiation channels having the at least one radiation element that allows electromagnetic energy to escape the first dielectric. Such a further radiation layer may be configured to enhance directivity of the electromagnetic energy that enters and/or exits the individual radiation elements.

The further radiation layer may be formed integral with the radiation layer. The further radiation layer may also be configured as a separate layer that is connected to the radiation layer. The further radiation layer may be placed on top of the radiation layer, for example directly on top of the radiation layer or with one or more intermediate layers in between the further radiation layer and the radiation layer.

According to an embodiment, the at least one radiation channel comprises a cavity of the radiation layer that is filled with the first dielectric. The cavity may be formed by an opening within the radiation layer.

According to an embodiment, the cavity of the radiation layer has a shape that extends from the routing layer, through the radiation layer, and up to the further radiation layer. The cavity may, for example, form a through-hole through the routing layer. With embodiments that lack the further radiation layer, the cavity may extend from the routing layer, through the radiation layer, to a surface of the radiation layer that is located opposite a side of the routing layer that adjoins the routing layer.

According to an embodiment, the feed portion is provided in a feed layer and the routing layer is adjacent to the feed layer. For example, the side of the routing layer, which the radiation layer is adjacent to, may be located opposite the feed layer. This provides a compact construction of the antenna system.

The routing layer may be placed on top of the feed layer, for example directly on top of the feed layer or with one or more intermediate layers in between the routing layer and the feed layer.

According to an embodiment, the feed portion is configured to connect a channel of the radar device to the antenna system at a bottom surface of the feed layer that is opposite the routing layer. This allows for placement of the antenna system on top of the radar device and thus for a compact stacked configuration of a radar system comprising the antenna system and the radar device.

According to an embodiment, the routing layer and the radiation layer comprise a stack of parallel layers. This provides a compact construction of the antenna system.

According to an embodiment, the routing layer further comprises a transition portion configured to transfer, between the second dielectric of the routing channel and the first dielectric of the radiation channel, the EM energy that is allowed to escape and/or enter the radiation elements. The transition portion may comprise the transition sections described above.

In general, each of the radiation layer and/or the routing layer and/or the further radiation layer and/or the feed layer may comprise several sublayers. The individual sublayers of the same layer may be formed from the same material. They may be stacked on top of each other.

According to an embodiment, one or more of the additional channels are configured as absorption channels, wherein the second dielectric is configured as an absorber material, and wherein respective surfaces of the individual absorption channels each have at least one absorption element, such as a pattern of absorption elements, that allows portions of the electromagnetic energy that enters and/or exits the first dielectric to be absorbed by the absorber material. The portions of the electromagnetic energy may be, for example, EM reflections near the surface of the radiation channels and/or surface currents propagating at the surface of at least one of the radiation channels. Such absorption channels improve the radiation pattern of the antenna system by eliminating radiation that is generated by reflections and/or surface currents and that thus does not contribute to a radiation pattern adapted to the application scenario of the antenna system.

The absorption channels form absorbing members of the antenna system.

The one or more absorption channels may be located next to the radiation channels, for example in a transverse direction that is perpendicular to a propagation direction of the electromagnetic energy within the radiation channels. For example, the absorption channels may be orientated parallel to the radiation channels. An absorption channel may be located in between one of the radiation channels and an edge of an antenna board of the antenna system. An absorption channel may also be located in between two of the radiation channels.

Like the radiation channels, the absorption channels may be configured as waveguides. They may have a same dimension as the radiation channels. The dimension may, for example, be a transverse dimension, such as a transverse height perpendicular to the surface having the radiation elements, and/or a transverse width parallel to the surface having the radiation elements. The dimension may also be the length of the radiation channels and of the absorption channels along the propagation direction.

The at least one absorption element, such as the pattern of absorption elements, of at least one of the absorption channels may be sized and placed to generate a radiation pattern that overlaps and/or corresponds to the radiation pattern generated by at least one of the radiation channels. Thus, the absorption elements of the absorption channel may be configured to efficiently capture electromagnetic energy reflected towards the absorption elements, for example by mimicking radiation elements of a radiation channel.

For example, the pattern of radiation elements of the at least one radiation channel and the pattern of absorption elements of the at least absorption channel may be equal.

According to an embodiment, the absorption element, such as each absorption element of a pattern of absorption elements, includes an absorbing slot and/or an absorbing cone to capture the portions of the electromagnetic energy. The slot and/or cone may have the same size and/or the same placement with respect to the absorption channel as a radiation element of the radiation channel has with respect to the radiation channel.

A pattern of absorption elements of the absorption channel may be essentially equal, such as equal, to a pattern of radiation elements of the radiation channel. For example, the individual absorption elements of a pattern of absorption elements of the absorption channel may have the same size and/or the same placement as respective radiation elements of a pattern of radiation elements of the radiation channel. In general, the pattern of absorption elements is made to be as similar as possible to the pattern of radiation elements. For example, the pattern of the absorption elements may be exactly the same as of the radiation elements.

The absorption element, such as each absorption element, may be configured as a meta-material structure. For example, the absorption element or each absorption element may be configured to capture electromagnetic energy having a predetermined property, such as frequency and/or wavelength and/or incident angle or the like.

According to an embodiment, an outer wall of the radiation channel is adjacent to an outer wall of the absorption channel. This provides a compact construction of the antenna system. The adjacent wall may, for example, be a sidewall that is orientated parallel to the propagation direction and/or perpendicular to the surface comprising the absorption and/or radiation elements. For example, the radiation channel and the absorption channel may share a common outer wall that forms both the wall of the radiation channel and the more of the absorption channel.

According to an embodiment, the antenna system further comprises an absorption layer arranged beneath at least one of: the radiation channel; the absorption channel; an outer wall of the radiation channel; or an outer wall of the absorption channel. The absorption layer is thereby configured to draw the EM reflections further away from the radiation channel than the absorption channel. Such an absorption layer further increases absorption of electromagnetic energy by the absorption channel and thus enhances the antenna characteristics of the antenna device.

According to an embodiment, the absorption layer is filled with the absorber material. This efficiently prevents the emission of the electromagnetic energy captured by the absorption elements.

According to an embodiment, the absorption layer includes an interface to the absorption channel through another surface of the absorption channel that is opposite the surface with the at least one absorption element. Such an interface allows to place the absorption layer on the side of the absorption channel and/or the radiation channel that is opposite the side comprising the radiation elements and/or the absorption elements. Therefore, reemission of the electromagnetic energy captured by the absorption elements is efficiently prevented.

In addition to or instead of the at least one absorption channel, the antenna system may also comprise at least one absorbing member that is configured as an isolation portion. Such an isolation portion may be directly embedded into the antenna system, for example into an antenna board of the antenna system. The isolation portion may, for example, be free of waveguiding structures.

According to an embodiment, the waveguide portion includes at least one pair of radiation channels separated by an isolation portion, the isolation portion being configured to prevent interference between a first radiation channel and a second radiation channel from the pair of radiation channels by absorbing spurious portions of the EM energy that is allowed to escape and/or enter each of the first and second radiation channels. Such an isolation portion improves the emission characteristics of the antenna device.

The isolation portion may be configured as a bar or strip. The isolation portion may extend along the propagation direction of the electromagnetic energy within the radiation channel.

The isolation portion may be exposed at the surface of the antenna device comprising the radiation elements. Additionally or alternatively, the isolation portion may extend beneath the surface. The isolation portion may be arranged parallel to the radiation channels.

The isolation portion may be located within a cavity of the radiation portion. The cavity may have an opening at the surface having the radiation elements. The cavity may, for example, be configured as a longitudinal groove.

According to an embodiment, the surface of each of the radiation channels is a first surface of each of the radiation channels and the isolation portion extends to an isolation layer arranged beneath a second surface of each radiation channel from the pair of radiation channels, the second surface being opposite the first surface. Furthermore, the isolation layer is configured to absorb the spurious portions of the EM energy that is absorbed by the isolation portion. Such an isolation layer further increases the absorbing capabilities of the isolation portion. The isolation layer may constitute an absorption layer. The isolation layer may be configured as it is described above in connection with the absorption channel and the absorption layer.

In general, the antenna system may comprise an absorbing layer that is located at a side of the at least one radiation channel that faces away from the surface having the at least one radiation element. The side may, for example, be located opposite the surface having the radiation elements. The absorbing layer may be connected to an absorbing structure that is exposed at the surface having the at least one radiation element. The connection may be configured to draw away the portions of electromagnetic energy that are received by the absorbing structure and guide them to the absorbing layer. The absorbing structure may, for example, be the isolation portion and/or the absorption channel.

According to an embodiment, the isolation portion comprises a meta-material absorption substrate or element configured to absorb, within a plurality of meta-material structures of the isolation portion, the spurious portions of the EM energy that is allowed to escape and/or enter each of the first and second radiation channels. Such meta-material structures may efficiently capture electromagnetic energy having predetermined properties, such as frequency, wavelength, incident angle or the like. For example, the meta-material structures may be configured to capture electromagnetic energy having a predetermined frequency and/or wavelength and/or incident angle.

The meta-material structures may, for example, be configured as metal structures, such as copper structures. The meta-material structures may be placed on an absorbing substrate, such as on the absorber material.

The meta-material structures may be located at the surface of the antenna system comprising the radiation elements and/or the absorbing elements of the absorption channels.

According to an embodiment, the isolation portion of the antenna system projects partly through the surface of the first radiation channel, partly through the surface of the second radiation channel, and into an adjoining wall separating the first and second radiation channel. This allows for a compact construction of the antenna system.

According to an embodiment, a pattern of the radiation elements of a first one of the radiation channels and a pattern of the radiation elements of a second one of the radiation channels are separated by one half a wavelength at the operating frequency of the radar device. Such a separation between the individual radiation channels allows for efficient beamforming and/or for operation of the antenna system in a multiple-input-multiple-output (MIMO) configuration. In general, the pattern of the radiation elements of the first one of the radiation channels and the pattern of the radiation elements of the second one of the radiation channels may be separated by an integer multiple of one half the wavelength at the operating frequency According to an embodiment, a first one of the radiation channels and a second one of the radiation channels are separated by an adjoining wall that is thicker, such as at least twice, for example at least six times, as thick as an outside wall of the first radiation channel and/or thicker, such as at least twice, for example at least six times, as thick as an outside wall of the second radiation channel. Providing the first and/or second radiation channel with adjoining walls that are thicker than the outer walls provides isolation between the individual radiation channels and neighboring structures, such as mutual isolation of the first and second radiation channel, while at the same time keeping the overall dimensions of the antenna system compact.

According to an embodiment, a size of the radiation channels of the waveguide portion is less than a corresponding size of one or more radiation channels of an air waveguide that is configured to allow an equivalent amount of EM energy to escape and/or enter an air dielectric through radiation elements of the air waveguide. Such radiation channels provide a compact antenna system. For example, the size of one of the radiation channels of the waveguide portion that is filled with the first dielectric may be less than a corresponding size of a channel of an air waveguide that is configured to allow an equivalent amount of EM energy to escape and/or enter an air dielectric through radiation elements of the air waveguide. Thereby, each radiation channel of the air waveguide may comprise the same number of radiation elements as the radiation channel filled with the first dielectric.

According to an embodiment, the size of the radiation channels of the waveguide portion comprises a maximum length of the radiation channels of the waveguide portion and the corresponding size of the radiation channels of the air waveguide comprises a maximum length of the radiation channels of the air waveguide. The antenna system thus has a compact size in the longitudinal direction.

The radiation channels of the waveguide portion may be shorter than corresponding radiation channels of an air-filled waveguide that transduces the same amount of electromagnetic energy. This reduction in length may be due to a shorter wavelength of the electromagnetic energy within the radiation channels that are filled with the first dielectric compared to the wavelength of the electromagnetic energy within a corresponding radiation channel filled with air. The shorter wavelength allows for a smaller distance between individual radiation elements and/or a shorter length of the individual radiation elements along the propagation direction within the radiation channels.

According to an embodiment, the size of the radiation channels of the waveguide portion comprises a maximum area or volume of the radiation channels of the waveguide portion and the corresponding size of the radiation channels of the air waveguide comprises a maximum area or volume of the radiation channels of the air waveguide. The area may, for example, be a cross-sectional area of the individual radiation channels perpendicular to a propagation direction within the radiation channels. The reduction in area and/or volume may result from a smaller mode volume of the electromagnetic energy within the radiation channels that are filled with the first dielectric compared to radiation channels filled with air.

According to an embodiment, a quantity of radiation elements in a pattern of radiation elements of each of the radiation channels is greater than a quantity of radiation elements in a pattern of radiation elements of an air channel of an air waveguide that is configured to allow an equivalent amount of EM energy to escape from the air channels as the EM energy than is allowed to escape the radiation elements.

According to an embodiment, the radiation channel may be configured to accommodate a larger number of radiation elements than a corresponding radiation channel that has the same size and that is filled with air instead of the first dielectric. The radiation elements of both the radiation channel filled with the first dielectric and the radiation channel filled with air may thereby be spaced by the same integer multiple of half the wavelength of the electromagnetic energy within the first dielectric or air, respectively.

According to an embodiment, the first dielectric is a structured dielectric that is configured to act as a lens for the electromagnetic energy escaping and/or entering the first dielectric. Such a first dielectric allows to additionally shape the radiation pattern of the antenna system and thus adapt the radiation characteristics to the operating environment of the antenna system.

Such structured dielectrics may, for example, be integrated into the radiation channels of the antenna system comprising the routing layer and the radiation layer. For example, such structured dielectrics may be integrated into individual propagation channels that are configured as horn antennas.

According to an embodiment, the radiation channels and/or the additional channels comprise metal and/or plastics, such as metal-coated plastics. This allows for easy and cost-effective manufacture of the antenna system.

The radiation channels and/or the additional channels may comprise a plastic body that is coated with a metal, such as copper. The plastic may be a plastic having a low loss tangent at the operating frequency of the antenna system. For example, the plastic may be polyimide, polypropylene, ABS (acrylonitrile-butadiene-styrene terpolymer) or the like.

In general, the radiation channels and/or the additional channels may comprise a body that is provided as a molded part, such as an injection molded part. The body may also be provided as a body that has been fabricated by 3D printing. The body may also be provided as a laminated part. Furthermore, it may be provided as a brazed part, for example as a part made from brazed aluminum.

The body may be made from a conductor. The body may also be made from an insulator, such as plastics. The body may have a conducting coating. The coating may, for example, have been applied by electroplating and/or galvanizing and/or spray coating, or the like.

According to an embodiment, the radiation channels and/or the additional channels are configured as waveguides, such as tubular waveguides. The waveguides may have transverse dimensions perpendicular to a propagation direction that are adapted to a mode volume of electromagnetic energy propagating along the propagation direction. The waveguides may be open at both longitudinal ends. Alternatively, they also may be closed at at least one longitudinal end, such as at both longitudinal ends.

For example, a radiation channel may be closed at one longitudinal end and adjoined to an additional channel, such as a routing channel, at the other longitudinal end.

According to an embodiment, the one or more radiation channels each comprise a pattern of radiation elements, the radiation elements being sequentially coupled to the respective radiation channel along a longitudinal direction and/or a propagation direction of the electromagnetic energy within the radiation channels. This allows for efficient feeding of the radiation elements.

The radiation elements may, for example, have a longitudinal spacing that corresponds to an integer multiple of half the wavelength of the electromagnetic energy propagating within the radiation channels. The integer multiple may, for example, be equal to 1.

According to an embodiment, a quantity of the radiation channels is greater than or equal to a quantity of the additional channels.

According to an embodiment, each of the additional channels comprises a cavity that is rectangular shaped in at least its cross section, such as rectangular shaped in all three dimensions, and filled with the second dielectric. The cavities may be the cavities of waveguides forming the individual additional channels. With other embodiments, at least one of the additional channels may comprise the cavity. Other additional channels may not comprise the cavity.

According to an embodiment, each of the radiation channels comprises a cavity that is rectangular shaped in at least its cross section, such as rectangular shaped in all three dimensions, and filled with the first dielectric. The cavities may be the cavities of waveguides forming the individual radiation channels. With other embodiments, at least one of the radiation channels may comprise the cavity. Other radiation channels may not comprise the cavity.

According to an embodiment, the one or more radiation channels are formed by a first part and a second part, wherein the first part only partly surrounds the first dielectric and wherein the second part is connected to the first part in a contact region. Such a construction of a radiation channel allows for easy fabrication.

The first and second part may together form a cavity that completely surrounds the first dielectric at least in the transverse direction perpendicular to a propagation direction within the radiation channel. For example, the first and second part may together form a cavity that surrounds the first dielectric in both transverse direction, such as in all three dimensions.

The first part may be configured to receive the first dielectric within a first cavity part of the cavity. The second part may be configured to receive the first dielectric within a second cavity part of the cavity. For example, the first cavity part may be configured as a groove within the first part forming the radiation channel and/or the second cavity part may be configured as a groove within the second part forming the radiation channel. The first part or the second part may also only cover the cavity holding the first dielectric and the cavity may then be formed completely within the respective other one of the first part and the second part.

The contact region may comprise a contact surface of the first part that rests against a corresponding contact surface of the second part. The contact surface of the first part and/or the contact surface of the second part may be configured as metal surfaces. The contact surface of the first part and/or the contact surface of the second part may be configured as flat surfaces. The contact surface of the first part and/or the contact surface of the second part may be orientated parallel to the surface holding the radiation element of the radiation channel.

According to an embodiment, the first part comprises the at least one radiation element. The first part may then form a part of the radiation channel.

According to an embodiment, the contact region runs parallel to the surface of the radiation channel having the at least one radiation element and/or parallel to a propagation direction of the electromagnetic energy within the radiation channel. This allows for easy placement of the first dielectric within the radiation channel prior to joining the first and second part.

According to an embodiment, the contact region is located at a side surface of the first dielectric that connects a first surface of the dielectric with a second surface of the dielectric. The first and second surfaces of the dielectric are thereby located at opposite sides of the dielectric and the first surface is located adjacent the surface of the radiation channel having the radiation element. Such a construction allows to fabricate the first and second parts as top and bottom parts of the radiation channel and to join these parts in a simple manner during manufacture of the antenna system.

According to an embodiment, the second part surrounds a remaining portion of the first dielectric that is not surrounded by the first part. The first and second part may therefore form an enclosure of the dielectric. For example, the first and second part may completely form the radiation channel.

According to an embodiment, both the first and second part each comprise a cavity part that receives a portion of the first dielectric. This allows for placement of the dielectric either within the first or the second part prior to joining these parts to form the propagation channel.

According to an embodiment, the second part comprises a further surface of the radiation channel that is orientated parallel to the surface having the at least one radiation element. With such an embodiment, the contact region may be located in between the two parallel surfaces. This allows for easy placement of the first dielectric within the radiation channel and for easy connection of the first and second part to form the radiation channel.

Like the radiation channel, also the additional channel may be formed by a first part and a second part, wherein the first part only partly surrounds the second dielectric and wherein the second part is connected to the first part in a contact region. All embodiments and technical effects that are disclosed in connection with the first and second parts forming the radiation channel also apply to the first and second parts forming the additional channel and vice versa.

The first part forming the radiation channel may also be the first part forming the additional channel and the second part forming the radiation channel may also be the second part forming the additional channel. For example, the first part may partly surround both the first dielectric and the second dielectric and the second part may also partly surround both the first dielectric and the second dielectric.

For example, the first part may partly surround all radiation channels and/or all additional channels. The second part may then also partly surround all radiation channels and/or all additional channels. The first part may form a top part of the antenna system that comprises the radiation elements and the second part may form a bottom part of the antenna system.

In another aspect, the present disclosure is directed at an apparatus comprising an antenna system according to the present disclosure and a device, such as a radar chip, that is configured to transmit or receive electromagnetic signals via the antenna system. All features, embodiments and technical effects that are disclosed in connection with the antenna system according to the present disclosure also apply to the apparatus and vice versa.

According to an embodiment, the device and/or the antenna system are part of a radar system.

According to an embodiment, the radar system is configured for installation as part of a vehicle, such as an automotive vehicle. The radar system may be configured for installation at a front and/or the side and/or corners of the vehicle.

In a further aspect, the present disclosure is directed at a method comprising performing, by a vehicle, such as by an automotive vehicle, a driving operation based on radar detections observed using an antenna system according to the present disclosure. All features, embodiments and technical effects that are disclosed in connection with the antenna system and the apparatus according to the present disclosure also apply to the method and vice versa.

The driving operation may be an advanced driver-assistance operation. The operation may be an operation providing corner control, lane change assist, adaptive cruise control, emergency break assist, lane departure warning, blind spot monitoring, collision warning, driver monitoring, automatic parking or the like.

In another aspect, the present disclosure is directed at a computer-readable storage medium comprising instructions that, when executed, cause at least one processor of a vehicle, such as an automotive vehicle, to perform a driving operation based on radar detections observed using the antenna system according to the present disclosure.

In a further aspect, the present disclosure is directed at a system comprising means for performing a driving operation based on radar detections observed using the antenna system according to the present disclosure.

In another aspect, the present disclosure is directed at a vehicle, such as an automotive vehicle, that comprises the antenna system and/or a radar system having the antenna system according to the present disclosure.

The present disclosure is also directed at a method for fabricating an antenna system, comprising:
  providing a first part of a radiation channel and a second part of the radiation channel;
  placing a dielectric in between the first part and the second part;
  joining the first part and the second part to form the radiation channel, wherein the radiation channel has a cavity that is filled with the dielectric.

Such a method allows for easy fabrication of the antenna system. The method may be a method to fabricate the antenna system according to the present disclosure. As such, all embodiments and technical effects that are disclosed in connection with the antenna system according to the present disclosure also apply to the method for fabricating the antenna system and vice versa.

According to an embodiment, the first part is provided having a first cavity part adapted to receive the dielectric and/or the second part is provided having a second cavity part adapted to receive the dielectric. The dielectric may be placed within the first cavity part or the second cavity part prior to joining the first and second part for forming the radiation channel. This allows for easy alignment of the dielectric with respect to the first and/or second part.

According to an embodiment, providing of the first and/or the second part comprises forming the first and/or second part by molding, such as by injection molding. This allows for low-cost fabrication of these parts.

According to an embodiment, the first part and/or the second part are provided with a conducting surface, for example with a metal coating. The metal coating then may directly form conducting structures delimiting the radiation channel. For example, the first part and/or the second part may be provided as plastic components that carry the conducting surface. The conducting surface may also be present at contact surfaces of the first part and/or the second part that are located next to each other within the contact region after joining the first and second part. This may prevent leakage of the electromagnetic energy at the contact region.

According to an embodiment, the method comprises providing the dielectric as a solid element, such as a bar or slab. This allows for easy fabrication of the antenna system. The part may be, for example, a rectangular bar having a rectangular cross-section, for example a rectangular cross-section perpendicular to a propagation direction of the radiation channel.

In summary, this document describes techniques, apparatuses, and systems for a dielectric loaded waveguide for low loss signal distributions and small form factor antennas. An apparatus may include an antenna system. The antenna system includes a routing portion having one or more hollow channels; each of the hollow channels is filled with an air dielectric. A feed portion of the antenna system is configured to connect each of the hollow channels to a corresponding channel of a radar chip. The antenna system further includes a waveguide portion including one or more radiation channels corresponding to each of the hollow channels. Each of the radiation channels is loaded with a non-air dielectric, a surface of each of the radiation channels having a pattern of radiation elements that allow EM energy to escape the non-air dielectric.

In another example, an apparatus includes another antenna system. The other antenna system includes a first layer, a second layer, a third layer, and a fourth layer. The first layer includes a feed portion configured to connect a channel of a radar chip to the antenna system. The second layer is adjacent to the first layer and includes a routing portion having a hollow channel configured to hold an air dielectric. The hollow channel is electrically coupled, via the feed portion, to the channel of the radar chip. The third layer is adjacent to a side of the second layer that is opposite the first layer. This third layer includes a first waveguide portion including a radiation channel coupled to the hollow channel, the radiation channel being loaded with a non-air dielectric. The fourth layer is adjacent to a side of the third layer that is opposite the second layer. The fourth layer defines a second waveguide portion including a surface defining a plurality of radiation elements that allow EM energy to escape the antenna system.

In a further example, an apparatus includes yet another antenna system. This antenna system includes a feed portion configured to connect the antenna system to a radar chip, and a waveguide portion. The waveguide portion includes a radiation channel corresponding to a channel of the radar chip. The radiation channel is loaded with a non-air dielectric, and a surface of the radiation channel has a pattern of radiation elements that allow EM energy to escape the non-air dielectric. An absorption channel is paired with the radiation channel. The absorption channel paired with the radiation channel, the absorption channel being loaded with an absorber material, and a surface of the absorption channel having a pattern of absorbing elements that allow unwanted EM reflections near the surface of the radiation channel to be absorbed by the absorber material.

This document also describes methods performed by the above-summarized techniques, apparatuses, and systems, and other methods set forth herein, as well as computer-readable storage media having instructions for causing a processor to perform these methods, in addition to means for performing these methods.

This Summary introduces simplified concepts related to a dielectric loaded waveguide for low loss signal distributions and small form factor antennas, as further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a dielectric loaded waveguide for low loss signal distributions and small form factor antennas are described in this document with reference to the following figures. The same numbers are often used throughout the drawings to reference like features and components:

FIG. 2-1 illustrates an air waveguide including a channel loaded with air;

FIG. 2-2 illustrates a dielectric waveguide including a channel loaded with a non-air dielectric;

FIG. 3-1 illustrates an example air waveguide with an air-filled radiation portion;

FIGS. 3-2 and 3-3 illustrate example dimensions of radiation elements of adjacent radiation portions of the air waveguide from FIG. 3-1;

FIGS. 3-4 and 3-5 illustrate example dimensions of radiation elements of adjacent radiation portions of the air waveguide from FIG. 3-1 after the radiation portion is filled with a non-air dielectric;

FIG. 4-1 illustrates a top down view of an example dielectric loaded waveguide for low loss signal distributions and small form factor antennas, in accordance with techniques, apparatuses, and systems of this disclosure;

FIG. 4-2 illustrates a top down view of another example dielectric loaded waveguide for low loss signal distributions and small form factor antennas, in accordance with techniques, apparatuses, and systems of this disclosure;

FIG. 4-3 illustrates a top down view of a third example dielectric loaded waveguide for low loss signal distributions and small form factor antennas, in accordance with techniques, apparatuses, and systems of this disclosure;

FIG. 5 illustrates a top down view of an example isolation portion of a dielectric loaded waveguide for low loss signal distributions and small form factor antennas, in accordance with techniques, apparatuses, and systems of this disclosure;

FIG. 7-1 illustrates a cross-sectional view of radiation channels of an air waveguide;

FIG. 7-2 illustrates a cross-sectional view of example radiation channels of a dielectric loaded waveguide for low loss signal distributions and small form factor antennas, in accordance with techniques, apparatuses, and systems of this disclosure;

FIG. 7-3 illustrates a cross-sectional view of example radiation channels of a dielectric loaded waveguide for low loss signal distributions and small form factor antennas where the radiation channels are separated by an isolation portion extends to an isolation layer, in accordance with techniques, apparatuses, and systems of this disclosure;

FIG. 11-1 illustrates example antenna patterns of an air waveguide, in the azimuth and elevation planes;

FIG. 11-2 illustrates example antenna patterns of a dielectric loaded waveguide for low loss signal distributions and small form factor antennas, in the azimuth and elevation planes, in accordance with techniques, apparatuses, and systems of this disclosure;

FIG. 12-1 illustrates an example omnidirectional, realized gain radiation pattern of an air waveguide;

FIG. 12-2 illustrates an example omnidirectional, realized gain radiation pattern of a dielectric loaded waveguide for low loss signal distributions and small form factor antennas, in the azimuth and elevation planes, in accordance with techniques, apparatuses, and systems of this disclosure;

FIG. 13-1 illustrates an example radiation portion of a dielectric loaded waveguide for low loss signal distributions and small form factor antennas, in accordance with techniques, apparatuses, and systems of this disclosure;

FIG. 13-2 illustrates another example radiation portion of a dielectric loaded waveguide for low loss signal distributions and small form factor antennas, in accordance with techniques, apparatuses, and systems of this disclosure;

FIG. 13-3 illustrates a top down view of a radar system including an on-chip installation of a dielectric loaded waveguide for low loss signal distributions and small form factor antennas, in accordance with techniques, apparatuses, and systems of this disclosure;

FIG. 13-4 illustrates spurious radiation characteristics of the on-chip installation of the dielectric loaded waveguide illustrated in FIG. 13-3;

FIG. 13-5 illustrates a top down view of a modification done to the radar system illustrated in FIG. 13-3 to include absorption channels in the on-chip installation of a dielectric loaded waveguide for low loss signal distributions and small form factor antennas, in accordance with techniques, apparatuses, and systems of this disclosure;

DETAILED DESCRIPTION

Overview

Figure 1:
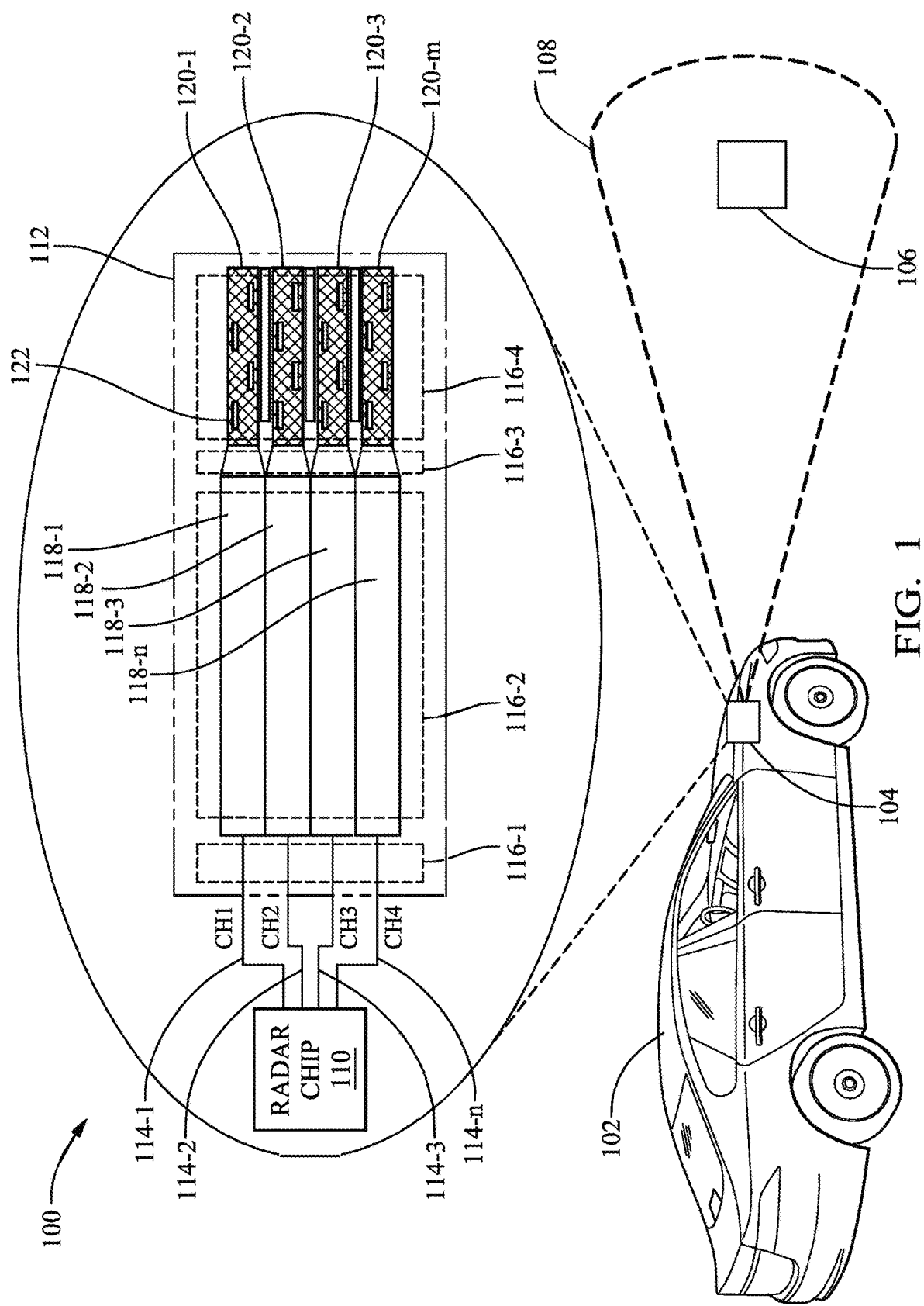
FIG. 1 illustrates an example environment in which a vehicle is equipped with a radar system with a dielectric loaded waveguide for low loss signal distributions and small form factor antennas, in accordance with techniques, apparatuses, and systems of this disclosure.

Radar systems are a sensing technology that some automotive systems rely on to acquire information about a surrounding environment. An antenna is used to direct EM energy or radio frequency signals being transmitted or received and interpreted as radar detections. Multiple antenna elements, arranged in an array can provide increased gain and improved directivity in comparison to a radiation pattern that is achievable with a single antenna element. Signals from the multiple antenna elements are combined with appropriate phases and weighted amplitudes to provide the desired radiation pattern.

A waveguide may be used to transfer electromagnetic energy to and from the antenna elements. The waveguide generally includes an array of radiation slots representing apertures in the waveguide. Manufacturers may select the number and arrangement of the radiation slots to provide the desired phasing, combining, or splitting of electromagnetic energy. For example, the radiation slots are equally spaced at a half-wavelength distance apart in a waveguide surface along a propagation direction of the electromagnetic energy. This arrangement of radiation slots generally provides a wide radiation pattern with relatively uniform radiation in the azimuth plane.

In a driving scenario, a waveguide of an automotive radar system can help to keep outside interference from affecting a radiation pattern being projected in a field of view. Radiation slots in the waveguide permit RF signals, which are within an operating wavelength of the waveguide, to leak from the waveguide; in-frequency EM energy is guided through a waveguide channel. Forming the waveguide with a channel material that has a permittivity or dielectric constant (Dk) more than that of air can reduce its overall size while increasing its robustness and keeping it lightweight; increased EM energy loss inside the waveguide is a drawback of non-air dielectrics. Air waveguides do not suffer from the same EM energy loss as non-air waveguides; however, previously, an air waveguide could not be manufactured small enough to be used in an automotive application. Even though modern manufacturing can produce air waveguides that are as small as non-air dielectric waveguides, existing air waveguides may still be too large, particularly for automotive or other applications where performance, weight, and space constraints are of concern.

This document describes waveguides that use a combination of air dielectric filled channels and non-air dielectric filled channels to obtain beneficial attributes of both air and dielectric waveguides. EM energy loss inside the waveguide compares to a traditional air waveguide. However, with a smaller size than a comparable air waveguide, the example waveguide can occupy less area of a chip or package than a comparable air waveguide of a traditional design. The waveguide has a routing portion with hollow channels filled with an air dielectric. Radiation channels, which may correspond to each of the hollow channels, are loaded with a non-air dielectric. According to the present disclosure, the radiation channels being loaded with the non-air dielectric means that the radiation channels are filled with the non-air dielectric. A surface of each of the radiation channels allows EM energy that is within an operating frequency to escape the non-air dielectric. This surface comprises radiation elements. The described waveguide may be particularly advantageous for use in an automotive context, for example, detecting objects in a roadway in a travel path of a vehicle.

The waveguide makes asymmetrical coverage possible; in addition, manufacturing tolerances for a dividing wall between two radiation channels can be made larger. Increased isolation is realized between two radiation portions because a distance is allowed between them. The resulting waveguide is smaller and therefore lower cost. More directivity and improved side lobe levels are possible because the waveguide can be configured to include a greater quantity of radiator slots in the radiation channels than a quantity of radiator slots in a comparable air waveguide.

This example waveguide is just one example of the described techniques, apparatuses, and systems of a dielectric loaded waveguide for low loss signal distributions. This document describes other examples and implementations.

Operating Environment

FIG. 1 illustrates an example environment 100 in which a vehicle 102 is equipped with a radar system 104 with a dielectric filled waveguide 112 for low loss signal distributions and small form factor antennas, in accordance with techniques, apparatuses, and systems of this disclosure. The radar system 104 may use the waveguide 112 to enable operations of the vehicle 102. A proximity, an angle, or a velocity of an object 106 in the proximity of the vehicle 102 in a field of view 108 may be reported by the radar system 104 in the form of an output of radar data.

Although illustrated as a car, the vehicle 102 can represent or be other types of motorized or automotive vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, the vehicle 102 represents or may be any moving platform, including moving machinery or robotic equipment, that can benefit from having a radar representation of the field of view 108. The vehicle 102 can also include at least one automotive system that relies on data from the radar system 104, including a driver-assistance system, an autonomous-driving system, or a semi-autonomous-driving system. The vehicle 102 may be an automotive vehicle.

The radar system 104 is configured for installation as part of the vehicle 102. The radar system 104 can be a mechanic-replaceable component, part, or system of the vehicle 102, which due to a failure, may need to be replaced or repaired over the life of the vehicle 102. The radar system 104 can include an interface to the automotive systems. The radar system 104 can output, via the interface, a signal based on electromagnetic energy received by the radar system 104. In the depicted environment 100, the radar system 104 is mounted near, or integrated within, a front portion of the vehicle 102 to detect the object 106 and avoid collisions.

The radar system 104 provides a field-of-view 108 towards the object 106. The field-of-view 108 can be projected from any exterior surface of the vehicle 102. For example, vehicle manufacturers can integrate the radar system 104, including the waveguide 112, into a bumper, side mirror, headlights, rear lights, or any other interior or exterior location where the object 106 requires detection. In some cases, the vehicle 102 includes multiples of the radar system 104, such as a first radar system 104 and a second radar system 104 that cooperate to expand a size of the field-of-view 108. In general, vehicle manufacturers position the radar system 104 to provide a precise field-of-view 108 that encompasses a region of interest, including, for instance, in or around a travel lane aligned with a vehicle path. Example fields-of-view 108 include a 360-degree field-of-view, one or more 180-degree fields-of-view, one or more 90-degree fields-of-view, and so forth, which can overlap or be combined into a field-of-view 108 of a particular size. As described above, the described waveguide 112 includes features that provide a radiation pattern with an asymmetrical coverage in the azimuth plane and/or the elevation plane. The radar system 104, when placed near the front corner (e.g., the front left corner) of the vehicle 102 can use an asymmetrical radiation pattern in one plane (e.g., elevation and azimuth) to focus on detecting objects immediately in front of the vehicle (e.g., in the left-hand portion of a travel lane aligned with a vehicle path) instead of objects located toward a side of the vehicle (e.g., in an adjacent travel lane to the vehicle path). For example, the asymmetrical coverage or asymmetrical beam width can concentrate the radiated EM energy within 30 to 90 degrees of a direction following a travel path of the vehicle 102.

Detected in the field of view 108 is the object 106, which is composed of one or more materials that reflect radar signals. Depending on the application, the object 106 can represent a target of interest. In some cases, the object 106 can be a moving object or a stationary object. The stationary objects can be continuous (e.g., a concrete barrier, a guard rail) or discontinuous (e.g. a traffic cone) along a road portion. Moving objects can be any debris, other vehicle, pedestrian, animal, rock, or item that can pose a safety concern for the vehicle 102 as it drives through the field of view 108.

In the environment 100, the radar system 104 can detect and track the object 106 by transmitting and receiving one or more radar signals using the waveguide 112, which is part of an antenna system of the radar system 104. For example, the radar system 104 can transmit electromagnetic signals between 100 and 400 gigahertz (GHz), between 4 and 100 GHz, or between approximately 70 and 80 GHz. The radar system 104 includes a transmitter (not illustrated) and at least one antenna, including the waveguide 112, to transmit electromagnetic signals. The radar system 104 includes a receiver (not illustrated) and at least one antenna, including the waveguide 112, to receive reflected versions of these electromagnetic signals. The transmitter and the receiver can be incorporated together on the same integrated circuit (e.g., a transceiver integrated circuit) or separately on different integrated circuits. The radar system 104 emits electromagnetic radiation by transmitting one or more electromagnetic signals or waveforms via the waveguide 112. The radar system 104 receives electromagnetic radiation by detecting one or more electromagnetic signals or waveforms via the waveguide 112.

The radar system 104 includes one or more processors, including a radar chip 110 (e.g., a radar monolithic microwave integrated circuit or MMIC) electrically coupled to the waveguide 112 via one or more channels 114-1 through 114-n. The channels 114 can by transmit or receive channels, or a combination of transmit and receive channels. The radar chip 110 can be a microprocessor or a system-on-chip; execution of instructions stored on a portion of computer-readable media causes the radar chip 110 to perform a function. Execution of a set of instructions configures the radar chip 110 to transmit and receive radar signals over the channels 114 using the waveguide 112. The radar chip 110, which is also referred to as a device or radar device, is configured to transmit or receive electromagnetic signals via an antenna system including the waveguide 112. The radar chip 110 processes the received signals and outputs radar data that is usable by an automotive system to control the vehicle 102. For instance, the radar chip 110 can determine a distance to the object 106 based on the time it takes for signals to travel from the radar system 104 to the object 106 and from the object 106 back to the radar system 104. The radar chip 110 can also determine the location of the object 106 in terms of an angle based on the direction of a maximum amplitude echo signal received by the radar system 104.

The radar chip 110 executes instructions that configure the radar system 104 to perform radar functions involving the waveguide 112. Although not shown, the radar system 104 further includes computer-readable storage media (CRM) (not illustrated). The radar chip 110 executes instructions stored within the CRM. As an example, the radar chip 110 can control the operation of the transmitter. The radar chip 110 can also process electromagnetic energy received by the waveguide 112 and determine the location of the object 106 relative to the radar system 104. The radar chip 110 can also generate radar data for the automotive systems. For example, the radar chip 110 can control, based on processed electromagnetic energy from the antenna, an autonomous or semi-autonomous driving system of the vehicle 104.

The radar device, which is exemplarily realized by the radar chip 110, may comprise the transmitter to generate the electromagnetic energy transmitted via the waveguide 112 and/or the receiver to analyze the electromagnetic energy received via the waveguide 112.

Automotive systems of the vehicle 102 may use radar data provided by the radar system 104 to perform a function. For example, a driver-assistance system can provide blind-spot monitoring and generate an alert indicating a potential collision with the object 106 detected by the radar system 104. In this case, the radar data from the radar system 104 indicates when it is safe or unsafe to change lanes. The autonomous-driving system may move the vehicle 102 to a particular location on the road while avoiding collisions with the object 106 detected by the radar system 104. The radar data provided by the radar system 104 can provide information about a distance to and the location of the object 106 to enable the autonomous-driving system to perform emergency braking, perform a lane change, or adjust the speed of the vehicle 102.

The waveguide 112 includes at least one layer that can be any solid material, including wood, carbon fiber, fiber glass, metal, plastic, ceramic or a combination thereof. The waveguide 112 may include metal-coated plastic materials. The waveguide 112 may be formed of layers of substrate with grooves and holes to define interior features; the layers can be stacked or otherwise arranged to give the waveguide 112 a particular shape. The waveguide 112 can also include a printed circuit board (PCB). The waveguide 112 is designed to mechanically support and electrically connect components to a dielectric using conductive materials.

The waveguide 112 has a feed portion 116-1, a routing portion 116-2 (also sometimes referred to as a distribution network), a transition portion 116-3, and a waveguide portion 116-4. The feed portion 116-1 is configured to connect each hollow channel 118-1 through 118-*n* of the routing portion 116-2 to a corresponding one of the channels 114. The routing portion 116-2 supports the hollow channels 118; each of the hollow channels 118 is filled with an air dielectric, such as air. The hollow channels 118 form routing channels that are configured to route the electromagnetic energy in between the waveguide portion 116-4 and the radar device formed by the radar chip 110.

The waveguide portion 116-4 includes one or more radiation channels 120-1 through 120-*m* that correspond to each of the hollow channels 118. Each of the radiation channels 120 is loaded with a non-air dielectric, such as a solid dielectric. A surface of each of the radiation channels 120 includes a pattern of radiation elements 122 that allow EM energy to escape the non-air dielectric. The radiation elements 122 provide an opening through a layer or surface of the waveguide 112 through to the non-air dielectric. The radiation elements 122 may include radiation slots within the surface of the waveguide 112. The radiation elements 122 can be horn shaped elements, as will be described further on. Whether a slot, a horn, or other shape, the radiation elements 122 are configured to allow electromagnetic energy to dissipate to the environment 100 from the dielectric loaded in the waveguide channel 112. The waveguide portion 116-4 may form a radiation portion of the waveguide 112.

The transition portion 116-3 is configured to transfer, between the air dielectric of the hollow channels 118 and the non-air dielectric of the radiation channels 116, EM energy that is inside the operating frequency range of the radar chip 110. In other words, the radiation channels 116 capture EM energy to receive radar signals, and the radiation elements 122 leak EM energy back in to the environment 100, which effectively concentrates a radiation pattern to an asymmetrical radiation pattern within the field-of-view 108. Asymmetrical coverage allows the radar system 104 to detect objects 106 in a particular portion of the field-of-view 108 (e.g., immediately in front of the vehicle) but still detect objects 106 in the remaining portion of the field-of-view 108 (e.g., toward the side of the vehicle). As described above, a radar system 104 placed near the front of the vehicle 102 can use an asymmetrical radiation pattern in one plane (e.g., the azimuth plane) to focus on detecting objects 106 immediately in front of the vehicle 102 instead of objects located toward a side of the vehicle 102.

The radiation elements 122 form antenna elements of the waveguide 112. The radiation elements 122 are configured to transduce electromagnetic energy between the individual radiation channels 120-1 through 120-*m* and respective radiation fields of the individual radiation channels 120-1 through 120-*m* within the field-of-view 108.

As can be seen from FIG. 1, the waveguide 112 as a whole constitutes an antenna system of the radar system 104. This waveguide 112 or antenna system is transducing electromagnetic energy between the interior of the individual radiation channels 120-1, 120-2, 120-3, 120-*m* of the antenna system 112 and the environment 100. These individual channels 120-1, 120-2, 120-3, 120-*m* may form antennas of the antenna system 112. The transduced electromagnetic energy may be radiated from radiation channels 120-1, 120-2, 120-3, 120-*m* that act as transmit antennas and/or it may be received by radiation channels 120-1, 120-2, 120-3, 120-*m* that act as receive antennas.

With the waveguide 112 or antenna system, the individual radiation channels 120-1, 120-2, 120-3, 120-*m* and the routing channels 118-1, 118-2, 118-3, 118-*n* form waveguides that guide the electromagnetic energy as waveguide modes. Although the present disclosure denotes the whole antenna system as waveguide 112, the antenna system may thus comprise several waveguides for guiding electromagnetic energy in the form of waveguide modes.

As indicated in FIG. 1, the waveguide 112 or antenna system may comprise several radiation channels 120-1, 120-2. 120-3, 120-*m* that form antennas of the waveguide 112 or antenna system. In general, the waveguide 112 or antenna system may have at least one radiation channel for transducing electromagnetic energy. For example, it may have only a single radiation channel 120-1, 120-2. 120-3, 120-*m*.

The waveguide 112 uses a combination of air dielectric filled in the hollow channels 118 and non-air dielectric filled in the radiation channels 120 to obtain beneficial attributes of both air and dielectric waveguides. EM energy loss inside the waveguide 112 may be similar EM energy loss inside a traditional all-air-dielectric waveguide. However, to obtain a smaller size than the comparable air waveguide, part of the waveguide 112 is filled with a dielectric enabling it to occupy less area of a chip or package than the comparable air waveguide, which uses only air dielectrics. The radiation channels 120 are improved by the non-air dielectric to have emission properties similar to when using air, in radiation features that are larger by comparison in size to the radiation channels 120.

It is well known that all dielectrics come with an associated loss tangent, which governs the EM energy loss incurred in the propagation direction through the dielectric. Because a dielectric is being used only in the radiation portion 116-4 of the waveguide 112, the RF distribution is free from this loss. Advanced antenna design schemes that incorporate a higher quantity of radiation channels 120 can be used to bring up the efficiency lost due to the dielectric. The routing portion 116-4 with the hollow channels 118 filled with an air dielectric enables the waveguide 112 to prevent EM energy loss from inside the waveguide 112. Radiation channels 120 of the waveguide portion 106-4 that correspond to each of the hollow channels 118 are loaded with a non-air dielectric, which reduces the size of the waveguide 112 when compared against an air waveguide with equivalent performing radiation features. A surface of each of the radiation channels 120 allows EM energy to escape and/or enter the non-air dielectric through the radiation elements 122.

Waveguide Theory

Waveguides previously only had limited uses, mostly because their designs ended up too large or too bulky for many practical applications, for example for automotive applications. The antenna systems according to the present disclosure are based on the insight that modern waveguides may have several attributes and offer several opportunities, for example in automotive applications; they are becoming easier to fabricate with advances in manufacturing techniques, waveguides can be designed based on highly studied and well-understood EM theory, and they can help to perform low-loss operations, e.g., to conserve energy, which is a common problem to be solved. Reductions in size can come from replacing the propagation medium, air, in an air waveguide with non-air dielectric materials. Using materials with a permittivity or dielectric constant (Dk) greater than air configures a waveguide to be lightweight and robust, and therefore, more suitable for applications that need an antenna system to be rugged, for instance, when positioned on or close to an exterior surface of the vehicle 102. The EM energy loss experienced from using this dielectric, however, is a trade-off, as explained in FIGS. 2-1 and 2-2.

Figures 1, 2:
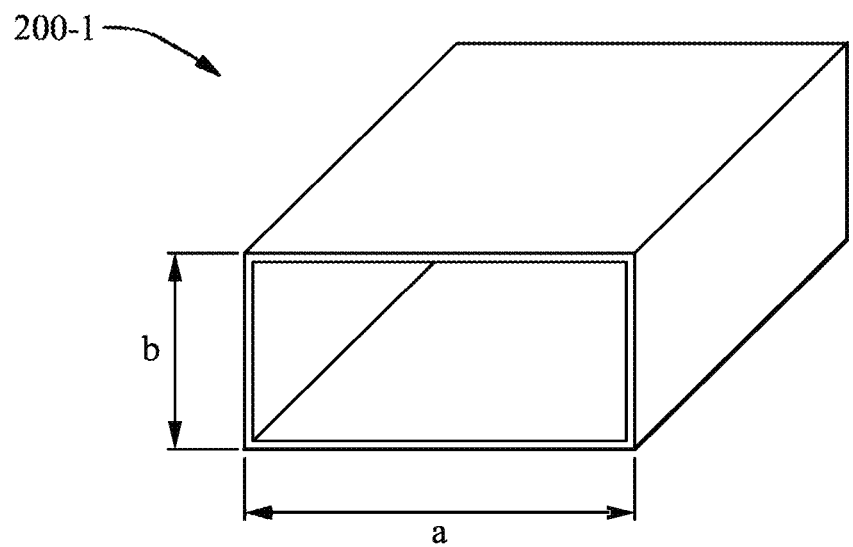
Figure 2:
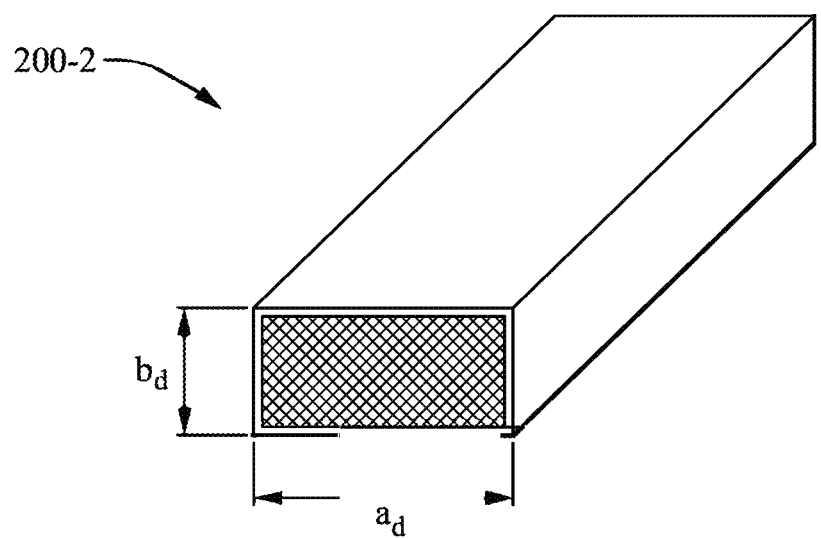

FIG. 2-1 illustrates an air waveguide 200-1 including a channel loaded with air. In contrast, FIG. 2-2 illustrates a dielectric waveguide 200-2 including a channel loaded with a non-air dielectric, for example, a substrate or other material with a Dk more than air. The air waveguide 200-1 is suitable, for example, in the sixty to ninety GHz frequency band. In this regular air-filled waveguide 200-1, the fundamental design parameters are a, which is a broad dimension of the channel in the waveguide 200-1, and b, which is a narrow dimension of the channel. The waveguide 200-1 has an upper-cut-off wavelength λ that is defined by Equation 1:

$$\lambda = 2*a \qquad \text{Equation 1}$$

As defined in Equation 2, the waveguide 200-1 has a lower-cut-off frequency f, where c is the speed of light:

$$f = c/2*a \qquad \text{Equation 2}$$

If $a_0$ is 3.0988 mm, and $b_0$ is 1.5494 mm, for example, the wavelength $\lambda_0$ of the waveguide 200-1 is 3.79 mm. One half the wavelength $\lambda_0$ is $\lambda_0/2$, which equals 1.898 mm.

Turning next to the dielectric waveguide 200-2, the dimensions a and b of the channel can be reduced while still achieving the wavelength λ and the frequency f range of the air waveguide 200-2. These dimensions are reduced by a factor determined by the relative dielectric permittivity $\varepsilon_r$ of the dielectric material used to fill the channel of the dielectric waveguide 200-2. In equation 3, the reduced dimension $a_d$ is:

$$a_d = a/\sqrt{(\varepsilon_r)} \qquad \text{Equation 3}$$

For example, if the relative dielectric permittivity $\varepsilon_r$ is 3, $a_d$ is 1.033 mm. This means that the dielectric waveguide 200-2 is one third (approximately) the size of the air waveguide 200-1.

Figures 1, 3:
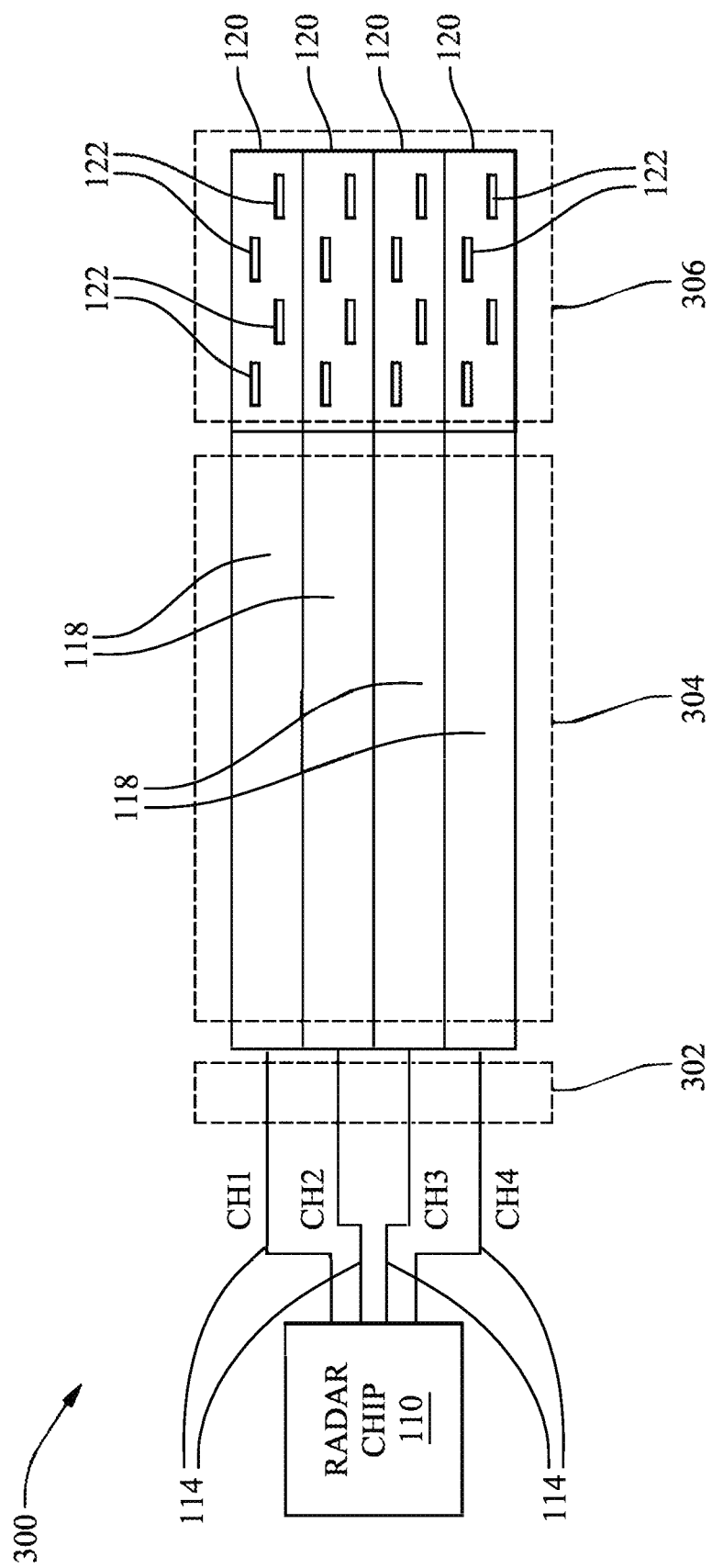

FIG. 3-1 illustrates an example air waveguide 300 with an air-filled radiation portion 306. The air waveguide 300 includes a feed portion 302, a routing portion 304, and the radiation portion 306. For the air waveguide 300, the dimensions are determined based on Equations 1 and 2. At a given operating frequency range (or wavelength), only a limited number of radiation slots can be included in the radiation portion 306 to satisfy waveguide design principles that space the radiation slots at one wavelength λ or one half wavelength λ/2 apart. This simple construction of the air waveguide 300 is advantageous because no EM energy is lost in the radiation portion 306 (which usually one of the largest components in an antenna system). Because space can be limited in some applications, a radar system may provide a limited confined space for the radiation portion 306, which reduces a quantity of radiation slots, thereby limiting the antenna system's far-field energy ability.

FIGS. 3-2 and 3-3 illustrate example dimensions of radiation slots of adjacent radiation portions 306-1 and 306-2 of the air waveguide from FIG. 3-1. The radiation portions 306-1 and 306-2 are examples of the radiation portion 306.

The radiation portion 306-1 includes two radiation channels 120, each a in size and having five radiation elements 122 that are formed as radiation slots. The radiation slots in each of the radiation channels 120 are spaced equally based on one half of the wavelength λ of the operating frequency range. In each of the radiation channels 120, the radiation slots of the radiation channels 120 are sized at the wavelength λ of the operating frequency range.

The radiation portion 306-2 is larger in size than the radiation portion 306-1 to accommodate an increased quantity of radiation slots in each radiation channel 120. The radiation portion 306-2 includes two radiation channels 120, including eleven radiation slots, which is more than the quantity of radiation slots in each of the two radiation channels 120 of the radiation portion 306-1. To maintain a low EM energy loss in this distribution network, air is used as the dielectric fill. The radiation portion 306-2 of the air-filled waveguide 300 is approximately 24 mm length 310, in continuing the previous examples with reference to Equations 1 and 2. A cost of this approach is a resulting waveguide that may be too large for a particular application.

With both radiation portions 306-1 and 306-2, the individual radiation elements 122 are spaced along the propagation direction by a distance 312 that amounts to half the wavelength λ in air at the operating frequency, which operating frequency exemplarily amounts to 76.5 GHZ. Furthermore, the radiation elements 122 have a length 314 that also corresponds to half the wavelength λ in air at the operating frequency.

Figures 1, 4:
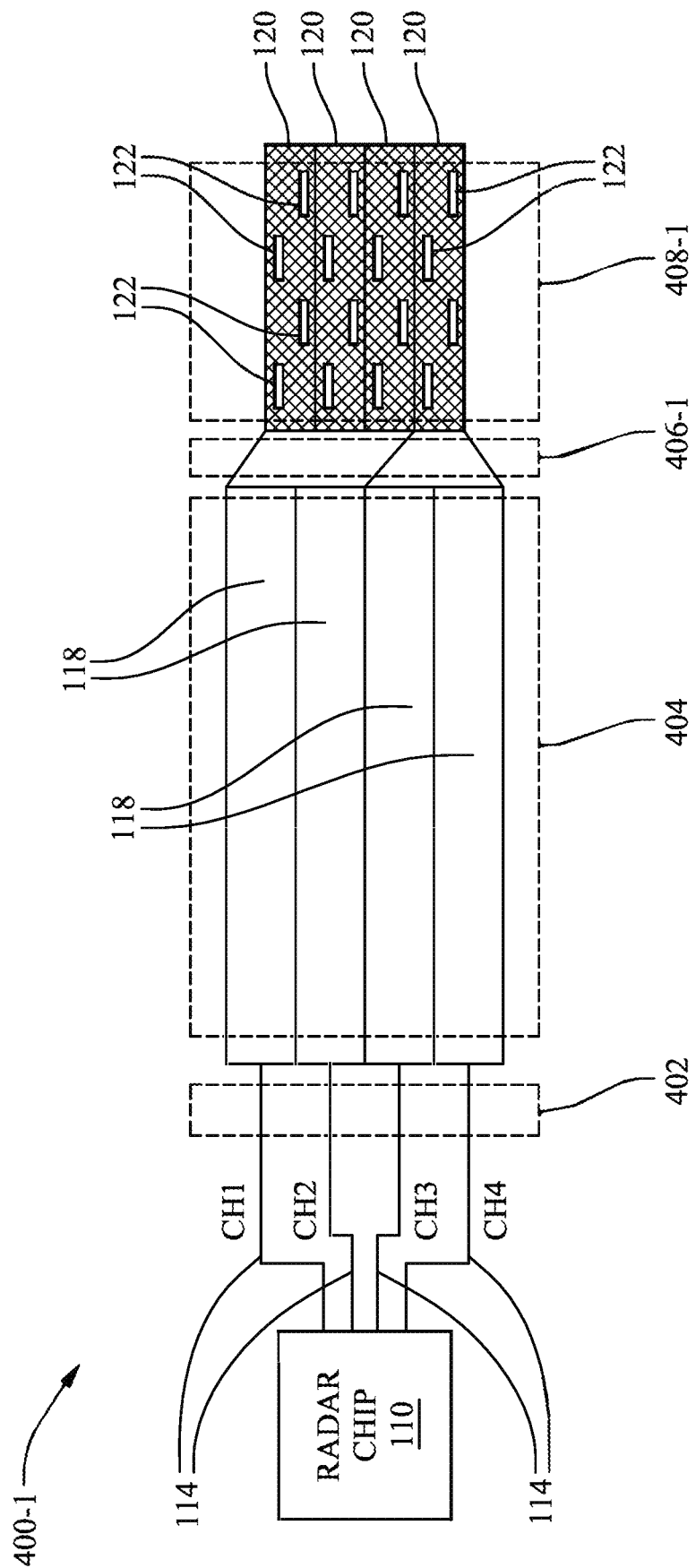
Figures 2, 4:
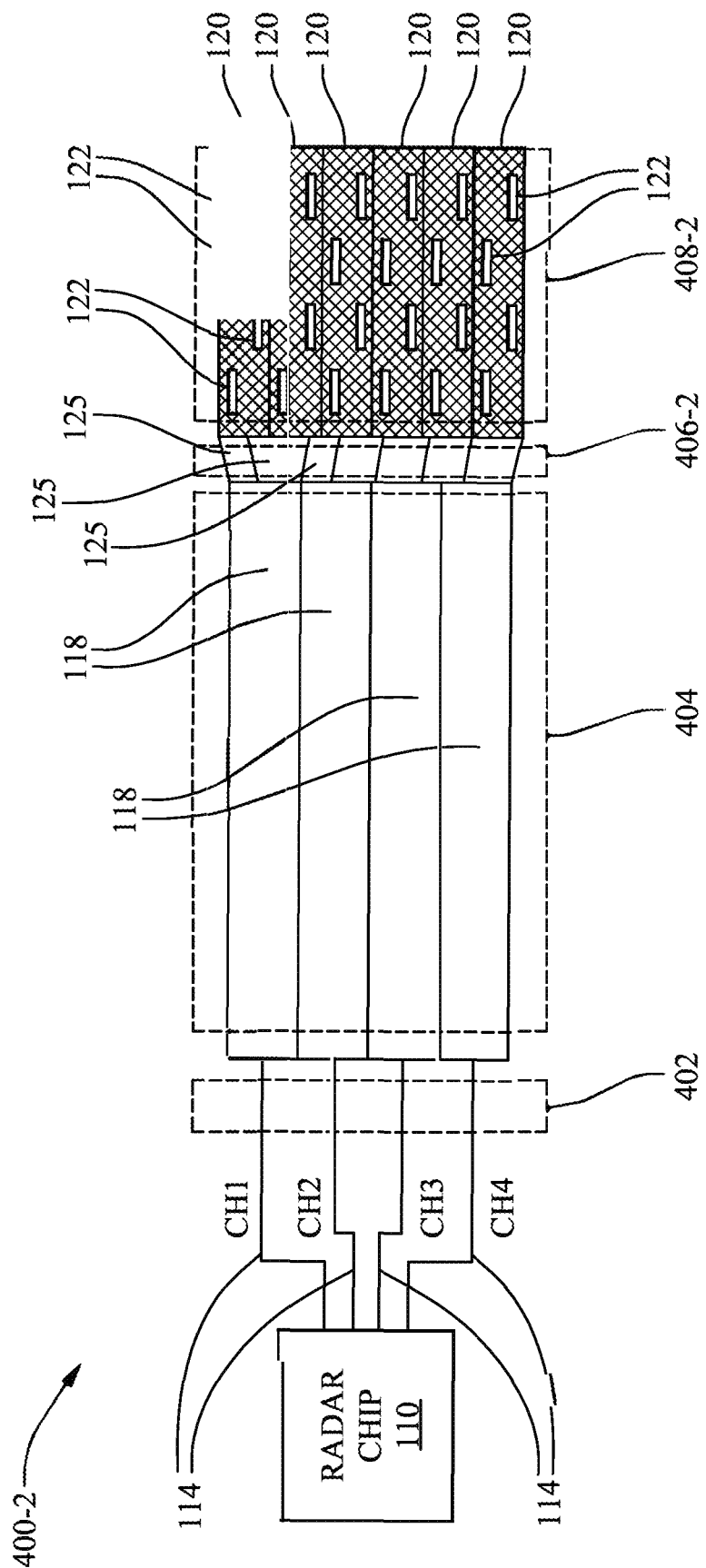
Figures 3, 4:
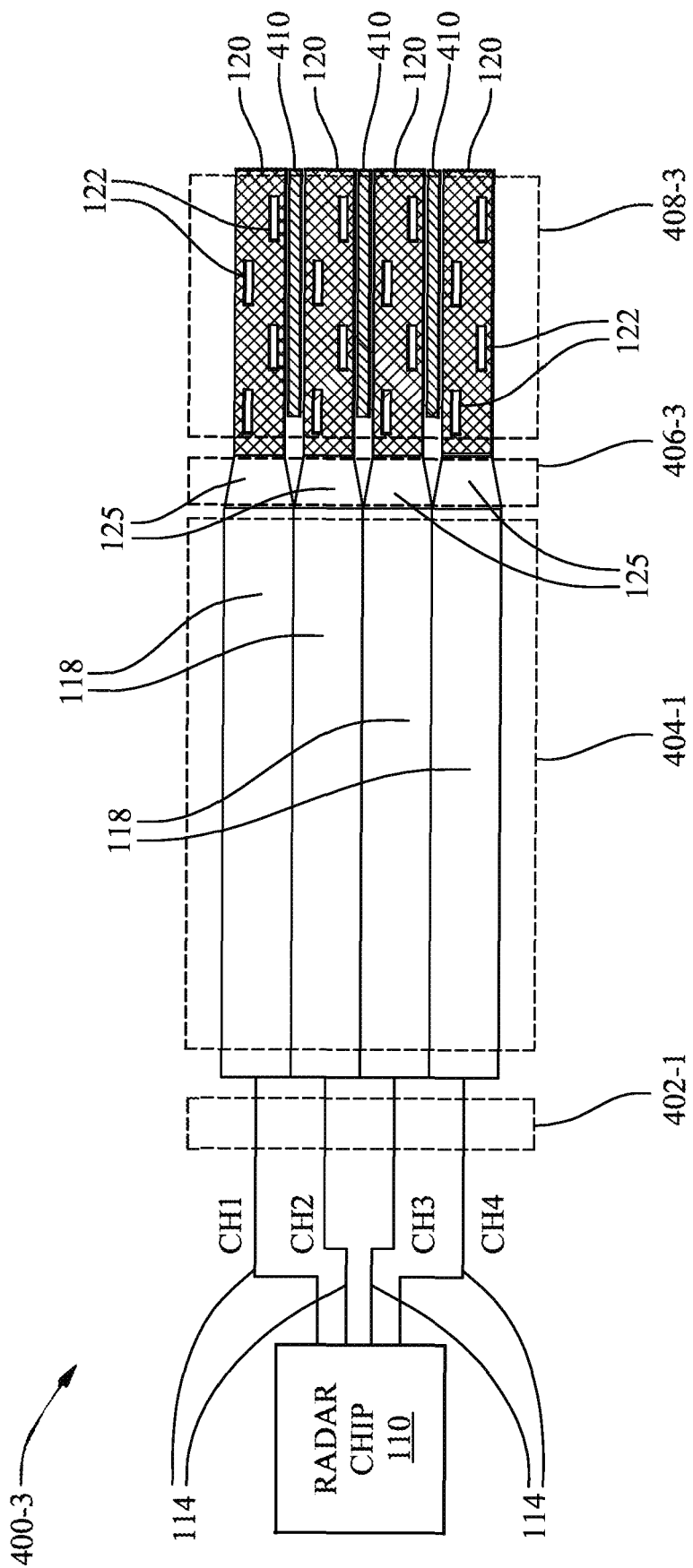
Figure 5:
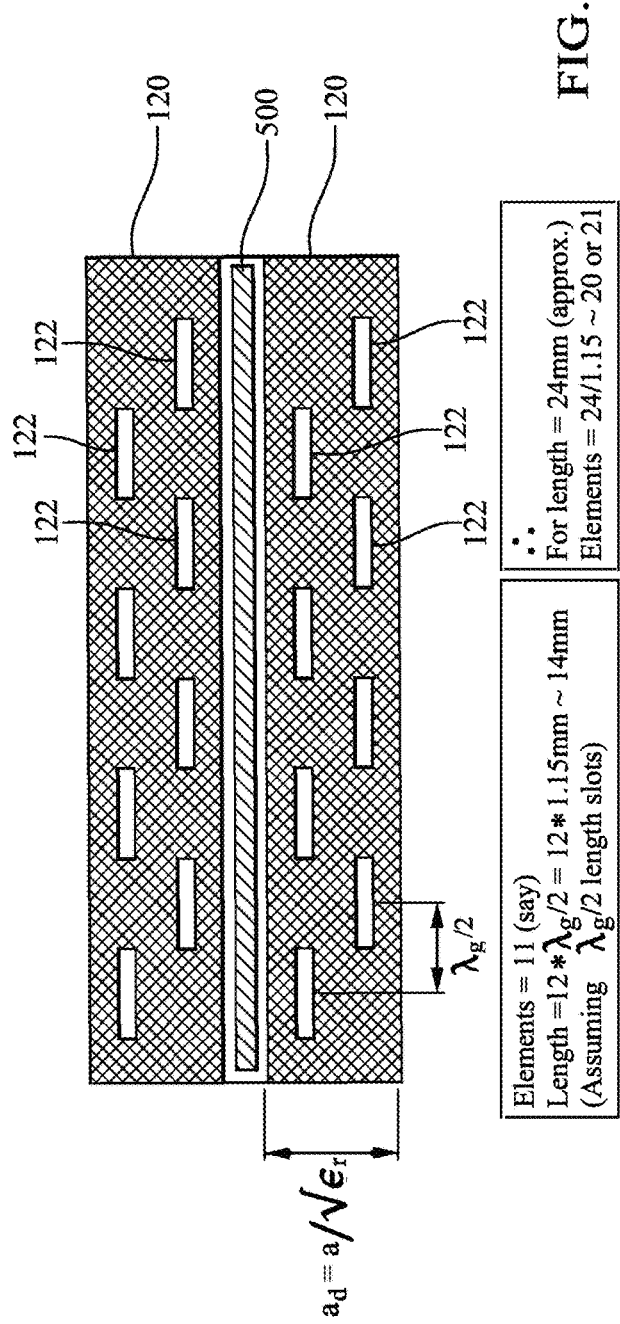

FIGS. 3-4 and 3-5 illustrate example adapted dimensions of radiation slots 122 of adjacent radiation channels 120 of the air waveguide from FIG. 3-1 after the radiation portion 306 is filled with a non-air dielectric at least within the radiation channels 120. Radiation portions 306-3 and 306-4 are examples of the radiation portion 306. The radiation slots 122 in each of the radiation portions 306-3 and 306-4 are spaced equally based on one half of the wavelength $\lambda_g$ of the operating frequency range. In each of these radiation portions 306-3 and 306-4, the radiation slots are sized at the wavelength $\lambda_g$ of the operating frequency range. In the following example, the dimensions of the radiation portion 306-1 are compared to the dimensions of the radiation portion 306-3, and the dimensions of the radiation portion 306-2 are compared to the dimensions of the radiation portion 306-4.

Due to the dielectric filled within the radiation channels 120 of radiation portions 306-3 and 306-4, the wavelength $\lambda_g$ at the operating frequency is reduced by a factor $\sqrt{\varepsilon_r}$, within these radiation channels 120 compared to the wavelength $\lambda$ within the air-filled radiation channels 120 of the radiation portions 306-1 and 306-2, wherein $\varepsilon_r$ is the relative permittivity of the dielectric. The dielectric placed within the radiation portions 306-3 and 306-4 exemplarily has a relative permittivity $\varepsilon_r$ of approximately 3, such as 3.

The radiation portion 306-3 includes two radiation channels 120, each da in transverse size and having eight radiation slots. The dielectric filled radiation portion 306-3 appears to be approximately the same size as the radiation portion 306-1, which is filled with air. However, the radiation portion 306-3 is able to accommodate eight radiation slots as opposed to only five, which may improve beam forming and focusing the field of view 108.

The radiation elements 122 of the radiation channels 120 have a length 314 that amounts to half the reduced wavelength $\lambda_g$ and are spaced at a distance 312 that also amounts to half the reduced wavelength $\lambda_g$. The radiation channels 120 of the radiation portion 306-3 each have a length 310 that is approximately equal to the length 310 of the radiation channels 120 of the radiation portion 306-1 shown in FIG. 3-2. However, due to the reduced wavelength $\lambda_g$ within the dielectric and the reduced length 314 of and distance 312 in between the radiation elements 122, the radiation channels 120 of the radiation portion 306-3 are configured to accommodate a larger number of radiation elements 122 than the air-filled radiation channels 120 of the radiation portion 306-1.

The length 310 of the radiation channels 120 of the radiation portion 306-3 amounts to an integer multiple of half the wavelength $\lambda_g$ and the length 310 of the radiation channels 120 of the radiation portion 306-1 amounts to an integer multiple of half the wavelength $\lambda$. The length 310 of the radiation channels 120 of the radiation portion 306-3 being approximately equal the length 310 of the air-filled radiation channels 120 of the radiation portion 306-1 means that the length 310 of the radiation channels 120 of the radiation portion 306-3 equals the length 310 of the air-filled radiation channels 120 of the radiation portion 306-1 up to a difference that smaller than half the wavelength $\lambda_g$. This difference amounts to the difference between the length 310 of the air-filled radiation channels 120 of the radiation portion 306-1 and the nearest integer multiple of half the reduced wavelength $\lambda_g$.

The radiation portion 306-4 also includes two radiation channels 120, each ad in transverse size and having eleven radiation slots 122, which is the same pattern of radiation slots 122 as in the radiation portion 306-2. The dielectric filled radiation portion 306-4 is however clearly smaller than the size of the radiation portions 306-2, which is filled with air, by a factor of the square-root of the relative dielectric permittivity $\varepsilon_r$. For example, the radiation channels 120 of the radiation portion 306-4 may have a length 310 of about 14 mm. This reduction in length 310 results from the radiation slots 122 having a smaller length 312 and a smaller spacing distance 314, both of which amount to half the reduced wavelength $\lambda_g$.

The radiation portion 306-3 shows that for the same length as the radiation portion 306-1, a waveguide filled with a dielectric having a dielectric permittivity larger than air can have far more radiation slots 122 than a waveguide filled with air, thereby helping to achieve a far-field pattern that can be shaped accordingly. As further can be seen from FIGS. 3-3 and 3-5, when keeping the number of radiation elements 122 constant, the waveguide 306-4 filled with the dielectric having a dielectric permittivity larger than air may be configured smaller in size, such as smaller in length 315 and/or smaller in width, than the waveguide 306-2 filled with air.

Detailed Waveguide Designs

FIGS. 4-1 to 4-3 illustrate different examples of a dielectric loaded waveguide for low loss signal distributions and small antenna size. FIG. 4-1 illustrates a top down view of an example dielectric loaded waveguide 400-1, as one example of the waveguide 112 from FIG. 1. FIG. 4-2 illustrates a top down view of another example dielectric loaded waveguide 400-2, as another example of the waveguide 112 from FIG. 1. FIG. 4-3 illustrates a top down view of a third example dielectric loaded waveguide 400-3, which is a third example of the waveguide 112. The waveguides 400-1, 400-2, and 400-3 are only some examples of the waveguide 112; other variations of the waveguide 112 are possible through mixing and matching features of the waveguides 400-1, 400-2, or 400-3 to achieve a desired radiation effect. This applies to all examples of the waveguide 112, as described herein; the different examples and embodiments can be mixed and matched by further applying EM design theory to combine their attributes to achieve a desired antenna pattern.

The waveguide 400-1 includes a feed portion 402, a routing portion 404, a transition portion 406-1, and a radiation portion 408-1. The routing portion 404 includes multiple hollow channels 118, which constitute routing channels of the routing portion 404. However, the radiation portion 408-1 is loaded with non-air dielectric material. This combination of air and non-air dielectric materials in the propagation path of the waveguide 400-1 enables it to have a smaller size and nearly as low EM energy loss as that of the waveguide 300. By partially loading the waveguide 400-1 with a dielectric while keeping a remaining part filled with air, the size of the waveguide 400-1 can be greatly reduced, in comparison to the waveguide 300. The radiation portion 408-1 of the waveguide 400-1 is smaller, for example in length and/or width, than the radiation portion 306 of the waveguide 300 by a factor of the square-root of the relative dielectric permittivity used to fill the waveguide 400-1.

Another property of the waveguide 400-1 is evident when compared to the waveguide 300; even though each has a quantity of four radiation elements 122 shown in each radiation channel 120, the four radiation elements 122 occupy less space (e.g., less area, less volume) when the radiation portion 408-1 is filled with a dielectric material, instead of air. In terms of the size that is reduced by the dielectric-filled radiation portion 408-1, this size may be a maximum length of the radiation channels 120 of the radiation portion 408-1. The corresponding size of the air waveguide 300 is, therefore, a maximum length of the radiation channels 120 of the radiation portion 306. This size may also be a maximum area or volume of the radiation channels 120 of the radiation portion 408-1. The corresponding size of the air waveguide 300 may, therefore, be a maximum area or volume of the radiation channels 120 of the radiation portion 306. In this way, a size of the radiation channels 120 of the radiation portion 408-1 is, therefore, less than a corresponding size of one or more radiation channels 120 of the air waveguide 300, which is configured to allow an equivalent amount of EM energy to escape from an air dielectric through radiation slots 122 in the radiation portion 306.

The top down view illustrated in FIG. 4-2 includes the waveguide 400-2, which includes a transition portion 406-2 and a radiation portion 408-2. The waveguide 400-2, when compared to the waveguide 300, fits within a same size (e.g., length, area, volume) portion of an antenna board. The waveguide 400-2, however, includes a greater quantity of radiation elements 122 in the radiation portion 408-2. Said differently, a quantity of radiation elements 122 in the pattern of radiation slots of each of the radiation channels 120 in the radiation portion 408-2 is greater than a quantity of radiation slots 122 in a pattern of radiation slots 122 of each radiation channel 120 of the waveguide 300, which is configured to allow an equivalent amount of EM energy to escape from the radiation channels 120 as the EM energy that is allowed to escape the radiation slots 122 of the radiation portion 306. Increasing a quantity of radiation elements 122 in a portion of an antenna board that is occupied by the radiation channels 120 may increase the radiated far-field energy that can be effectively controlled for better radiation characteristics (e.g., side lobe levels).

As it is illustrated in FIG. 4-2, the increase in radiation elements 122 may be due to an increase in radiation channels 120 connected to the routing channels 118. Alternatively or additionally, the increase in radiation elements 122 may also be due to a larger number of radiation elements 122 per radiation channel 120.

Unlike the radiation portion 408-1, there is no one-to-one correspondence between the hollow channels 118 of the routing portion 404 and the radiation channels 120 of the radiation portion 408-2. A quantity of the radiation channels 120 in the waveguide 400-2 is greater than a quantity of the hollow channels 118, and in the waveguide 400-1, the quantity of radiation channels 120 is equal to the quantity of hollow channels 118. Depending on specific application of the radar system 104, a ratio of hollow channels 118 to radiation channels 120 of the waveguides 112, 400-1, 400-2, and 400-3 may vary.

Like the transition portion 116-3, the transition portions 406-1 and 406-2 are configured to transfer, between the air dielectric of the hollow channels 118 in the routing portion 404 and the non-air dielectric of the radiation channels 120 in the radiation portions 408-1 and 408-2, EM energy that is inside the operating frequency range of the radar chip 110. The transition portions 406-1 and 406-2 are shown having multiple sections 125. Each section 125 of the transition portions 406-1 and 406-2 is specifically tuned to permit a precise portion of the EM energy to be transferred through the propagation path. The transition portions 406-1 and 406-2 are configured to distribute the EM energy to cause a desired radiation pattern and radiation effect at the radiation portions 408-1 and 408-2, where EM energy is allowed to escape from the radiation elements 122. In this example, a quantity of the radiation channels 120 is greater than or equal to a quantity of the hollow channels 118. This permits even greater flexibility in beamforming as there are more radiators 120 than channels 118. The sections 125 form transition sections of the transition portion 116-3, 406-1, 406-2.

The technical effect of allowing for a larger density of radiation elements 122 within the radiation portions 408-1, 408-2, 408-3 by loading the radiation channels 120 with a dielectric with a relative permittivity larger than one is independent of the configuration of the transition portion 116-3, 406-1, 406-2. This also applies to all other transition sections of the present disclosure.

In the top down view of FIG. 4-3, the waveguide 402-3 includes a transition portion 406-3 that transfers EM energy in the propagation path of the waveguide 402-3 from the routing portion 404 and into a radiation portion 408-3. The radiation portion 408-3 includes at least one pair of radiation channels 120 separated by an isolation portion 410, which is an optional feature to improve the radiation pattern. The isolation portion 410 is configured to prevent interference between a first radiation channel 120 and a second radiation channel 120 from the pair of radiation channels 120 that surround it by absorbing spurious portions of the EM energy reflected from various structures surrounding the radiation channels 120 within the radar sensor and by absorbing interfering currents that are allowed to escape each of the first and second radiation channels 120 to enable the system to positively influence a final radiation pattern.

In general, the isolation portion 410 may be arranged in between two adjacent radiation channels 120 of the radiation portion 408-3. In some examples, the isolation portion 410 is arranged between two adjacent radiation channels 120 of the radiation portion 408-3 that are associated with two different hollow channels 118 from the routing portion 404. In other examples, the isolation portion 410 is arranged between two adjacent radiation channels 120 of the radiation portion 408-3 that are associated with a same hollow channel 118 from the routing portion 404. Regarding placement of the isolation portion 410 between a first and second radiation channel 120, the first radiation channel 120 and the second radiation channel 120 may correspond to a same one of the hollow channels 118, or the first radiation channel 120 and the second radiation channel 120 may correspond to different hollow channels 118.

FIG. 5 illustrates a top down view of an example isolation portion 500 of a dielectric loaded waveguide for low loss signal distributions and small form factor antennas, in accordance with techniques, apparatuses, and systems of this disclosure. The isolation portion 500 is an example of the isolation portion 410. The isolation portion 500 includes an embedded absorbing filament (e.g. Polylactic acid (PLA), High Impact Polystyrene (HIPS)); this enables the isolation portion 500 to absorb EM energy that is allowed to escape from the radiation portion 408-3. By absorbing spurious EM energy, the isolation portion 500 may positively influence a final radiation pattern.

Figure 6:
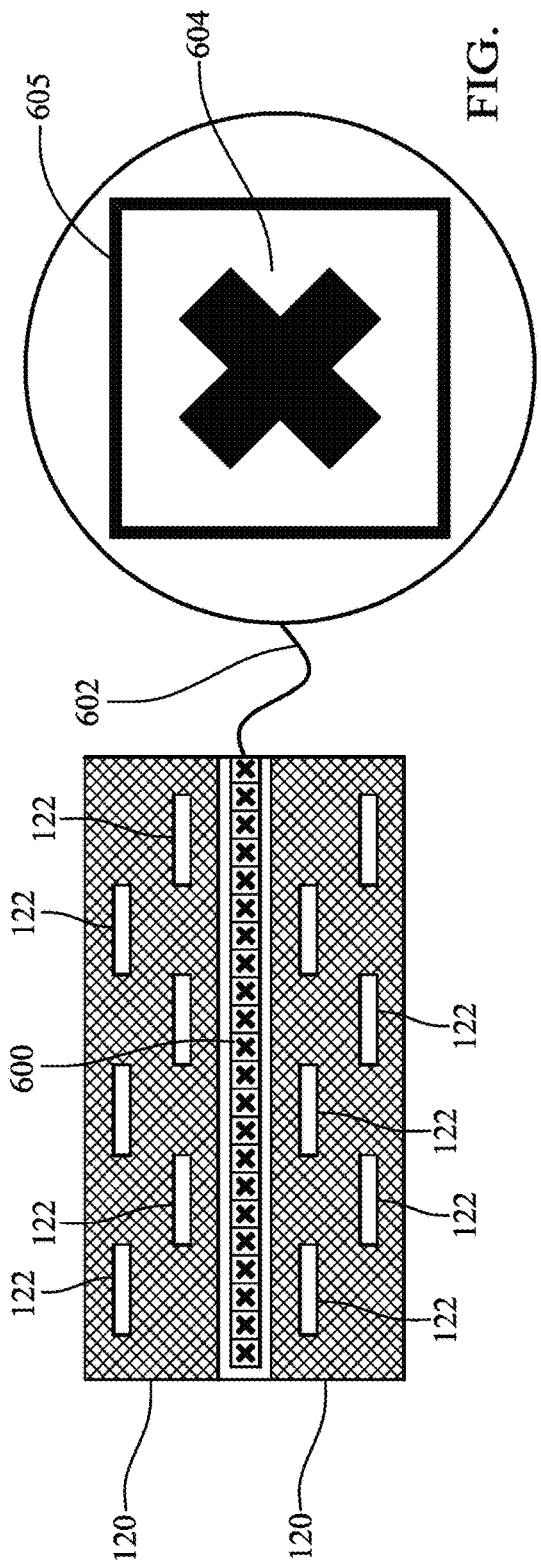
FIG. 6 illustrates a top down view of another example isolation portion of a dielectric loaded waveguide for low loss signal distributions and small form factor antennas, in accordance with techniques, apparatuses, and systems of this disclosure.

FIG. 6 illustrates a top down view of another example isolation portion 600 of a dielectric loaded waveguide for low loss signal distributions and small form factor antennas, in accordance with techniques, apparatuses, and systems of this disclosure. The isolation portion 600 is an example of the isolation portion 410. The isolation portion 600 includes a meta-material absorbing substrate configured to absorb, within a plurality of meta-material structures 602 that are internal to the isolation portion 600, spurious EM energy that is allowed to escape the radiation channels 120. By absorbing spurious EM energy, the isolation portion 600 may positively influence a final radiation pattern.

The meta-material structures 602 comprise a metallic structure 604 placed on top of an absorbing substrate 605. The metallic structure 604 is exemplarily shaped as a cross-shaped cutout in a quadratic piece of metal. The metallic structure 604 may, for example, be made from copper. The dimensions of the metallic structure 604 are adapted for reception of electromagnetic energy having predetermined radiation properties, such as frequency, incident angle or the like. After reception, this electromagnetic energy is subsequently absorbed within the substrate 605.

Figures 1, 7:
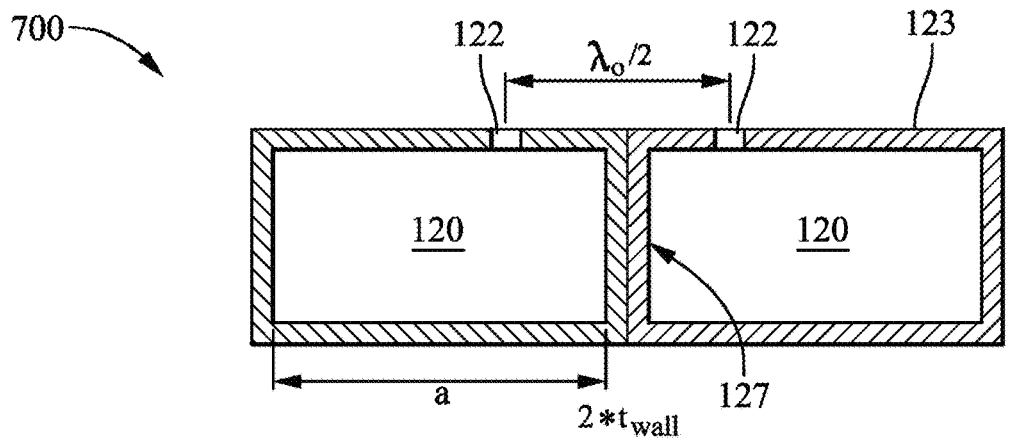
Figures 2, 7:
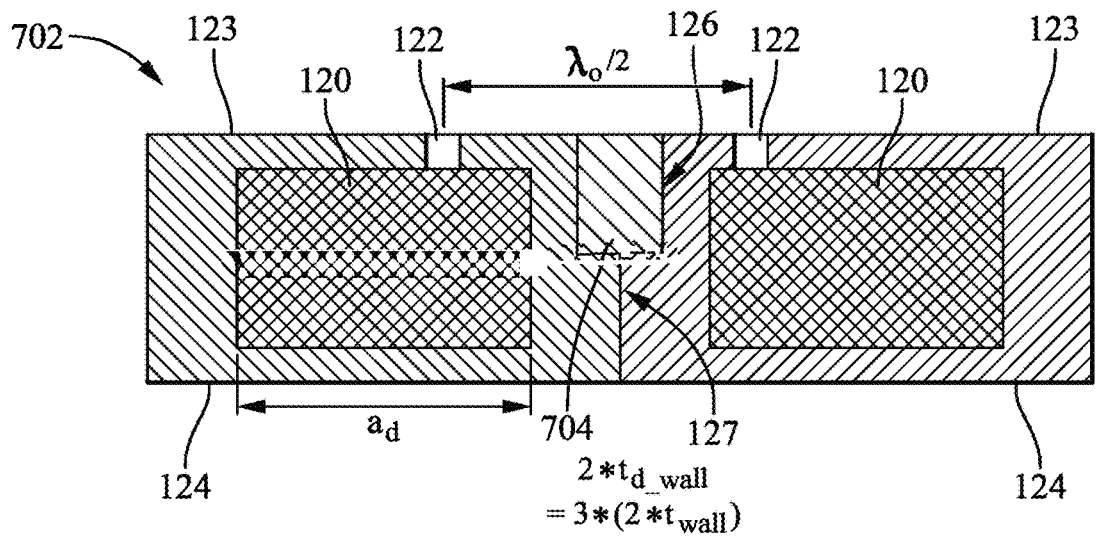
Figures 3, 7:
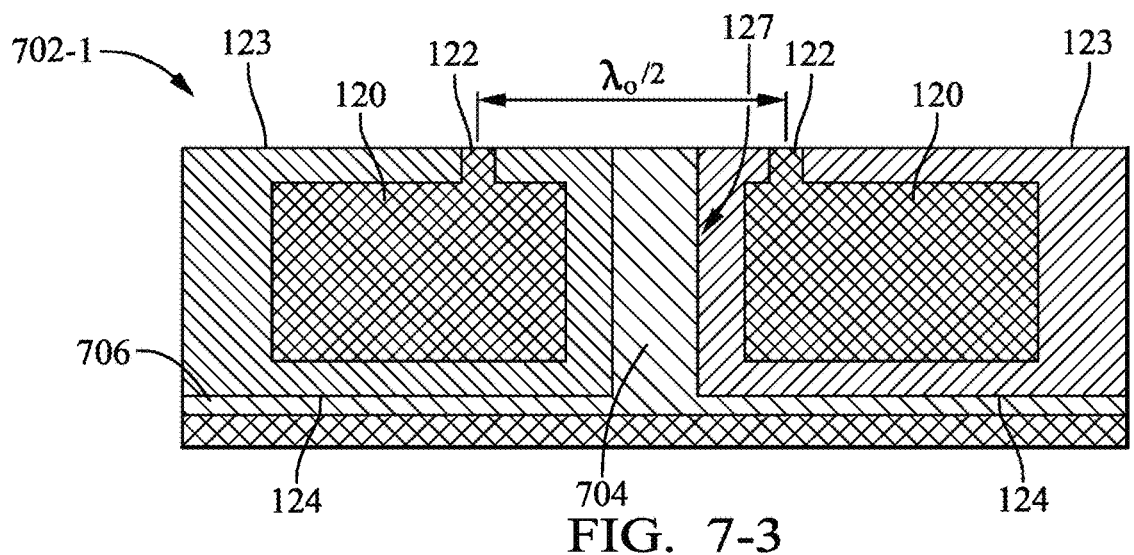

FIG. 7-1 illustrates a cross-sectional view of radiation channels 120 of an air waveguide 700. In contrast to FIG. 7-1, FIG. 7-2 illustrates a cross-sectional view of example radiation channels 120 of a dielectric loaded waveguide 702 for low loss signal distributions and small form factor antennas, in accordance with techniques, apparatuses, and systems of this disclosure. For the purpose of this example, consider: $\lambda_0$ to represent free space wavelength, a to represent the broadside dimension of the air filled waveguide 700, $t_{wall}$ is the wall thickness of the air filled radiation channels 120 of the waveguide 700, da is the broadside dimension of the dielectric filled waveguide 702, and $t_{d\_wall}$ is the wall thickness of the waveguide 702 with dielectric filled radiation channels 120.

The air waveguide 700 includes two adjacent radiation channels 120 with a pattern of radiation slots 122 through a top surface 123. The radiation slots 122 are separated by one half of the free-space wavelength $\lambda_0$. In the air waveguide 700, the radiation channels 120 each have a wall thickness $t_{wall}$. An adjoining wall 127 positioned between the two radiation channels 120 is therefore twice the wall thickness $t_{wall}$.

The waveguide 702 is an example of the waveguide 112. The radiation channels 120 of the waveguide 702 are separated by an adjoining wall 127 that is six times as thick as an outside wall of a first radiation channel 120 and six times as thick as an outside wall of a second radiation channel 120. The patterns of radiation elements 122 of the radiation channels 120 are separated by one half a wavelength $\lambda$ of an operating frequency. The radiation 120 channels of the waveguide 702 are separated by an adjoining wall 127 that is twice as thick as an outside wall of each of the radiation channels 120. By filling the radiation channels 120 of the waveguide 702 with a dielectric, the radiation channels 120 of the waveguide 702 can have a greater wall thickness $t_{wall}$ than the waveguide 700. More specifically, using a dielectric fill with a relative permittivity $\varepsilon_r$ of three, the estimated thickness of the adjoining wall between the radiation channels 120 of the waveguide 702 can be three times thicker than the adjoining wall 127 arranged between the radiation channels 120 of the air waveguide 700. This increase in wall thickness is significant for reducing manufacturing costs because the waveguide 702 is easier to produce with a thicker wall than with a thin wall. This allows for greater case in manufacturing, particularly when using metallized plastic, brazed aluminum, or injection-molded plastics. Often times, a part that goes into a vehicle such as the waveguide 702 is manufactured in large lots (e.g., hundreds of thousand, millions); casing manufacturability allows the waveguide 702 to be manufactured much easier than if the walls were thinner. In addition, the radiation elements 122 of the waveguide 702 can be made to be closer to the outside walls of the radiation channels 120, i.e., away from a center axis, which enables the waveguide 702 to radiate a greater amount of power.

Included as an optional feature, an isolation portion 704 similar to the isolation portion 410 projects, partly through the surface 123 of the radiation channels 120 and into the adjoining wall 127. The isolation portion 704 absorbs EM energy that escapes the radiation channels 122 within an absorbing material or absorber material filled within a cavity 126 of the adjoining wall 127. This provides similar benefits to the isolation portion 410, in that a more precise radiation pattern can be achieved.

As can be seen from FIG. 7-2, the thickness of the adjoining wall 127 of two radiation channels 120 filled with the dielectric may be larger than the thickness of the adjoining wall 127 of two air-filled radiation channels 120. Outside walls of the radiation channels 120 filled with the dielectric may then have a thickness that is half the thickness of the adjoining wall 127. The outside walls may also have a thickness that is less than half the thickness of the adjoining wall 127. For example, the outside walls may have a thickness that is at most a sixth of the thickness of the adjoining wall 127.

With the dielectric loaded waveguide 702, the lateral distance between the radiation elements 122 of the neighboring radiation channels 120 amounts to half the free-space wavelength $\lambda_0$, as it is also the case for the air waveguide 700 shown in FIG. 7-1. The distance of half the free-space wavelength $\lambda_0$ is adapted to the propagation properties of the electromagnetic energy in the radiation field of the antenna system, which is located in free space. Due to the reduced broad dimension aa of the radiation channels 120 that are filled with the dielectric, the distance between the radiation channels 120 and thus also the thickness of the adjoining wall 127 is larger with the radiation channels 120 filled with the dielectric than with air-filled radiation channels 120.

FIG. 7-3 illustrates a cross-sectional view of example radiation channels 122 of a dielectric filled waveguide 702-1 for low loss signal distributions and small form factor antennas where the radiation channels 120 are separated by an isolation portion 704 that extends to an isolation layer 706, in accordance with techniques, apparatuses, and systems of this disclosure. The waveguide 702-1 is an example of the waveguide 702. The isolation portion 704 in the waveguide 702-1 extends to the isolation layer 706 that is arranged beneath the radiation channels 120. The isolation layer 706 is configured to absorb the spurious EM energy that is absorbed by the isolation portion 704. The isolation layer 706 is adjacent to a surface 124 of the radiation channels 120 that is opposite the surface 123 of the radiation channels 120 that includes the radiation elements 122. For example, arranged in a top surface 123 of the radiation channels 120 are radiation elements 122. Arranged beneath a bottom surface 124 of the radiation channels 120 is the isolation layer 706. The isolation layer 706 is an extension of the isolation portion 704 and draws EM energy absorbed from between the radiation channels 120 down beneath the waveguide 702-1 to minimize interference.

Figure 8:
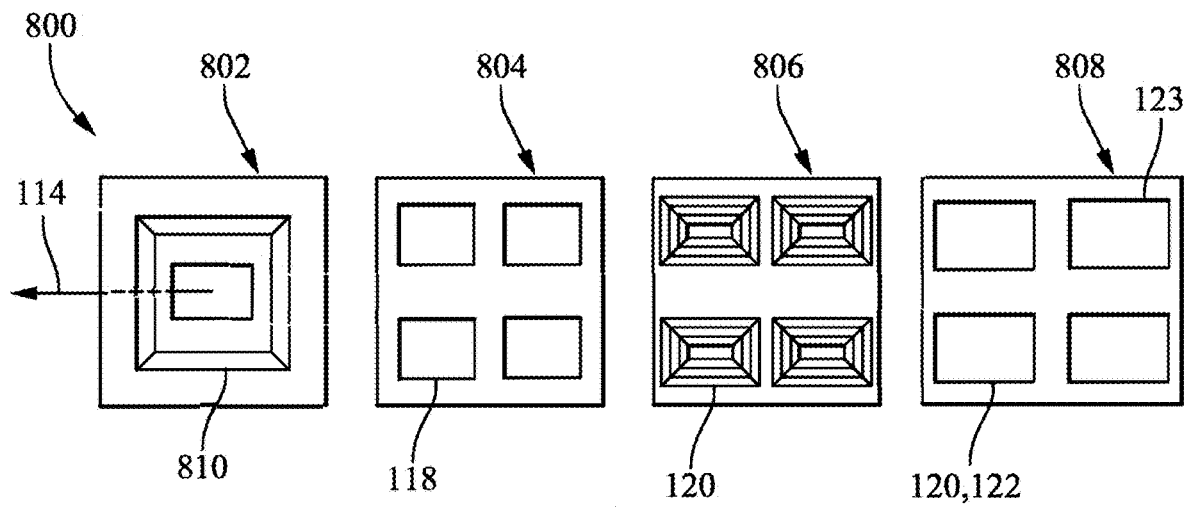
FIG. 8 illustrates a stack of parallel layers of a dielectric loaded waveguide for low loss signal distributions and small form factor antennas, in accordance with techniques, apparatuses, and systems of this disclosure.

FIG. 8 illustrates a stack of parallel layers of a dielectric loaded waveguide 800 for low loss signal distributions, in accordance with techniques, apparatuses, and systems of this disclosure. Instead of a two-dimensional waveguide that grows in a longitudinal and lateral direction, the waveguide 800 is a three-dimensional antenna that also has depth or height. Some advantages of such a configuration include low loss RF power distribution, small radiation channels (e.g., horns), and an overall smaller antenna size that does not only expand in the longitudinal and lateral direction but also in depth or height, enabling more antenna features to fit within the same footprint as a two-dimensional antenna system.

The waveguide 800 is also part of an antenna system. A first layer 802 of the waveguide 800 has a feed portion configured to connect the channels 114 of the radar chip 110 to the waveguide 800. The first layer 802 may be considered a bottom layer that is fed from underneath. The feed portion is configured to connect the channel 114 of the radar chip 110 to the antenna system at a bottom surface of the first layer 802 that is opposite a second layer 804. Surrounding the feed portion of the first layer 802 is a three-dimensional groove or cavity 810 carved in the first layer 802 to illuminate hollow channels 118 on the next layer, that is the second layer 804.

The second layer 804 is adjacent to, namely on top of, the first layer 802. The second layer 804 includes a routing portion having a hollow channel 118 configured to hold an air dielectric and which exemplarily is filled with an air dielectric, such as air. This hollow channel 118 is electrically coupled, via the feed portion, to the channels 114 of the radar chip 110. The second layer 804 directs power using the hollow channels 118; because of the air dielectric fill is used as a propagation medium, the hollow channels 118 exhibit very low EM energy loss. The second layer 804 may further include a transition portion configured to transfer EM energy between the air dielectric of the hollow channel 118 and the non-air dielectric of a radiation channel 120.

A third layer 806 is adjacent to a side of the second layer 804 that is opposite the first layer 802. Thereby, the third layer 806 is placed on top of the second layer 804. The third layer 806 includes a first waveguide portion including a radiation channel 120 coupled to the hollow channel 118 of the second layer 804. The radiation channel 120 includes a cavity of the third layer 806 that is filled or loaded with a non-air dielectric. The cavity of the third layer 806 has a shape that extends from the second layer 804, through the third layer 806, and up to a fourth layer 808.

The radiation channels 120 in the third layer 806 and radiation channels within it can have a variety of shapes, including shapes that have a height and not just a length or width. In FIG. 8, the radiation channels 120 in the third layer 806 are horn shaped and filled with the non-air dielectric material. These horns are illuminated by the hollow channels 118 at the second layer 804; in addition, being filled with the dielectric material enables them to be much smaller in size than if they were filled with air. The horns may be connected to radiating slots or other variations of the radiation elements 122.

The fourth layer 808 is an optional top layer. The fourth layer 808 is adjacent to a side of the third layer 806 that is opposite the second layer 804. Thereby, the fourth layer 808 is placed on top of the third layer 806. The fourth layer 808 defines a second waveguide portion including the surface 123 defining the plurality of radiation elements 122 that allow EM energy to escape the waveguide 800. The fourth layer 808 includes individual radiation elements 122 for directivity enhancement. When layered on top of each other, the first layer 802, the second layer 804, the third layer 806, and the fourth layer 808 represent a stack of parallel layers. The waveguide 800 comprises this stack of parallel layers.

The first and second waveguide portion forms a radiation portion of the waveguide 800.

In general, the first layer 802 forms a feed layer, the second layer 804 forms a routing layer, the third layer 806 forms a first radiation layer, and the fourth layer 808 forms a second radiation layer of the antenna system. The fourth layer 808 is optional and may serve to enhance directivity of the antenna system. The first layer 802 is part of the feed portion, the second layer 804 is part of the routing portion and the third and fourth layers 806, 808 are part of the radiation portion of the antenna system. Each layer 802, 804, 806, 808 may comprise two or more sublayers. For example, the third layer 806 may comprise several sublayers, each sublayer comprising one of several stacked openings with increasing size that define each individual horn-shaped radiation channel 120. The radiation channels 120 may form corrugated horns.

The dielectrics filled within the individual radiation channels 120 may also be structured. For example, the dielectrics within the individual radiation channels 120 each may be structured to act as a lens for the electromagnetic energy entering and/or exiting the individual radiation channels 120.

Other embodiments of the dielectric loaded waveguide 800 may not comprise the fourth layer 808. With these embodiments, the radiation elements 122 are formed by the openings of the radiation channels 120 that are located at the side of the third layer 806 that is opposite the second layer 804. Those embodiments may provide for a wider, less directed antenna pattern of the antenna system than embodiments equipped with the fourth layer 808 that extends the radiation channels 120 in a height direction perpendicular to the individual layers 802, 804, 806, 808.

With the dielectric loaded waveguide 800, which comprises several stacked layers 802, 804, 806, 808 along the height direction, the surfaces 123 that have the radiation elements 122 thus may be located at a cover surface of the waveguide 800. The surfaces 123 are thereby orientated perpendicular to a propagation direction of the electromagnetic energy within the radiation channels 120. The surfaces 123 form end surfaces of the radiation channels 120.

Figure 9:
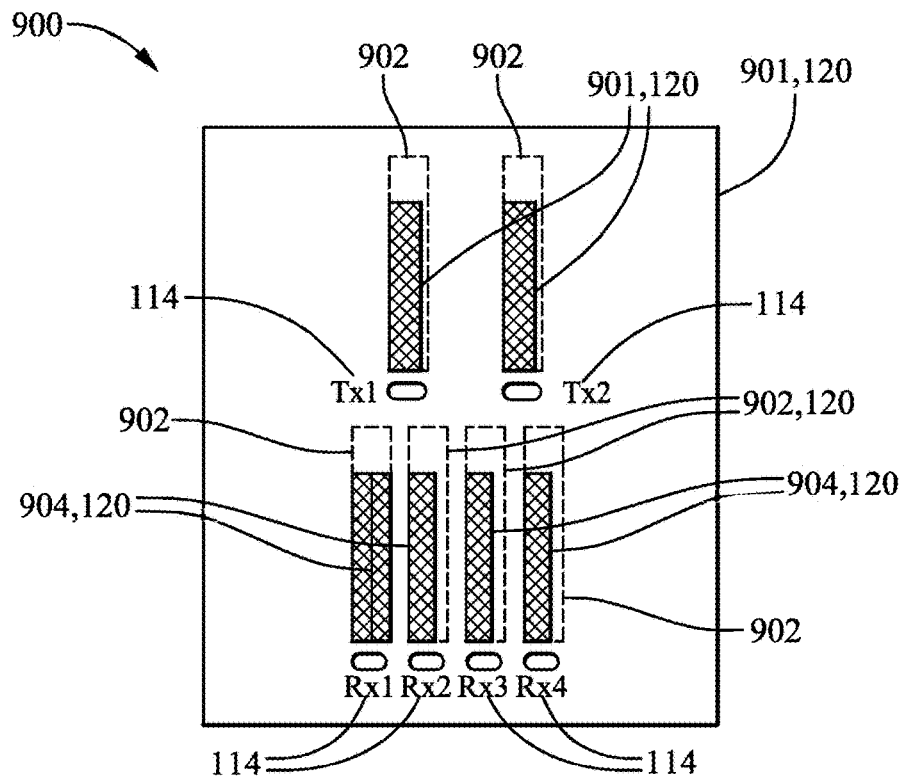
FIG. 9 illustrates a top down view of a radar system showing a size comparison between an on-chip installation of an airwave guide and a dielectric loaded waveguide for low loss signal distributions and small form factor antennas, in accordance with techniques, apparatuses, and systems of this disclosure.
Figure 9:
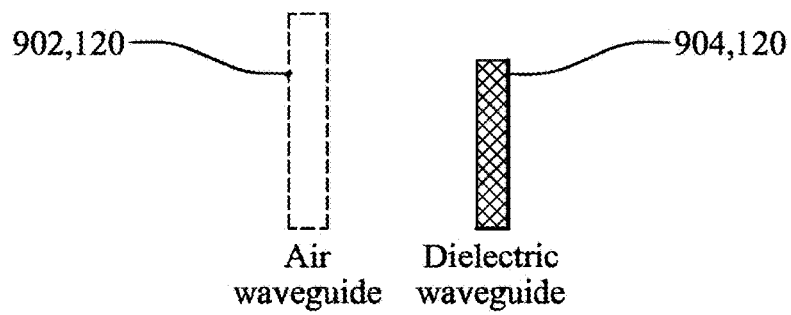

FIG. 9 illustrates a top down view of a radar system 900 showing a size comparison between an on-chip or on-board installation of an air waveguide 902 (shown with dashed outlines) and a dielectric loaded waveguide 904 (shown in solid outline) for low loss signal distributions and small form factor antennas, in accordance with techniques, apparatuses, and systems of this disclosure. The radar system 900 includes two transmit channels Tx1 and Tx2 and four receiver channels Rx1 to Rx4.

It can be seen that the radar system 900 does not have unlimited space due to the limited size of a board 901 carrying the waveguides 904 and the board 901 having predetermined locations of the transmit channels Tx1, Tx2 and of the receive channels Rx1, Rx2, Rx3, Rx4 that are adapted to locations of the corresponding channels 114 of the underlying radar chip 110. With dielectric filled radiator columns or radiation channels 120, the antennas or waveguides 904 can be made smaller by a factor based on the square root of the relative dielectric permittivity $\varepsilon_r$, thereby enabling a greater quantity of radiation channels 120 to be present on the board 901, which may translate to higher radiation power and more possibilities for beam shaping. As an optional variation, the receiver channel Rx1 includes multiple dielectric waveguides 904; two dielectric loaded antennas or waveguides 904 connected to one RF transition in the receiver channel Rx1 instead of a single dielectric loaded waveguide 904 connected to one RF transition, as is shown with the other channels. Adding one or more dielectric filled waveguides 904 to a single channel 114 gives the radar system 900 beam shaping flexibility for azimuth and asymmetric azimuth patterns. The beam width in azimuth of the radar system 900 may be limited by the antenna or waveguide 904 spacing and the distance between the transitions of the channels 114. Using dielectric filled waveguide 904 antennas allows greater flexibility in arranging components of the radar system 900.

Figure 10:
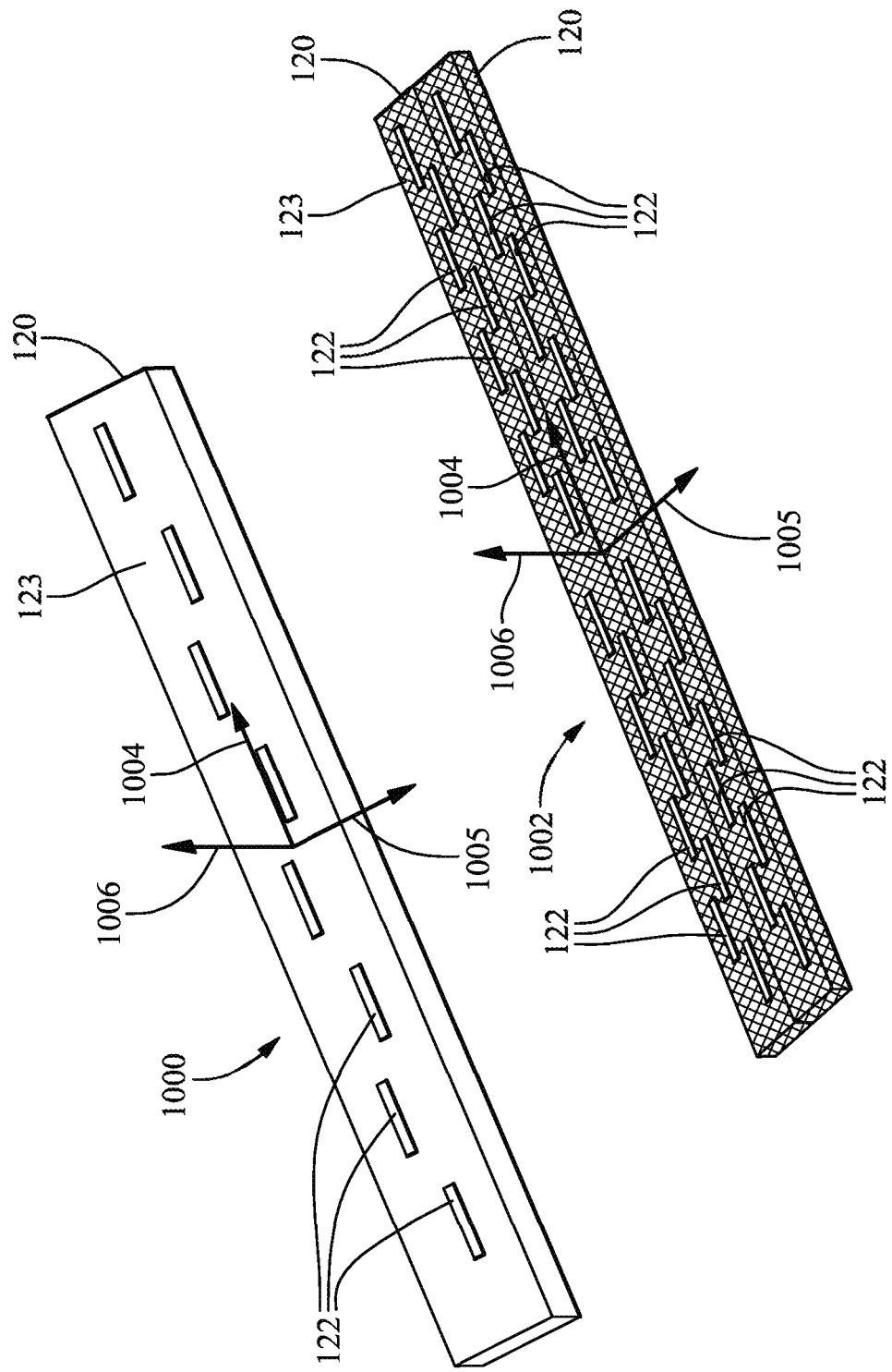
FIG. 10 illustrates a three-dimensional view of radiation portions of a dielectric loaded waveguide for low loss signal distributions and small form factor antennas, in accordance with techniques, apparatuses, and systems of this disclosure.

FIG. 10 illustrates a three-dimensional view of radiation portions of a dielectric loaded waveguide for low loss signal distributions and small form factor antennas, in accordance with techniques, apparatuses, and systems of this disclosure. The radiation portion 1000 may correspond to one of the radiation portions from the air waveguide 300. The radiation portion 1002 may correspond to one or more of the radiation portions 120 from the waveguide 112 of FIG. 1. The radiation portion 1002 shows that by using a dielectric in the radiation portion 1002, a greater quantity of radiation elements 122 and radiation channels 120 is possible, in roughly the same footprint as the radiation portion 1000, which is filled with air. The radiation portions 120 of the radiation portion 1002 may be arranged adjacent on a short edge, others are arranged adjacent on their long edges.

The radiation portion 1000 has a length in the longitudinal direction 1004 of 25 mm and a width along the transverse direction 1005 of 1.27 mm. The radiation portion 1002 has a length along the longitudinal direction 1004 of 28 mm and a width along the transverse direction 1005 of 1.46 millimeters. The radiation portions 1000, 1005 are configured to operate at an operating frequency of 76.5 GHz. The dielectric placed within the radiation portion 1005 exemplarily has a relative permittivity $\varepsilon_r$ of 3.

Figures 1, 11:
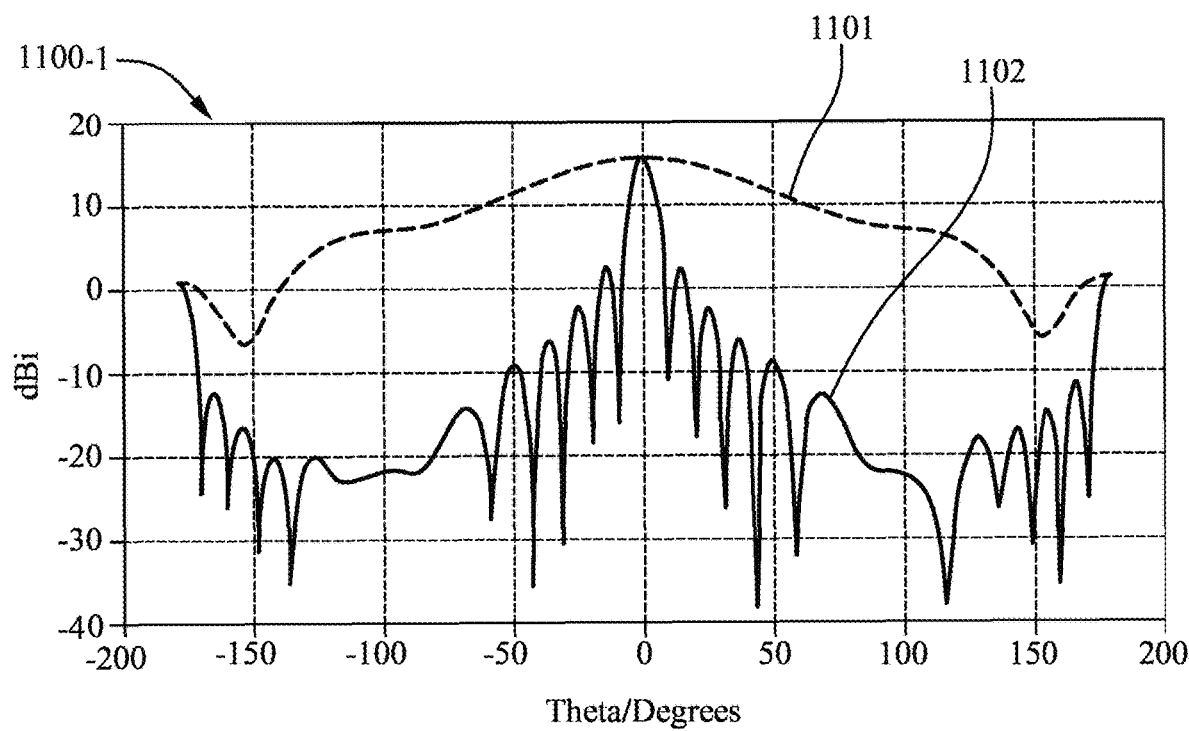
Figures 2, 11:
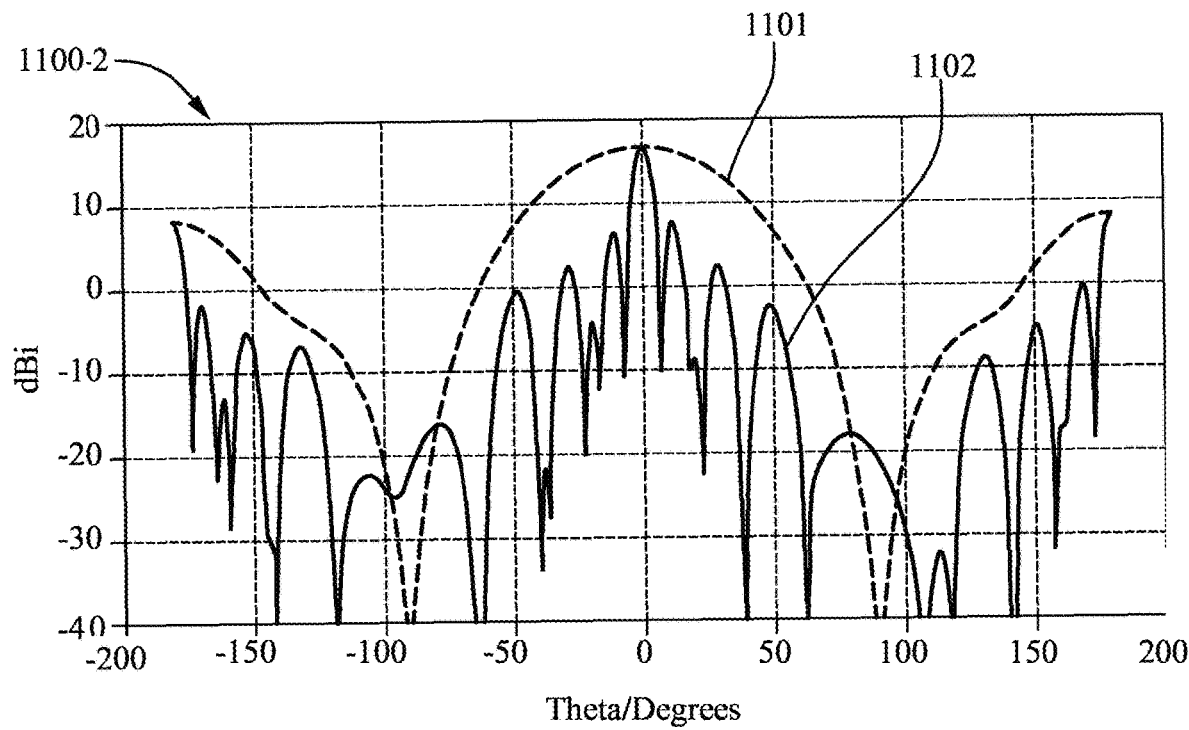

FIG. 11-1 illustrates example antenna patterns 1100-1 of an air waveguide, namely of a waveguide having the radiation portion 1000 shown in FIG. 10, in the azimuth and elevation planes. FIG. 11-2 illustrates example antenna patterns 1100-2 of a dielectric loaded waveguide for low loss signal distributions and small form factor antennas, in the azimuth and elevation planes, in accordance with techniques, apparatuses, and systems of this disclosure. The antenna patterns 1100-2 shown in FIG. 11-2 are that of a waveguide having the radiation portion 1002 shown in FIG. 10. In comparing FIG. 11-1 to FIG. 11-2, the dielectric loaded waveguide has a more desirable antenna pattern than the air waveguide. This desirability in the radiation pattern stems from the higher directivity and from the possibility of maneuvering the pattern in any way desirable through amplitude and phase taper.

FIGS. 11-1 and 11-2 thereby each depict a transverse antenna gain 1101 in a transverse plane that is perpendicular to a longitudinal direction 1004 along the propagation direction within the radiation channels 120, whereby the transverse antenna gain 1101 is shown in dependence of an angle theta with respect to a normal direction 1006 perpendicular to the surface 123 of the radiation channels 120. Furthermore, FIGS. 11-1 and 11-2 each depict a longitudinal antenna gain 1102 in a longitudinal plane that is spanned by the longitudinal direction 1004 and the normal direction 1006 and which is perpendicular to the transverse direction 1005. The longitudinal antenna gain 1102 is likewise depicted in dependence of the angle theta.

As can be seen from FIG. 11-2, the antenna gain in the boresight direction, that is for theta equals 0°, is larger for the radiation portion 1002 filled with the dielectric than for the radiation portion 1000 filled with air. Furthermore, the main lobe centered around the boresight direction is narrower for the radiation portion 1002 than for the radiation portion 1000 both in the longitudinal direction 1004 and in the transverse direction 1005.

Figures 1, 12:
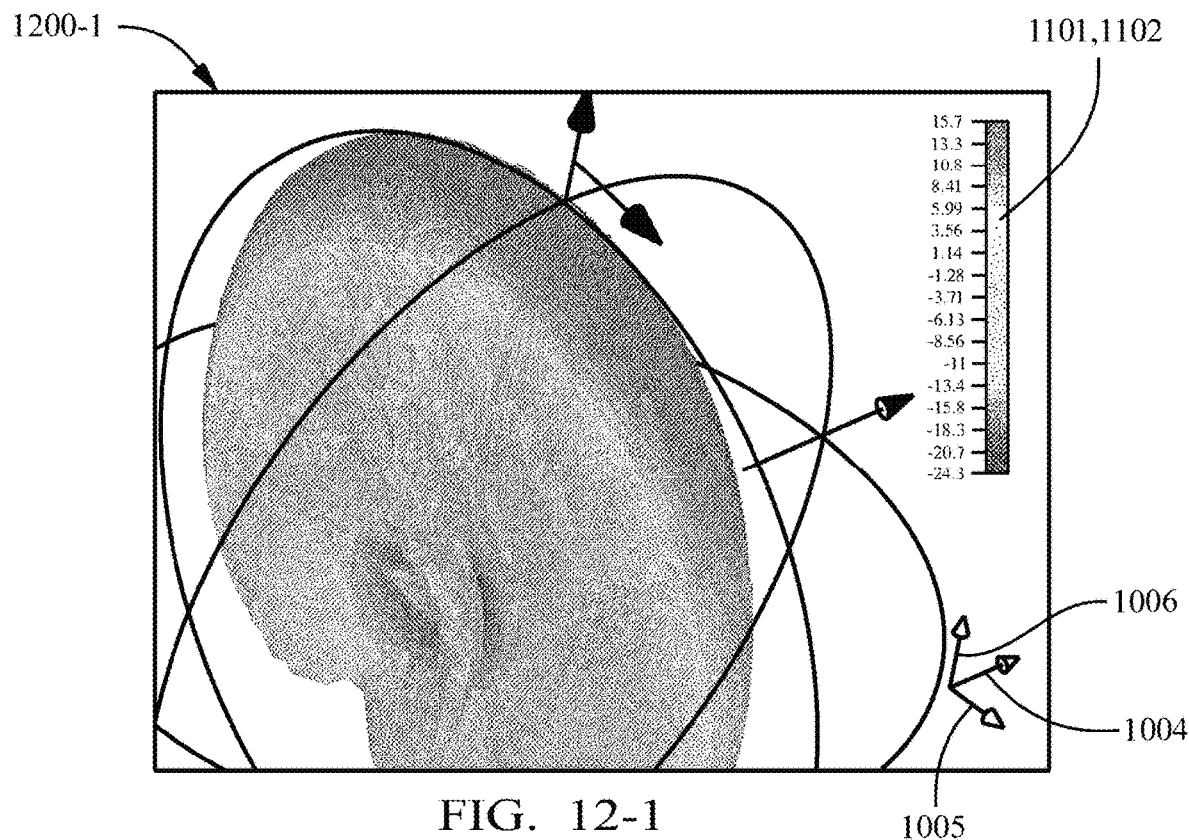
Figures 2, 12:
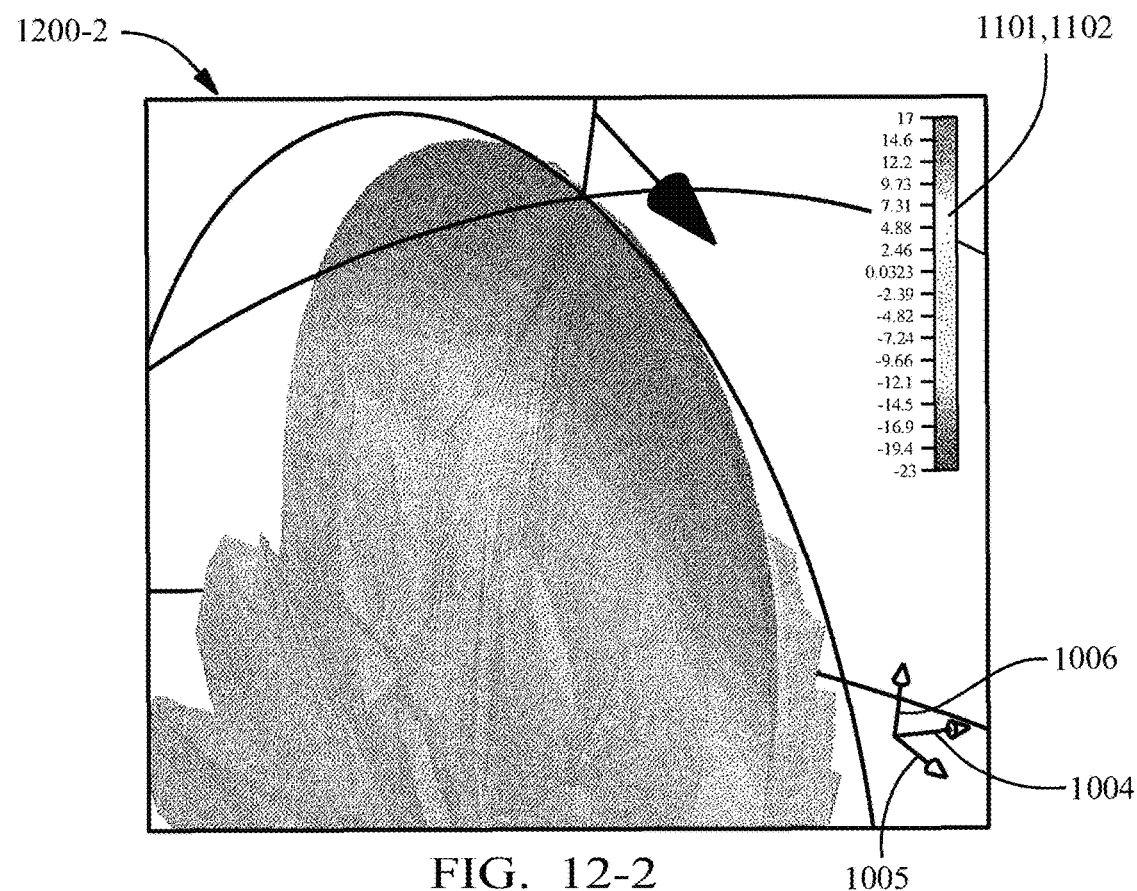

FIG. 12-1 illustrates an example omnidirectional, realized gain antenna pattern 1200-1 of an air waveguide, namely of an air waveguide having the radiation portion 1000 shown in FIG. 10. FIG. 12-2 illustrates an example omnidirectional, realized gain radiation pattern 1200-2 of a dielectric loaded waveguide for low loss signal distributions and small form factor antennas in accordance with techniques, apparatuses, and systems of this disclosure, namely of a waveguide having the radiation portion 1002 shown in FIG. 10. In comparing FIG. 12-1 to FIG. 12-2, the radiation portion 1002 of the dielectric loaded waveguide has a more desirable antenna pattern than the radiation portion 1000 of the air waveguide. Thereby, the transverse antenna gains 1101 shown in FIGS. 11-1 and 11-2 correspond to sections through the antenna patterns 1200-1, 1200-2 in a plane spanned by the transverse direction 1005 and the normal direction 1006. The longitudinal antenna gains 1102 shown in FIGS. 11-1 and 11-2 correspond to sections through the antenna patterns 1200-1, 1200-2 in a plane spanned by the longitudinal direction 1004 and the normal direction 1006.

Figures 1, 13:
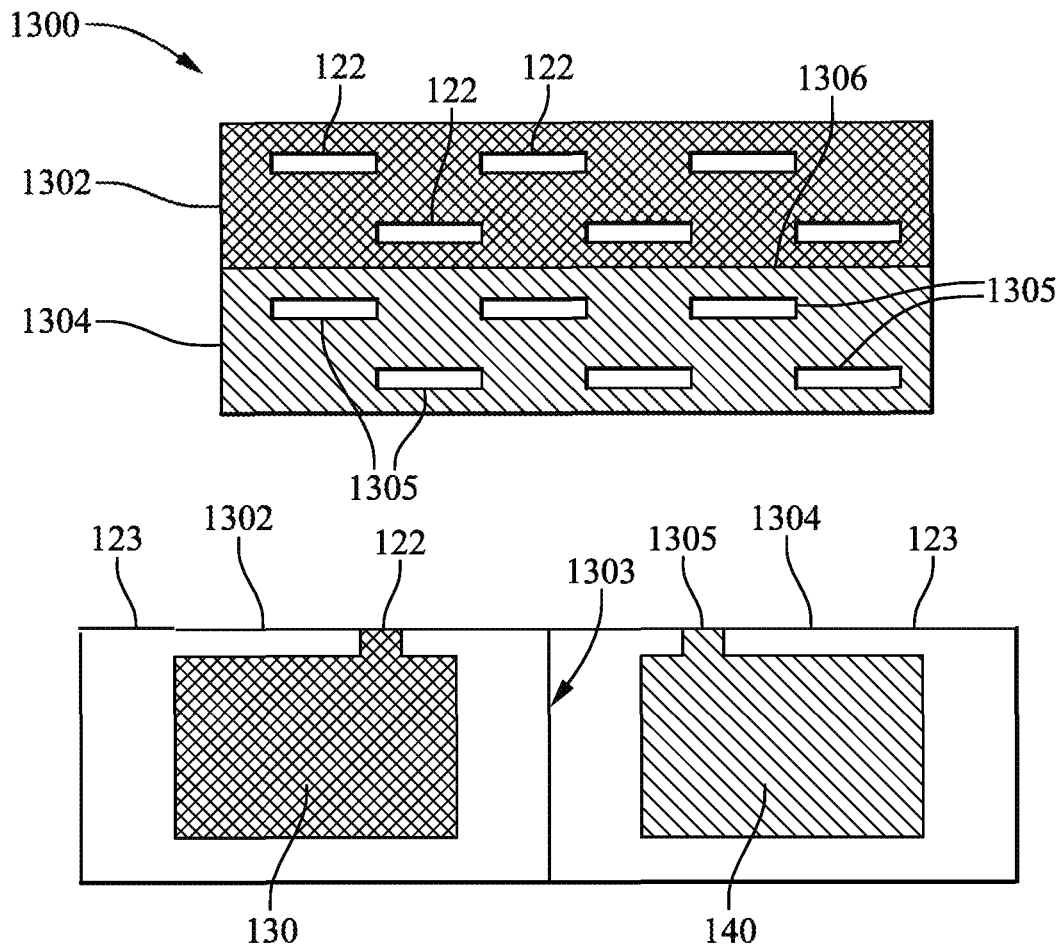
Figures 2, 13:
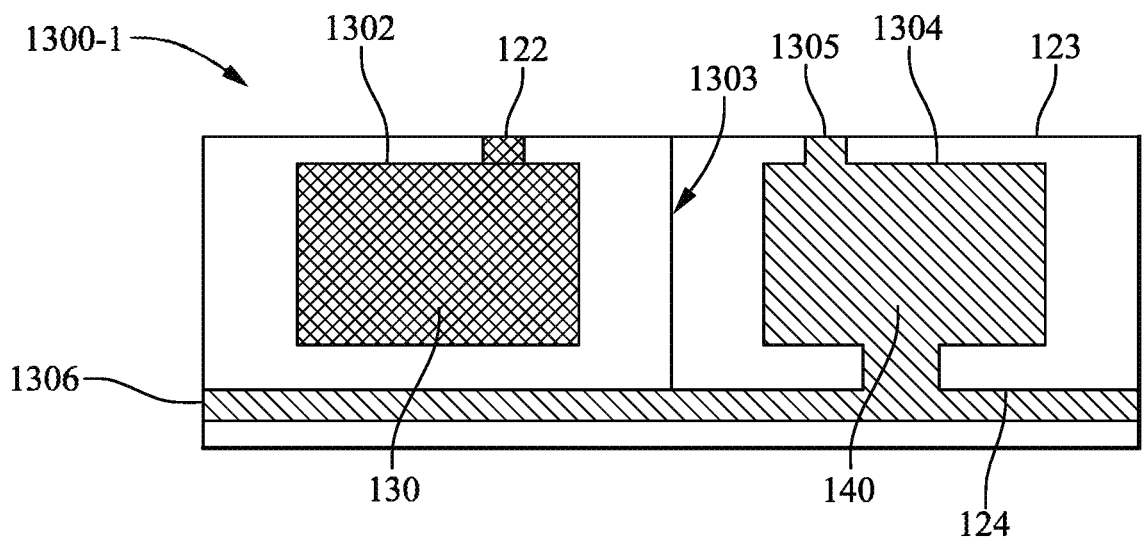
Figures 3, 13:
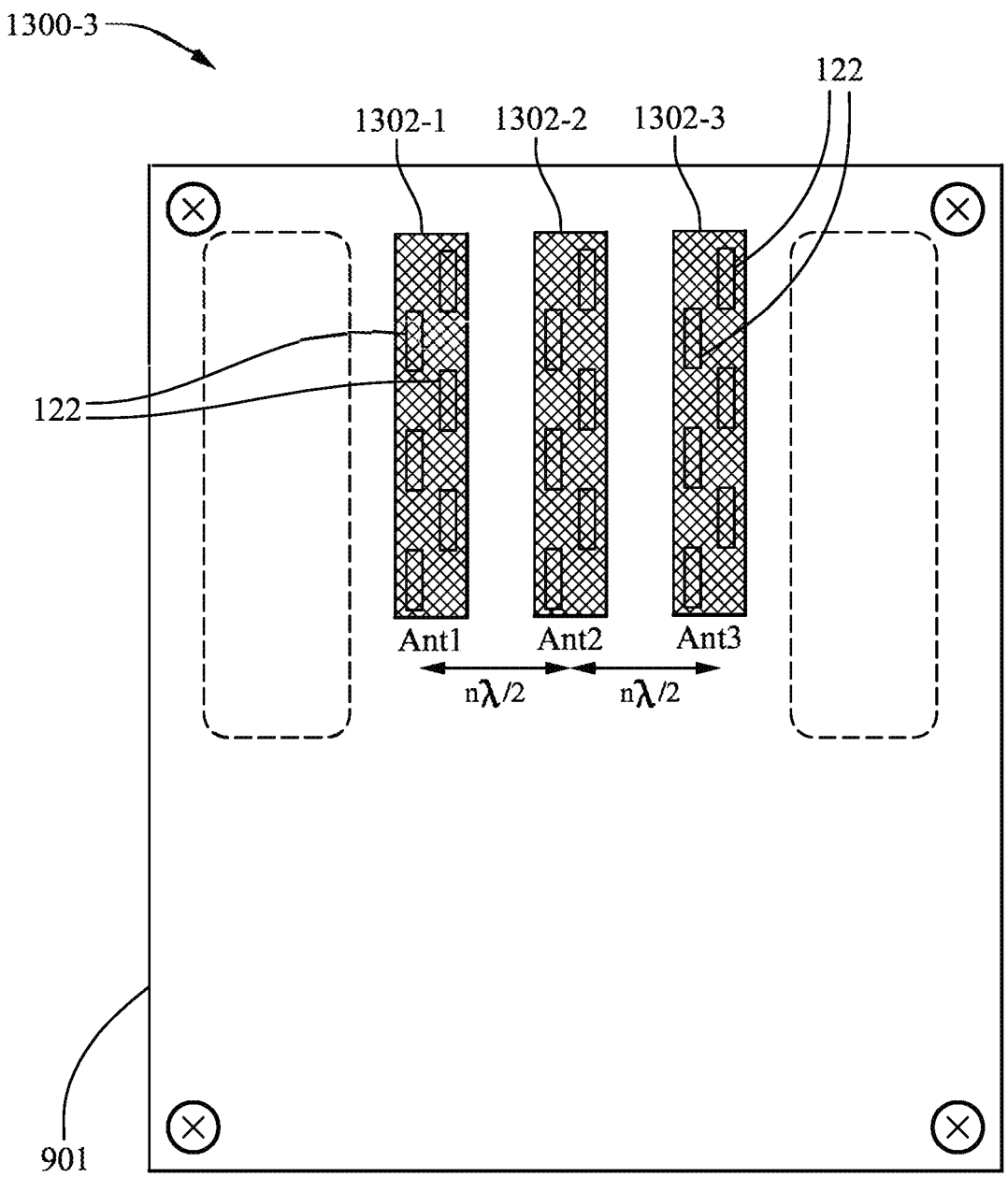
Figures 4, 13:
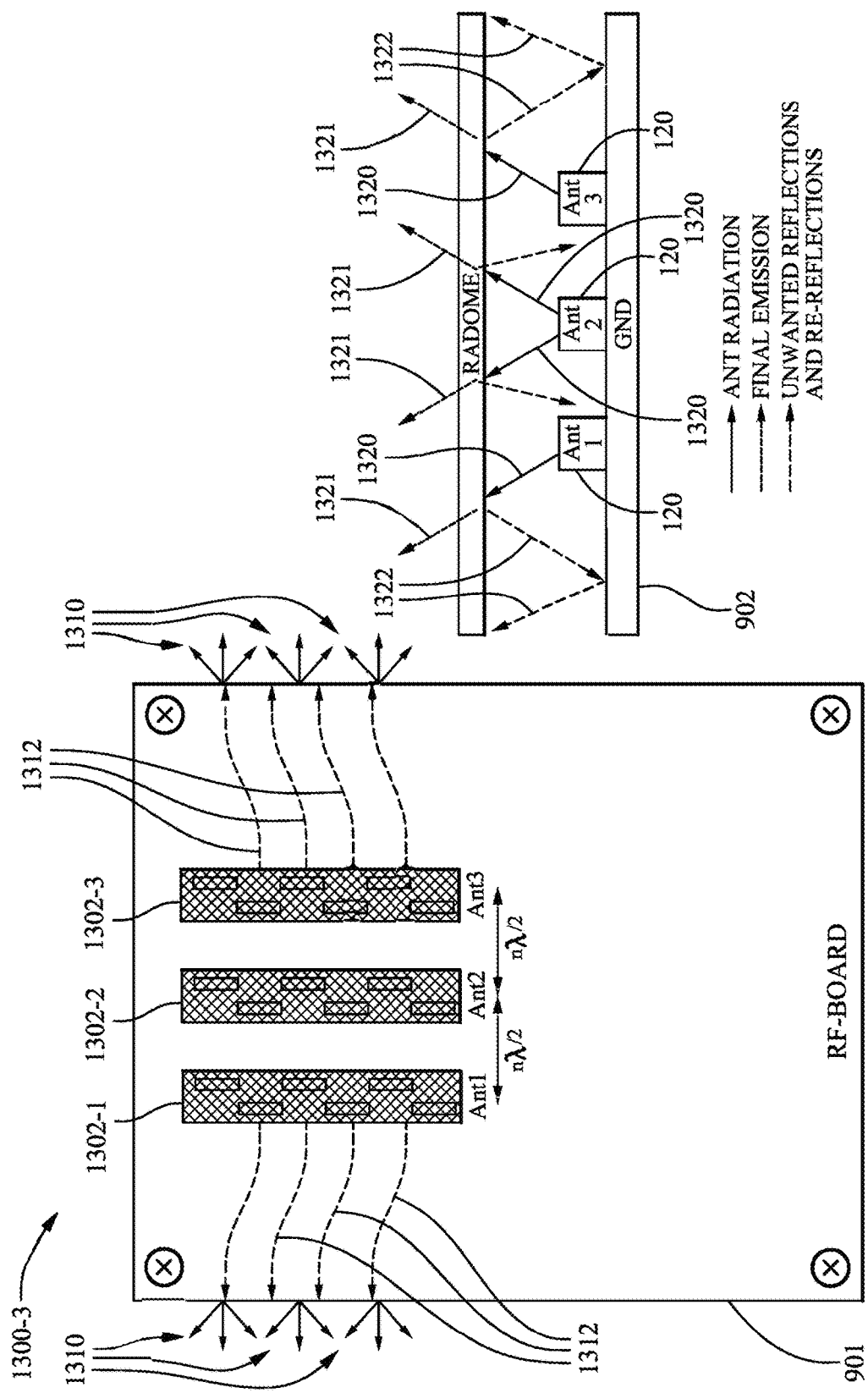
Figures 5, 13:
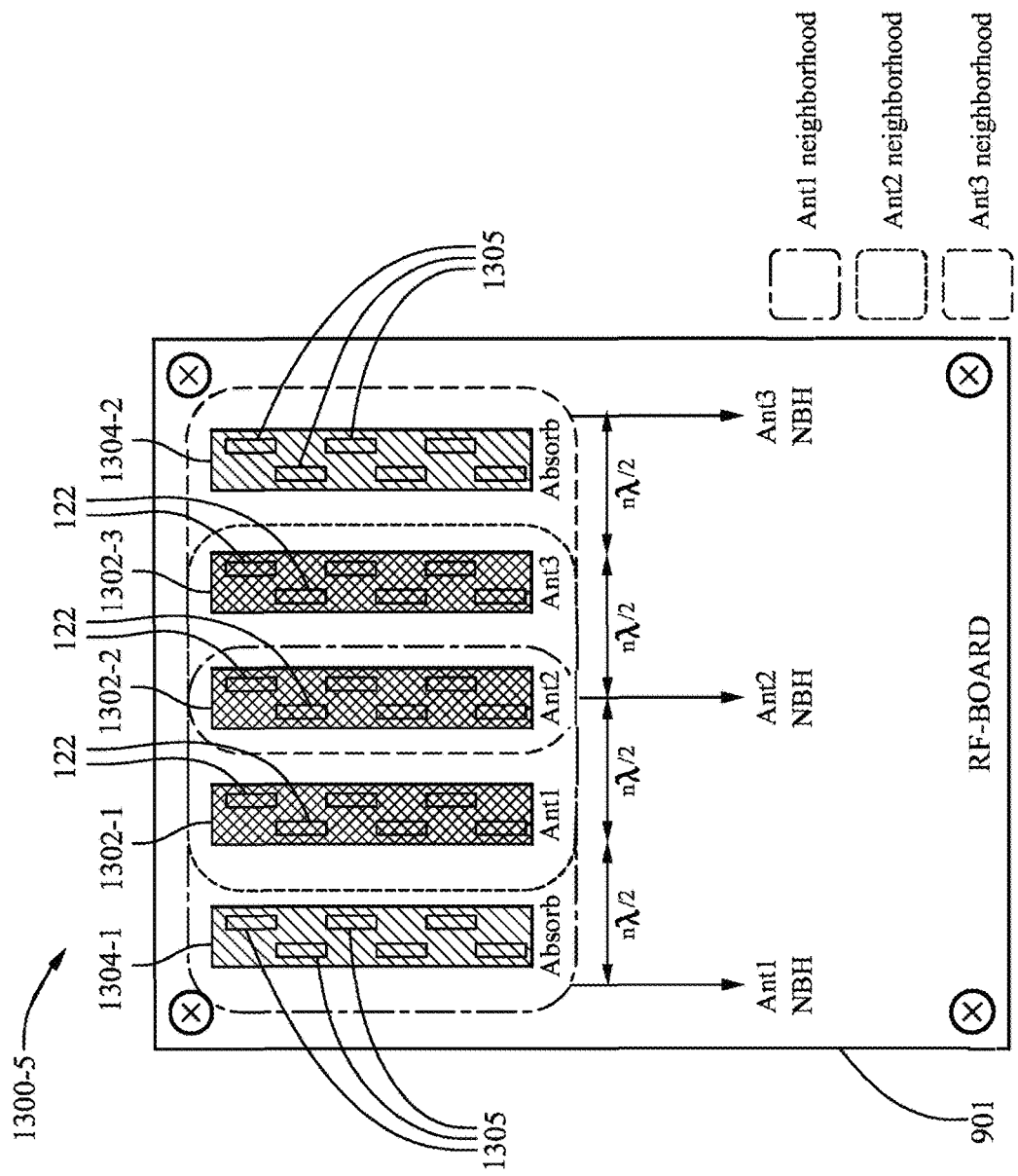

FIG. 13-1 illustrates a top down and cross section view of an example radiation portion 1300 of a dielectric loaded waveguide for low loss signal distributions and small form factor antennas, in accordance with techniques, apparatuses, and systems of this disclosure. In this example, the radiation portion 1300 includes a radiation channel 1302 filled with a non-air dielectric 130. The radiation channel 1302 represents a normal, radiating antenna element. A surface 123 of the radiation channel 1302 may have a pattern of radiation elements 122 that allow EM energy to escape the non-air dielectric.

Unique to the radiation portion 1300, however, is an absorption channel 1304, which shares an adjoining wall 1303 with the radiation channel 1302. This means that an outer wall of the radiation channel 1302 is adjacent to an outer wall of the absorption channel 1304. A surface 123 of the absorption channel 1304 also has a pattern of elements 1305 (e.g., slots, cones), referred to as absorption elements, that are in a similar pattern or in the same pattern as the radiation elements 122 in the radiation channel 1302. The pattern of radiation elements 122 in the surface 123 of the radiation channel 1302 enables the radiation channel 1302 to radiate normally, as an antenna element. In contrast, the absorption patterns are arranged in a pattern to absorb unwanted EM reflections in an environment near the radiation portion 1300, for example, reflections from a radome or other part of the vehicle 102 that are trapped between the radome and the surface 123 of the radiation portion 1300 when the radiation channel 1302 is radiating. The pattern of absorption slots 1305 in the surface 123 of the absorption channel 1304 allow unwanted EM reflections to be absorbed by an absorber material 140 of the absorption channel 1304, rather than interfere with a radar signal of the radiation channel 1302. In this way, the absorption channel 1304 improves antenna characteristics (e.g., resonant frequency stability, ripple-free radiation envelope, reduced intra-antenna isolation) of the radar system 104.

The absorption channel 1304 is collocated with the radiation channel 1302 and loaded with the absorber material 140 that provides the radiation channel 1302 and the neighboring radiating antennas or radiating channels 1302 a similar antenna neighborhood. Being in a similar antenna neighborhood means they can have antenna characteristics (e.g., key performance indicators, resonant frequency, beam shaping/directivity, antenna pattern) that are similar to what is expected, as established by an overall design of the radar system 104. If antenna neighborhoods are different amongst collocated radiation channels 1302, the antenna characteristics can change frequently and by various amounts. The absorption channel 1304 appears to have or has the same shape and form as the radiation channel 1302, except, the absorption channel 1304 has long RF paths filled with absorber material 140. The absorber material 140 fills the entire RF path of the absorption channel 1304, including optionally extending to an absorption layer beneath the radiation channel 1302 and the absorption channel 1304.

In general, the absorption channel 1304 constitutes an additional channel in addition to the radiation channel 1302. The absorption channel 1304 is electromagnetically coupled to the radiation channel 1302 to allow for a transfer of at least a part of the electromagnetic energy between the radiation channel 1302 and the additional channel formed by the absorption channel 1304. Electromagnetic coupling thereby may be due to reflections between the surface 123 and a radome placed in front of the surface 123 and/or due to surface currents flowing along the surface 123.

The pattern of radiation elements 122 on the surface 123 and the pattern of absorption elements 1305 may generate overlapping radiation patterns. The radiation patterns thereby may overlap by at least 10%, at least 20%, or at least 25%, for example by 25%. For example, the pattern of radiation elements 122 and the pattern of absorption elements 1305 may generate the same radiation pattern. The radiation pattern, or antenna pattern, thereby specifies the spatial distribution of the electromagnetic energy that exits and/or enters the radiation elements 122 or the absorption elements 1305 as radiation. The radiation pattern therefore specifies the directivity and/or gain of the pattern of radiation elements 120 or the pattern of absorption elements 1305.

For example, FIG. 13-2 illustrates another example radiation portion 1300-1 of a dielectric loaded waveguide for low loss signal distributions and small form factor antennas, in accordance with techniques, apparatuses, and systems of this disclosure. The radiation portion 1300-1 includes an absorption layer 1306 arranged beneath at least one of: the radiation channel 1302, the absorption channel 1304, the outer wall of the radiation channel 1302, or the outer wall of the absorption channel 1304. The absorption channel 1304 and the absorption layer 1306 work together to absorb unwanted reflections and draw them further away from the radiation channel 1302, by directing the unwanted EM energy beneath the two channels 1302 and 1304. In this example, the absorption layer 1306 is filled with the absorber material 140 and includes an interface to the absorption channel 1304. The interface to the absorption channel 1304 is through another surface 124 of the absorber channel 1304 that is opposite the surface 123 with the pattern of absorption elements 1305. The absorption layers 1306 absorb unwanted EM reflections and spurious surface currents to provide better antenna response.

Each of the radiation portions according to the present disclosure may comprise one or more of the additional channels that are configured like the absorption channel 1304 shown in FIG. 13-1.

FIG. 13-3 illustrates a top down view of a radar system including an on-chip installation of a dielectric loaded waveguide for low loss signal distributions and small form factor antennas, in accordance with techniques, apparatuses, and systems of this disclosure. FIG. 13-3 shows how there is empty space available in an RF board 901 to accommodate other components on either side of radiation channels 1302-1, 1302-2, and 1302-3 of radiation portion 1300-3. FIG. 13-4 illustrates spurious radiation characteristics of the on-chip installation of the dielectric loaded waveguide illustrated in FIG. 13-3. The spurious radiation characteristics of the on-chip installation of the dielectric loaded waveguide illustrated in FIG. 13-4 can interfere with radar signals captured by the radiation channels 1302-1, 1302-2, and 1302-3. As shown in FIG. 13-4, unwanted reflections 1322, and re-reflections from a radome 1330 can cause interference.

The spurious radiation characteristics of the board 901 comprise spurious emissions 1310 from side surfaces of the board 901 that are generated by surface currents 1312 flowing from the radiation channels 1302-1, 1302-2, 1302-3 via the unoccupied regions between edges of the board 901 and the radiation channels 1302-1, 1302-2, 1302-3. The reflections 1322 correspond to parts of the electromagnetic energy radiated as antenna radiation 1320 by the radiation channels 120 via the radiation elements 122, wherein said parts of the electromagnetic energy do not pass through the radome 1330 placed in front of the radiation elements 122 but are at least once reflected at the radome 1330.

To prevent these spurious radiation characteristics and eliminate some of the unwanted reflections 1322 and re-reflections, FIG. 13-5 illustrates a top down view of a modification done to the radar system illustrated in FIG. 13-3 to include absorption channels 1304-1 and 1304-2 in the on-chip installation of a dielectric loaded waveguide for low loss signal distributions and small form factor antennas, in accordance with techniques, apparatuses, and systems of this disclosure. Absorption channels 1304-1 and 1304-2 are on either side of the radiation channels 1302-1, 1302-2, and 1302-3 of a radiation portion 1300-5 to absorb EM energy reflected between an object (e.g., a radome, a bumper, other part of a vehicle) and direct it away from radiating elements 122. As shown in FIG. 13-5, the absorption channels 1304-1 and 1304-2 provide a consistent antenna neighborhood enabling better transmission and reception with the radiation channels 1302-1, 1302-2, and 1302-3. In other words, the absorption channels 1304-1, 1304-2 maintain an operating environment near a radiating surface of an antenna to be free from some unwanted EM reflections and therefore offer a consistent antenna response and easier radar control. Generally, accounting for unwanted reflections in an environment without using the absorption channels 1304-1 and 1304-2 is a complex and computationally intensive problem, which can be avoided through normalized antenna neighborhoods.

As can be seen from FIG. 13-5, a distance between an absorption channel 1304-1, 1304-2 and an adjacent radiation channel 1302-1, 1302-2, 1302-3 may be the same as a distance between two neighboring radiation channels 1302-1, 1302-2, 1302-3. This distance may amount to an integer multiple of half the free-space wavelength at the operating frequency of the antenna system. The antenna neighborhoods of each individual radiation channel 1302-1, 1302-2, 1302-3 may amount to an area around the respective radiation channel 1302-1, 1302-2, 1302-3 that includes the next neighboring radiation channels 1302-1, 1302-2, 1302-3 and/or absorption channels 1304-1, 1304-2.

Example Method

Figure 14:
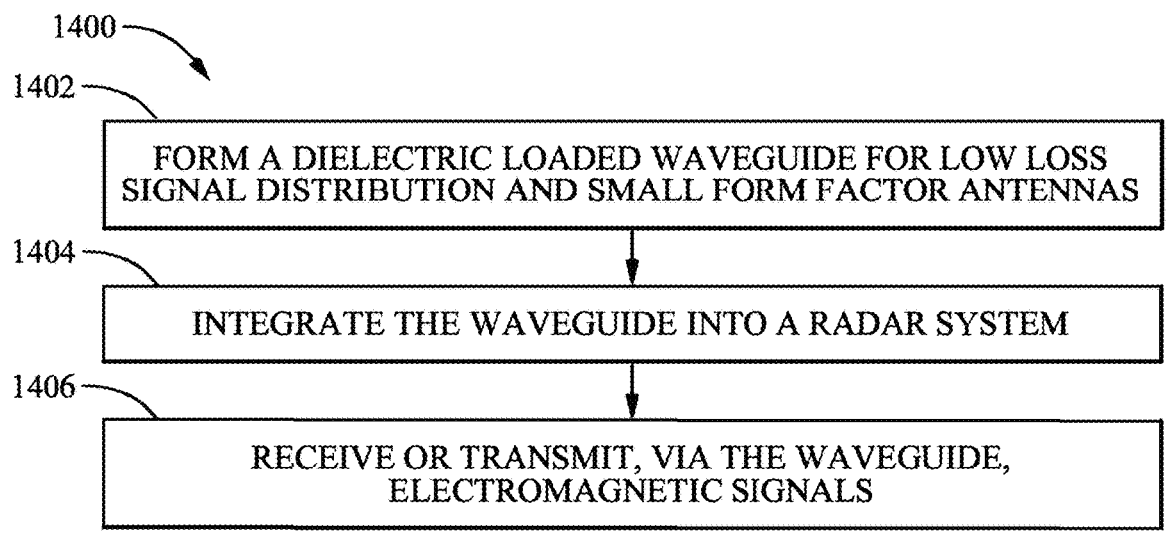
FIG. 14 illustrates an example process using a dielectric loaded waveguide for low loss signal distributions and small form factor antennas, in accordance with techniques, apparatuses, and systems of this disclosure.

FIG. 14 illustrates an example process 1400 using a dielectric loaded waveguide for low loss signal distributions and small form factor antennas, in accordance with techniques, apparatuses, and systems of this disclosure. The process 1400 is shown as sets of operations (or acts) performed, but not necessarily limited to the order or combinations in which the operations are shown herein. Further, any of one or more of the operations may be repeated, combined, or reorganized to provide other processes or methods. In portions of the following discussion, reference may be made to the environment 100 of FIG. 1 and entities detailed in all other drawings, reference to which is made for example only. The techniques are not limited to performance by one entity or multiple entities.

At 1402, a dielectric filled waveguide for low loss signal distributions and small form factor antennas is formed. For example, the waveguide 112 is formed.

At 1404, the waveguide is integrated into a radar system. For example, the waveguide 112 feed portion 106-1 is electrically connected to the channels 114 of the radar chip 110.

At 1406, EM signals are received or transmitted via the waveguide. For example, the radar chip 110 causes radar signals to be sent or received using the waveguide 112. EM energy in the propagation direction of the waveguide 112 carries the radar signals. Portions of the EM energy are allowed to escape the non-air dielectric of the waveguide 112 through the radiation elements 122. The radar signals may take the form of radar detections. The radar system may output the radar detections to a vehicle system of the vehicle 102. In response to receiving radar detections that indicate to the radar system 104 that an object 106 is present in the field of view 108, the vehicle 102 may perform a driving operation based on the radar detections observed using the waveguide 112. For example, a vehicle system may drive the vehicle 102 around the object 106 to avoid a collision.

Fabrication

Figure 15:
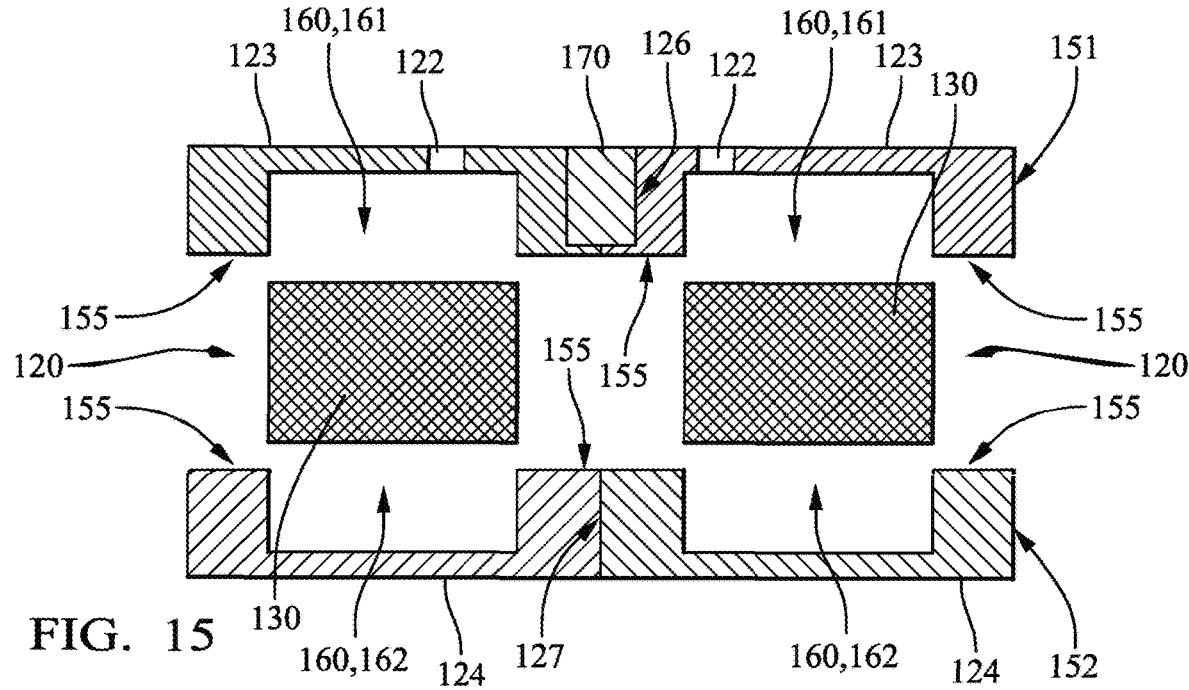
FIG. 15 illustrates a step of a method for fabricating an antenna system in accordance with the present disclosure.
Figure 16:
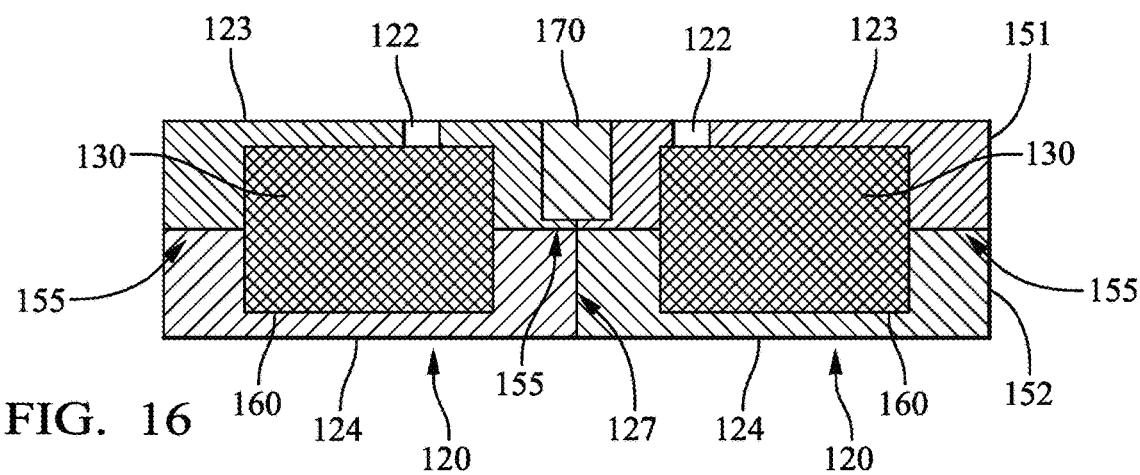
FIG. 16 illustrates the antenna system of FIG. 15 after performing the step of FIG. 15.

FIG. 15 and FIG. 16 illustrate a method for fabricating an antenna system in accordance with the present disclosure. The method comprises providing a first part 151 and a second part 152 of an antenna board of the antenna system. The first part 151 forms an upper part of the antenna board and comprises the surface 123 having the radiation elements 122. Furthermore, the first part 151 may optionally comprise the cavity 126 for the isolation portion 170 and/or the isolation portion 170.

The first part 151 forms a first cavity part 161 of a cavity 160 of one of the radiation channels 120. Furthermore, the first part 151 forms additional first cavity parts 161 of cavities 160 of the remaining radiation channels 120. The first cavity parts 161 have openings that extend over the lateral width of the radiation channels 120. The openings face away from the surface 123 having the radiation elements 122.

The second part 152 comprises the surface 124 that is located opposite the surface 123 having the radiation elements 122. The second part 152 forms a lower part of the antenna board. It comprises a second cavity part 162 of the cavity 160 that receives the dielectric 130 of the radiation channel 120. Furthermore, the second part 152 comprises additional second cavity parts 162 of the cavities 160 of the remaining radiation channels 120. The second cavity parts 162 each have openings that face away from the surface 124 and extend over the lateral width of the radiation channels 120.

The first part 151 and the second part 152 are configured to be joined together in a contact region 155. With the present embodiment, the contact region is formed by a contact surface that runs parallel to the surfaces 123, 124 on the first and second part 151, 152.

During assembly of the antenna board, the individual dielectrics 130 that fill the individual radiation channels 120 are provided as solid bodies, namely as elongated rods. The bodies of the dielectrics 130 are orientated to extend along the propagation direction within the radiation channels 120. They are orientated parallel to the radiation channels 120.

The dielectrics 130 are placed in between the first and second part 151 of the antenna board during assembly. Thereby, the dielectrics 130 may be placed at one of the first part 151 and the second part 152. For example, each dielectric 130 may be placed within one of the first cavity parts 161 or within one of the second cavity parts 162. After placement of the dielectrics 130 at one of the parts 151, 152, the remaining part 151, 152 may be located next to the dielectrics 130 so that the dielectrics 130 are placed in between the first and second part.

In a further fabrication step of the method, the first and second part 151, 152 are joined together in the contact region 155, for example via the contact surfaces. Thereby, the first and second part 151, 152 may be irreversibly and permanently connected with each other in the contact region 155. For example, the first and second part 151, 152 may be glued or soldered or welded together.

This results in the antenna board shown in FIG. 16. The first and second part 151, 152 are connected with each other at the contact region 155 and the dielectrics 130 of the radiation channels 120 are received within their respective cavities 160.

The first part 151 and/or the second part 152 of the antenna board may be provided as injection molded parts. The method for fabricating the antenna board may also comprise a step of forming, for example by injection molding, the first part 151 and/or the second part 152. The first and/or second part 151, 152 may be formed from an insulating material, such as plastics. The method may also comprise a step of coating the first part 151 and/or the second part 152 with a metal surface, for example by plating, spray coating or the like. This coating may also be applied to the contact surfaces of the contact region 155.

Figure 17:
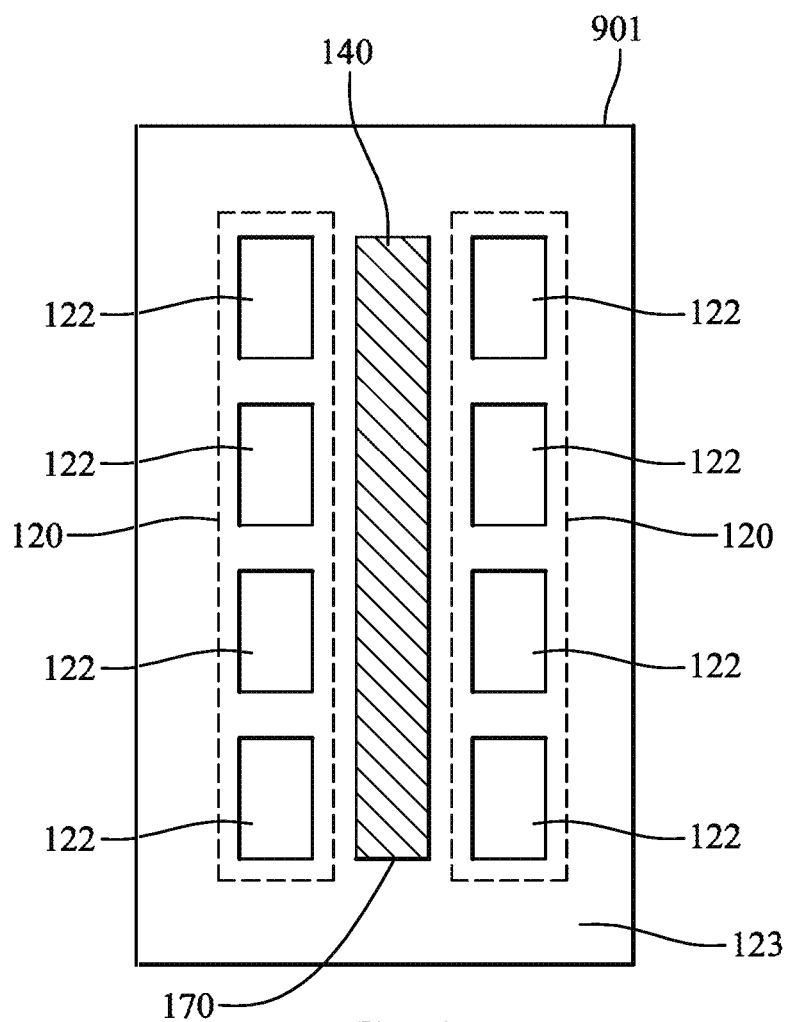
FIG. 17 illustrates a top view of an antenna board of an antenna system according to the present disclosure.
Figure 18:
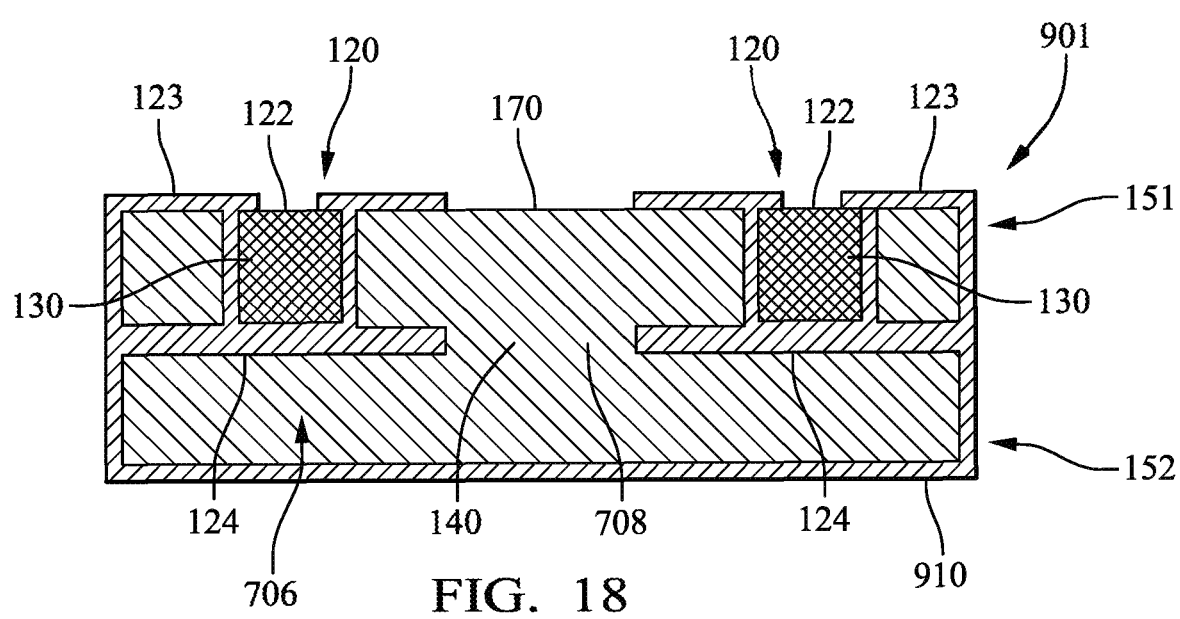
FIG. 18 illustrates a cross-sectional view of the antenna board shown in FIG. 17.

FIG. 17 illustrates a top view and FIG. 18 a cross-sectional view of a further embodiment of an antenna board 901 of an antenna system according to the present disclosure. As far as no differences are disclosed in the description and the figures, the antenna system is configured as it is disclosed for the other antenna systems according to this disclosure.

The board 901 has a conducting surface 123 that is placed on an insulating substrate. Thereby, the insulating substrate is plated with the conducting surface 123. The surface 123 is structured and comprises openings that define the radiation elements 122 of two parallel radiation channels 120.

Furthermore, the conducting surface 123 has an opening that exposes the substrate material. The substrate material comprises an absorber material 140 that is exposed in said opening and absorbs the electromagnetic energy transduced by the radiation elements 122. The opening therefore forms an isolation portion 170 of the board 901. The isolation portion 170 electromagnetically isolates the two propagation channels 120 and their radiation elements 122 from each other.

As can be seen from the cross-sectional view of FIG. 22, the board 901 comprises a first part 151 that is placed on top of a second part 152. Each part 151, 152 comprises a substrate that has a conducting structure 910 that comprises the surfaces 123 having the radiation elements 122. The conducting structure 910 may be applied to all sides of the substrates of the individual parts 151, 152. For example, the conducting structure 110 may have been applied by plating, such as electroplating, spray coating, galvanizing or the like. The substrates of both parts 151, 152 comprise the absorber material 140.

Side surfaces of the first part 151 and the second part 152 that face each other are structured to have corresponding openings that expose the absorber material 140. These openings are located next to each other and thus form a connection 708 that connects the absorber material 140 of the first part 151, which also has the radiation elements 122 and the opening forming the isolation portion 170, to the absorber material 140 of the second part 152. The absorber material 140 within the second part 152 forms an isolation layer of the board 901.

The radiation channels 120 are formed within the first part 151. They are configured as longitudinal grooves that extend from the surface 123 having the radiation elements 122 into the substrate. The grooves have sidewalls that are covered with the conducting material and that form conducting structures that laterally delimit the waveguides of the radiation channels 120.

For fabricating the antenna board 901 shown in FIGS. 17 and 18, the substrate of the first part 151, which substrate is made from the absorber material 140, is first structured to have the cavities of the radiation channels 120, for example by cutting or milling. Subsequently, the outer surfaces and the inner surfaces of the cavities are covered with the conducting structure 910. The cavities of the radiation channels 120 are then filled with the dielectric 130.

In a following step, the surface 123 is applied as a continuous metal surface on the absorber material 140 of the substrate and on the dielectric 130 filled within the radiation channels 120. This metal surface is subsequently structured to form the radiation elements 122 and to form the opening exposing the absorber material 142 of the absorption element 170. This structuring may, for example, be performed by lithography, mask etching or the like.

EXAMPLES

Example 1a: An apparatus comprising: an antenna system including: a routing portion having one or more hollow channels, each of the hollow channels filled with an air dielectric; a feed portion configured to connect each of the hollow channels to a corresponding channel of a radar chip; and a waveguide portion including one or more radiation channels corresponding to each of the hollow channels, each of the radiation channels being loaded with a non-air dielectric, a surface of each of the radiation channels having a pattern of radiation elements that allow electromagnetic (EM) energy to escape the non-air dielectric.

Example 2a: The apparatus of example 1a, wherein the antenna system further includes: a transition portion configured to transfer, between the air dielectric of the hollow channels and the non-air dielectric of the radiation channel, the EM energy that is allowed to escape from the radiation elements.

Example 3a: The apparatus of example 2a, wherein: the waveguide portion includes at least one pair of radiation channels separated by an isolation portion, the isolation portion being configured to prevent interference between a first radiation channel and a second radiation channel from the pair of radiation channels by absorption of spurious portions of the EM energy that is allowed to escape each of the first and second radiation channels and thereby to avoid a negative influence on a final radiation pattern.

Example 4a: The apparatus of example 3a, wherein: the surface of each of the radiation channels is a first surface of each of the radiation channels; the isolation portion extends to an isolation layer arranged beneath a second surface of each radiation channel from the pair of radiation channels, the second surface being opposite the first surface; and the isolation layer is configured to absorb the spurious portions of the EM energy that is absorbed by the isolation portion.

Example 5a: The apparatus of example 3a, wherein the isolation portion comprises a meta-material absorption substrate configured to absorb, within a plurality of meta-material structures internal to the isolation portion, the spurious portions of the EM energy that is allowed to escape each of the first and second radiation channels.

Example 6a: The apparatus of example 2a, wherein: the first radiation channel and the second radiation channel correspond to a same one of the hollow channels; or the first radiation channel and the second radiation channel correspond to different hollow channels.

Example 7a: The apparatus of example 2a, wherein the pattern of radiation elements of the first radiation channel and the pattern of radiation elements of the second radiation channel are separated by one half a wavelength of an operating frequency of the radar chip.

Example 8a: The apparatus of example 7a, wherein the first radiation channel and the second radiation channel are separated by an adjoining wall that is twice as thick as an outside wall of the first radiation channel and twice as thick as an outside wall of the second radiation channel.

Example 9a: The apparatus of example 7a, wherein: the first radiation channel and the second radiation channels are separated by an adjoining wall that is six times as thick of an outside wall of the first radiation channel and six times as thick as an outside wall of the second radiation channel, the isolation portion of the waveguide projects, partly through the surface of the first radiation channel, partly through the surface of the second radiation channel, and into the adjoining wall.

Example 10a: The apparatus of example 1a, wherein a size of the radiation channels of the waveguide portion is less than a corresponding size of one or more radiation channels of an air waveguide that is configured to allow an equivalent amount of EM energy to escape from an air dielectric through radiation elements of the air waveguide.

Example 11a: The apparatus of example 10a, wherein: the size of the radiation channels of the waveguide portion comprises a maximum length of the radiation channels of the waveguide portion; and the corresponding size of the radiation channels of the air waveguide comprises a maximum length of the radiation channels of the air waveguide.

Example 12a: The apparatus of example 10a, wherein: the size of the radiation channels of the waveguide portion comprises a maximum area or volume of the radiation channels of the waveguide portion; and the corresponding size of the radiation channels of the air waveguide comprises a maximum area or volume of the radiation channels of the air waveguide.

Example 13a: The apparatus of example 1a, wherein: a quantity of radiation elements in the pattern of radiation elements of each of the radiation channels is greater than a quantity of radiation slots in a pattern of radiation slots of each air channel of an air waveguide that is configured to allow an equivalent amount of EM energy to escape from the air channels as the EM energy that is allowed to escape the radiation elements.

Example 14a: The apparatus of example 1a, further comprising: a device configured to transmit or receive electromagnetic signals via the antenna system.

Example 15a: The apparatus of example 14a, wherein the device comprises a radar system.

Example 16a: The apparatus of example 15a, wherein the radar system is configured for installation as part of a vehicle.

Example 17a: The apparatus of example 1a, wherein a quantity of the radiation channels is greater than or equal to a quantity of the hollow channels.

Example 18a: The apparatus of example 1a, wherein: each of the hollow channels comprises an air-dielectric filled cavity that is rectangular shaped in all three dimensions; and each of the radiation channels comprises a non-air dielectric filled cavity that is rectangular shaped in all three dimensions.

Example 19a: An apparatus comprising: an antenna system including: a first layer having a feed portion configured to connect a channel of a radar chip to the antenna system; a second layer adjacent to the first layer, the second layer comprising a routing portion having a hollow channel configured to hold an air dielectric, the hollow channel being electrically coupled, via the feed portion, to the channel of the radar chip; a third layer adjacent to a side of the second layer that is opposite the first layer, the third layer comprising a first waveguide portion including a radiation channel coupled to the hollow channel, the radiation channel being loaded with a non-air dielectric; and a fourth layer adjacent to a side of the third layer that is opposite the second layer, the fourth layer defining a second waveguide portion including a surface defining a plurality of radiation elements that allow electromagnetic (EM) energy to escape the antenna system.

Example 20a: The apparatus of example 19a, wherein the radiation channel comprises a cavity of the third layer that is filled with the non-air dielectric.

Example 21a: The apparatus of example 20a, wherein the cavity of the third layer has a shape that extends from the second layer, through the third layer, and up to the fourth layer.

Example 22a: The apparatus of example 19a, wherein the feed portion is configured to connect the channel of the radar chip to the antenna system at a bottom surface of the first layer that is opposite the second layer.

Example 23a: The apparatus of example 22a, wherein the first layer, the second layer, the third layer, and the fourth layer comprise a stack of parallel layers.

Example 24a: The apparatus of example 22a, wherein the second layer further comprises a transition portion configured to transfer, between the air dielectric of the hollow channel and the non-air dielectric of the radiation channel, the EM energy that is allowed to escape from the radiation elements.

Example 25a: An apparatus comprising: an antenna system including: a feed portion configured to connect the antenna system to a radar chip; and a waveguide portion including: a radiation channel corresponding to a channel of the radar chip, the radiation channel being loaded with a non-air dielectric, and a surface of the radiation channel having a pattern of radiation elements that allow electromagnetic (EM) energy to escape the non-air dielectric; and an absorption channel paired with the radiation channel, the absorption channel being loaded with an absorber material, and a surface of the absorption channel having a pattern of absorbing elements that allow unwanted EM reflections and spurious currents near the surface of the radiation channel to be absorbed by the absorber material.

Example 26a: The apparatus of example 25a, wherein the pattern of absorbing elements includes a pattern of absorbing slots or cones to absorb the unwanted EM reflections.

Example 27a: The apparatus of example 25a, wherein an outer wall of the radiation channel is adjacent to an outer wall of the absorption channel.

Example 28a: The apparatus of example 25a, further comprising: an absorption layer arranged beneath at least one of: the radiation channel; the absorption channel; the outer wall of the radiation channel; or the outer wall of the absorption channel, the absorption layer configured to draw the unwanted EM reflections further away from the radiation channel than the absorption channel.

Example 29a: The apparatus of example 28a, wherein the absorption layer is loaded with the absorber material and includes an interface to the absorption channel through another surface of the absorber channel that is opposite the surface with the pattern of absorbing slots.

Example 30a: The apparatus of example 25a, wherein the waveguide comprises metal or plastic.

Example 31a: The apparatus of example 25a, wherein the waveguide comprises metal-coated plastic.

Example 32a: A method comprising: performing, by a vehicle, a driving operation based on radar detections observed using the antenna system of the apparatus of any combination of examples 1a-31a:

Example 33a: A computer-readable storage medium comprising instructions that, when executed, cause at least one processor of a vehicle to perform a driving operation based on radar detections observed using the antenna system of the apparatus of any combination of examples 1a-31a.

Example 34a: A system comprising: means for performing a driving operation based on radar detections observed using the antenna system of the apparatus of any combination of examples 1a-31a.

Example 1b: An antenna system (112) including: a feed portion (116-1, 302, 402) configured to connect the antenna system to a radar device, such as a radar chip (110); and a waveguide portion (116-4, 306, 306-1, 306-2, 306-3, 306-4, 408-1, 408-2, 1000, 1002, 1300, 1300-1, 1300-3, 1300-5), such as a radiation portion, including one or more radiation channels (120, 1302, 1302-1, 1302-2, 1302-3), each of the radiation channels (120, 1302, 1302-1, 1302-2, 1302-3) being configured to be coupled to a channel (114) of the radar device, the radiation channels (120, 1302, 1302-1, 1302-2, 1302-3) being filled with a first dielectric (130), and respective surfaces (123) of the radiation channels (120, 1302, 1302-1, 1302-2, 1302-3) each having at least one radiation element (122) that allows electromagnetic (EM) energy to escape and/or enter the first dielectric (130); and one or more additional channels (118, 1304, 1304-1, 1304-2), the additional channels (118, 1304, 1304-1, 1304-2) being filled with a second dielectric that differs from the first dielectric (130), the additional channels (118, 1304, 1304-1, 1304-2) being electromagnetically coupled to the radiation channels (120, 1302, 1302-1, 1302-2, 1302-3) to allow for a transfer of at least a part of the electromagnetic (EM) energy between the radiation channels (120, 1302, 1302 1, 1302-2, 1302-3) and the additional channels (118, 1304, 1304-1, 1304-2).

Example 2b: The antenna system (112) of example 1b, wherein the first dielectric (130) has a relative permittivity that is larger than 1.

Example 3b: The antenna system (112) of one of examples 1b or 2b, wherein one or more of the additional channels (118, 1304, 1304-1, 1304-2) form routing channels (118), such as hollow channels, of a routing portion (116-2) of the antenna system, wherein the feed portion (116-1, 302, 402) is configured to connect each of the routing channels (118) to a channel (114) of the radar device, wherein the electromagnetic coupling between the additional channels (118, 1304, 1304-1, 1304-2) and the radiation channels (120, 1302, 1302-1, 1302-2, 1302-3) couples each of the one or more radiation channels (120, 1302, 1302 1, 1302-2, 1302-3) to one of the routing channels (118), wherein, for example, a loss tangent of the second dielectric is smaller than a loss tangent of the first dielectric (130).

Example 4b: The antenna system (112) of example 3b, wherein: wherein the second dielectric is a liquid dielectric, such as an air dielectric and/or wherein the first dielectric (130) is a non-air dielectric, such as a liquid dielectric or a non-liquid dielectric, such as a solid.

Example 5b: The antenna system (112) of one of examples 3b and 4b, wherein the antenna system (112) further includes: a transition portion (116-3, 406-1, 406-2) configured to transfer, between the second dielectric of the routing channels (118) and the first dielectric of the radiation channels (120, 1302, 1302-1, 1302-2, 1302-3), the EM energy that is allowed to escape and/or enter the radiation elements (122).

Example 6b: The antenna system (112) of one of examples 3b to 5b, wherein a first radiation channel (120, 1302, 1302-1, 1302-2, 1302-3) and a second radiation channel (120, 1302, 1302-1, 1302-2, 1302-3) are connected to a same one of the routing channels (118).

Example 7b: The antenna system (112) of one of examples 3b to 6b, wherein a first radiation channel (120, 1302, 1302-1, 1302-2, 1302-3) and a second radiation channel (120, 1302, 1302-1, 1302-2, 1302-3) are connected to different routing channels (118).

Example 8b: The antenna system (112) of one of examples 3b to 7b, wherein the routing portion (116-2) is provided in a routing layer (804), wherein the waveguide portion (116-4, 306, 306-1, 306-2, 306-3, 306-4, 408-1, 408-2, 1000, 1002, 1300, 1300-1, 1300-3, 1300-5) comprises a radiation layer (806), wherein the radiation layer (806) is adjacent to a side of the routing layer (804), wherein the surfaces (123) of the individual radiation channels (120, 1302, 1302-1, 1302-2, 1302-3) having the at least one radiation element (122) that allows electromagnetic (EM) energy to escape and/or enter the first dielectric (130) are located at a side of the radiation layer (806) that is opposite the routing layer (804).

Example 9b: The antenna system (112) of example 8b, wherein the waveguide portion (116-4, 306, 306-1, 306-2, 306-3, 306-4, 408-1, 408-2, 1000, 1002, 1300, 1300-1, 1300-3, 1300-5) comprises a further radiation layer (808), wherein the further radiation layer (808) is adjacent to a side of the radiation layer (806) that is opposite the routing layer (804), wherein the further radiation layer (808) includes the surfaces (123) of the individual radiation channels (120, 1302, 1302-1, 1302-2, 1302-3) having the at least one radiation element (122) that allows electromagnetic (EM) energy to escape and/or enter the first dielectric (130).

Example 10b: The antenna system (112) of one of examples 8b and 9b, wherein the at least one radiation channel (120, 1302, 1302-1, 1302-2, 1302-3) comprises a cavity (810) of the radiation layer (806) that is filled with the first dielectric (130).

Example 11b: The antenna system (112) of example 10b, wherein the cavity (810) of the radiation layer (806) has a shape that extends from the routing layer (804), through the radiation layer (806), and up to the further radiation layer (808).

Example 12b: The antenna system (112) of one of examples 8b to 11b, wherein the feed portion (116-1, 302, 402) is provided in a feed layer (802), wherein the routing layer (804) is adjacent to the feed layer (802), wherein, for example, the side of the routing layer (804), which the radiation layer (806) is adjacent to, is located opposite the feed layer (802).

Example 13b: The antenna system (112) of example 12b, wherein the feed portion (116-1, 302, 402) is configured to connect a channel (114) of the radar device to the antenna system at a bottom surface (123) of the feed layer (802) that is opposite the routing layer (804).

Example 14b: The antenna system (112) of one of examples 8b to 13b, wherein the routing layer (804) and the radiation layer (806) comprise a stack of parallel layers.

Example 15b: The antenna system (112) of one of examples 8b to 14b, wherein the routing layer (804) further comprises a transition portion (116-3, 406-1, 406-2) configured to transfer, between the second dielectric of the routing channel (118) and the first dielectric (130) of the radiation channel (120, 1302, 1302-1, 1302-2, 1302-3), the EM energy that is allowed to escape and/or enter the radiation elements (122).

Example 16b: The antenna system (112) of one of examples 1b to 15b, wherein one or more of the additional channels (118, 1304, 1304-1, 1304-2) are configured as absorption channels (1304, 1304-1, 1304-2), wherein the second dielectric is configured as an absorber material (140), and wherein respective surfaces (123) of the individual absorption channels (1304, 1304-1, 1304-2) each have at least one absorption element (1305), such as a pattern of absorption elements (1305), that allows portions of the electromagnetic energy that enters and/or exits the first dielectric (130) to be absorbed by the absorber material (140), wherein the portions of the electromagnetic energy are, for example, EM reflections near the surface (123) of the radiation channels (120, 1302, 1302-1, 1302-2, 1302-3) or surface currents propagating at the surface (123) of at least one of the radiation channels (120, 1302, 1302-1, 1302-2, 1302-3).

Example 17b: The antenna system (112) of example 16b, wherein the absorption element (1305), such as each absorption element (1305) of a pattern of absorption elements (1305), includes an absorbing slot and/or an absorbing cone to capture the portions of the electromagnetic energy, such as the EM reflections.

Example 18b: The antenna system (112) of one of examples 16b and 17b, wherein the pattern of absorption elements (1305) equals a pattern of the radiation elements (122) of at least one of the radiation channels (120, 1302, 1302-1, 1302-2, 1302-3).

Example 19b: The antenna system (112) of one of examples 16b to 18b, wherein an outer wall of the radiation channel (120, 1302, 1302-1, 1302-2, 1302-3) is adjacent to an outer wall of the absorption channel (1304, 1304-1, 1304-2).

Example 20b: The antenna system (112) of one of examples 16b to 19b, further comprising: an absorption layer (1306) arranged beneath at least one of: the radiation channel (120, 1302, 1302-1, 1302-2, 1302-3); the absorption channel (1304, 1304-1, 1304-2); an outer wall of the radiation channel (120, 1302, 1302-1, 1302-2, 1302-3); or an outer wall of the absorption channel (1304, 1304-1, 1304-2), the absorption layer (1306) configured to draw the portions of the electromagnetic energy, such as the EM reflections, further away from the radiation channel (120, 1302, 1302-1, 1302-2, 1302-3) than the absorption channel (1304, 1304-1, 1304-2).

Example 21b: The antenna system (112) of example 20b, wherein the absorption layer (1306) is filled with the absorber material (140) and/or includes an interface to the absorption channel (1304, 1304-1, 1304-2) through another surface (124) of the absorption channel (1304, 1304-1, 1304-2) that is opposite the surface (123) with the at least one absorption element (1305).

Example 22b: The antenna system (112) of one of examples 1b to 21b, wherein: the waveguide portion (116-4, 306, 306-1, 306-2, 306-3, 306-4, 408-1, 408-2, 1000, 1002, 1300, 1300-1, 1300-3, 1300-5) includes at least one pair of radiation channels (120, 1302, 1302-1, 1302-2, 1302-3) separated by an isolation portion (170, 500, 600, 704), the isolation portion (170, 500, 600, 704) being configured to prevent interference between a first radiation channel (120, 1302, 1302-1, 1302-2, 1302-3) and a second radiation channel (120, 1302, 1302-1, 1302-2, 1302-3) from the pair of radiation channels (120, 1302, 1302-1, 1302-2, 1302-3) by absorbing spurious portions of the EM energy that is allowed to escape and/or enter each of the first and second radiation channels (120, 1302, 1302-1, 1302-2, 1302-3).

Example 23b: The antenna system (112) of example 22b, wherein: the surface (123) of each of the radiation channels (120, 1302, 1302-1, 1302-2, 1302-3) is a first surface (123) of each of the radiation channels (120, 1302, 1302-1, 1302-2, 1302-3); the isolation portion (170, 500, 600, 704) extends to an isolation layer (706) arranged beneath a second surface (124) of each radiation channel (120, 1302, 1302-1, 1302-2, 1302-3) from the pair of radiation channels (120, 1302, 1302-1, 1302-2, 1302-3), the second surface (124) being opposite the first surface (123); and the isolation layer (706) is configured to absorb the spurious portions of the EM energy that is absorbed by the isolation portion (170, 500, 600, 704).

Example 24b: The antenna system (112) of one of examples 22b and 23b, wherein the isolation portion (170, 500, 600, 704) comprises a meta-material absorption substrate (600) configured to absorb, within a plurality of meta-material structures (602) internal to the isolation portion (170, 500, 600, 704), the spurious portions of the EM energy that is allowed to escape and/or enter each of the first and second radiation channels (120, 1302, 1302-1, 1302-2, 1302-3).

Example 25b: The antenna system (112) of one of examples 22b to 24b, wherein the isolation portion (170, 500, 600, 704) of the waveguide projects partly through the surface (123) of the first radiation channel (120, 1302, 1302-1, 1302-2, 1302-3), partly through the surface (123) of the second radiation channel (120, 1302, 1302-1, 1302-2, 1302-3), and into an adjoining wall (127, 1303) separating the first and second radiation channel (120, 1302, 1302-1, 1302-2, 1302-3).

Example 26b: The antenna system (112) of one of examples 22b to 25b, wherein the isolation portion (170, 500, 600, 704) is received within a cavity (126) of the antenna system that has an opening at the surface (123) having the radiation element (122).

Example 27b: The antenna system (112) of one of the preceding examples, wherein a pattern of the radiation elements (122) of a first one of the radiation channels (120, 1302, 1302-1, 1302-2, 1302-3) and a pattern of the radiation elements (122) of a second one of the radiation channels (120, 1302, 1302-1, 1302-2, 1302-3) are separated by one half a wavelength of an operating frequency of the radar device.

Example 28b: The antenna system (112) of one of examples 1b to 27b, wherein a first one of the radiation channels (120, 1302, 1302-1, 1302-2, 1302-3) and a second one of the radiation channels (120, 1302, 1302-1, 1302-2, 1302-3) are separated by an adjoining wall (127, 1303) that is thicker, such as at least twice, for example at least six times, as thick as an outside wall of the first radiation channel (120, 1302, 1302-1, 1302-2, 1302-3) and/or thicker, such as at least twice, for example at least six times, as thick as an outside wall of the second radiation channel (120, 1302, 1302-1, 1302-2, 1302-3).

Example 29b: The antenna system (112) of one of examples 1b to 28b, wherein a size of the radiation channels (120, 1302, 1302-1, 1302-2, 1302-3) of the waveguide portion (116-4, 306, 306-1, 306-2, 306-3, 306-4, 408-1, 408-2, 1000, 1002, 1300, 1300-1, 1300-3, 1300-5) is less than a corresponding size of one or more radiation channels (120, 1302, 1302-1, 1302-2, 1302-3) of an air waveguide that is configured to allow an equivalent amount of EM energy to escape and/or enter an air dielectric through radiation elements (122) of the air waveguide.

Example 30b: The antenna system (112) of example 29b, wherein: the size of the radiation channels (120, 1302, 1302-1, 1302-2, 1302-3) of the waveguide portion (116-4, 306, 306-1, 306-2, 306-3, 306-4, 408-1, 408-2, 1000, 1002, 1300, 1300-1, 1300-3, 1300-5) comprises a maximum length of the radiation channels (120, 1302, 1302-1, 1302-2, 1302-3) of the waveguide portion (116-4, 306, 306-1, 306-2, 306-3, 306-4, 408-1, 408-2, 1000, 1002, 1300, 1300-1, 1300-3, 1300-5); and the corresponding size of the radiation channels (120, 1302, 1302-1, 1302-2, 1302-3) of the air waveguide comprises a maximum length of the radiation channels (120, 1302, 1302-1, 1302-2, 1302-3) of the air waveguide.

Example 31b: The antenna system (112) of one of examples 29b and 30b, wherein: the size of the radiation channels (120, 1302, 1302-1, 1302-2, 1302-3) of the waveguide portion (116-4, 306, 306-1, 306-2, 306-3, 306-4, 408-1, 408-2, 1000, 1002, 1300, 1300-1, 1300-3, 1300-5) comprises a maximum area or volume of the radiation channels (120, 1302, 1302-1, 1302-2, 1302-3) of the waveguide portion (116-4, 306, 306-1, 306-2, 306-3, 306-4, 408-1, 408-2, 1000, 1002, 1300, 1300-1, 1300-3, 1300-5); and the corresponding size of the radiation channels (120, 1302, 1302-1, 1302-2, 1302-3) of the air waveguide comprises a maximum area or volume of the radiation channels (120, 1302, 1302-1, 1302-2, 1302-3) of the air waveguide.

Example 32b: The antenna system (112) of one of examples 1b to 31b, wherein: a quantity of radiation elements (122) in a pattern of radiation elements (122) of each of the radiation channels (120, 1302, 1302-1, 1302-2, 1302-3) is greater than a quantity of radiation elements in a pattern of radiation elements of an air channel of an air waveguide, wherein the air waveguide has a same length as the radiation channels (120, 1302, 1302-1, 1302-2, 1302-3), wherein a spacing and/or a length of the radiation elements of the air waveguide is a first multiple of the wavelength of the electromagnetic energy within the air waveguide, wherein a spacing and/or a length of the radiation elements (122) of the radiation channels (120, 1302, 1302-1, 1302-2, 1302-3) is a second multiple of the wavelength of the electromagnetic energy within the radiation channels (120, 1302, 1302-1, 1302-2, 1302-3), wherein the first multiple equals the second multiple.

Example 33b: The antenna system (112) of one of examples 1b to 32b, wherein the first dielectric (130) is a structured dielectric that is configured to act as a lens for the electromagnetic energy (EM) escaping and/or entering the first dielectric (130).

Example 34b: The antenna system (112) of one of examples 1b to 33b, wherein the radiation channels (120, 1302, 1302-1, 1302-2, 1302-3) and/or the additional channels (118, 1304, 1304-1, 1304-2) comprise metal and/or plastics, such as metal-coated plastics.

Example 35: The antenna system (112) of one of examples 1b to 34b, wherein the radiation channels (120, 1302, 1302-1, 1302-2, 1302-3) and/or the additional channels (118, 1304, 1304-1, 1304-2) are configured as waveguides, such as tubular waveguides.

Example 36: The antenna system (112) of one of examples 1b to 35, wherein the one or more radiation channels (120, 1302, 1302-1, 1302-2, 1302 3) each comprise a pattern of radiation elements (122), the radiation elements (122) being sequentially coupled to the respective radiation channel (120, 1302, 1302-1, 1302-2, 1302-3) along a propagation direction of the electromagnetic (EM) energy within the radiation channels (120, 1302, 1302-1, 1302-2, 1302 3).

Example 37: The antenna system (112) of one of examples 1b to 36, wherein a quantity of the radiation channels (120, 1302, 1302-1, 1302-2, 1302 3) is greater than or equal to a quantity of the additional channels (118, 1304, 1304-1, 1304-2).

Example 38: The antenna system (112) of one of examples 1b to 37, wherein: each of the additional channels (118, 1304, 1304-1, 1304-2) comprises a cavity (810) that is rectangular shaped in at least its cross section, such as rectangular shaped in all three dimensions, and filled with the second dielectric; and/or each of the radiation channels (120, 1302, 1302-1, 1302-2, 1302-3) comprises a cavity (810) that is rectangular shaped in at least its cross section, such as rectangular shaped in all three dimensions, and filled with the first dielectric (130).

Example 39: The antenna system (112) of one of examples 1b to 38, wherein the one or more radiation channels (120, 1302, 1302-1, 1302-2, 1302-3) are formed by a first part (151) and a second part (152), wherein the first part (151) only partly surrounds the first dielectric (130), wherein the second part (152) is connected to the first part (151) along a contact region (155).

Example 40: The antenna system (112) of example 39, wherein the first part (151) comprises the at least one radiation element (122).

Example 41: The antenna system (112) of one of examples 39 and 40, wherein the contact region (155) runs parallel to the surface (123) of the radiation channel (120, 1302, 1302-1, 1302-2, 1302-3) having the at least one radiation element (122) and/or parallel to a propagation direction of the electromagnetic energy within the radiation channel (120, 1302, 1302-1, 1302-2, 1302-3).

Example 42: The antenna system (112) of one of examples 39 to 41, wherein the contact region (155) is located at a side surface (123) of the first dielectric (130) that connects a first surface of the dielectric (130) with a second surface of the dielectric (130), wherein the first and second surfaces of the dielectric (130) are located at opposite sides of the dielectric (130), wherein the first surface is located adjacent the surface (123) of the radiation channel (120, 1302, 1302-1, 1302-2, 1302-3) having the radiation element (122).

Example 43: The antenna system (112) of one of examples 39 to 42, wherein the second part (152) surrounds a remaining portion of the first dielectric (130) that is not surrounded by the first part (151).

Example 44: The antenna system (112) of one of examples 39 to 43, wherein both the first and second part (151, 152) each comprise a cavity part (161, 162) that receives a portion of the first dielectric (130).

Example 45: The antenna system (112) of one of examples 39 to 44, wherein the second part (152) comprises a further surface (124) of the radiation channel (120, 1302, 1302-1, 1302-2, 1302-3) that is orientated parallel to the surface (123) having the at least one radiation element (122).

Example 46: An apparatus comprising: the antenna system (112) of one of examples 1b to 45; and a device, such as a radar chip (110), that is configured to transmit or receive electromagnetic signals via the antenna system (112).

Example 47: The apparatus of example 46, wherein the device and/or the antenna system (112) are part of a radar system (104).

Example 48: The apparatus of example 47, wherein the radar system (104) is configured for installation as part of a vehicle (102), such as an automotive vehicle (102).

Example 49: A method (1400) comprising: performing, by a vehicle (102), such as by an automotive vehicle (102), a driving operation based on radar detections observed using the antenna system (112) of any combination of examples 1b to 45.

Example 50: A computer-readable storage medium comprising instructions that, when executed, cause at least one processor of a vehicle (102), such as an automotive vehicle (102), to perform a driving operation based on radar detections observed using the antenna system (112) of any combination of examples 1b to 45.

Example 51: A system comprising: means for performing a driving operation based on radar detections observed using the antenna system (112) of any combination of examples 1b to 45.

Example 52: A method for fabricating an antenna system (112) of any combination of examples 1b to 45, comprising: providing a first part (151) of the radiation channel (120, 1302, 1302-1, 1302-2, 1302-3) and a second part (152) of the radiation channel (120, 1302, 1302-1, 1302-2, 1302-3); placing the first dielectric (130) in between the first part (151) and the second part (152); joining the first part (151) and the second part (152) to form the radiation channel (120, 1302, 1302-1, 1302-2, 1302-3), wherein the radiation channel (120, 1302, 1302-1, 1302-2, 1302-3) has a cavity (161, 162) that is filled with the first dielectric (130).

Example 53: The method of example 52, wherein the first part (151) is provided having a first cavity part (161) adapted to receive the first dielectric (130) and/or the second part (152) is provided having a second cavity part (162) adapted to receive the first dielectric (130).

Example 54: The method of one of examples 52 to 53, wherein providing of the first part (151) and/or providing the second part (152) comprises: forming the first part (151) and/or the second part (152) by molding, such as by injection molding.

Example 55: The method of one of examples 52 to 54, wherein the first part (151) and/or the second part (152) are provided with a conducting surface, for example with a metal coating.

Example 56: The method of one of examples 52 to 55, further comprising: providing the first dielectric (130) as a solid element, such as a bar.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. Although described as a way to improve radar performance, the techniques of the foregoing description can be applied to other problems to effectively improve antenna patterns for detecting objects with sensors, for example, in an automotive environment.

In addition to those described above, some further advantages of dielectric loading radiation channels include: more degrees of freedom for an adjoining wall between two radiation channels, a low cost due to a smaller potential antenna board, more directivity and improved side lobe levels are possible due to a higher quantity of radiation elements with an effective amplitude taper. Further advantages include increased isolation between radiation channels due to increased distance due to increased adjoining wall thickness. Further, asymmetric antenna patterns are possible. Even though there may be a slight decrease in antenna efficiency due to dielectric loss, and in some examples, these minor drawbacks are overshadowed by the many advantages described above with integrating a dielectric loaded waveguide for low loss signal distributions and small form factor antennas in an automotive radar system.

According to the present disclosure, a channel, such as a radiation channel, a routing channel or an absorption channel being loaded with a dielectric means that the respective channel is filled with the dielectric. The dielectric is thus placed within an interior or a cavity of the respective channel.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An antenna system comprising:
    a feed portion configured to connect the antenna system to a radar device;
    a waveguide portion comprising one or more radiation channels, each of the radiation channels:
        being configured to be coupled to a radar channel of the radar device via the feed portion,
        being filled with a first dielectric, and
        comprising a surface with at least one radiation element, the surface being configured to allow electromagnetic (EM) energy to escape or enter the first dielectric;
    one or more additional channels filled with a second dielectric that differs from the first dielectric, the additional channels being electromagnetically coupled to the radiation channels to allow for a transfer of at least a part of the EM energy between the radiation channels and the additional channels; and
    one or more absorption channels, each of the absorption channels:
        filled with an absorber material,
        being electromagnetically coupled to one or more of the radiation channels to allow for a transfer of at least a part of the EM energy between the radiation channels and the respective absorption channel, and
        having at least one surface with at least one absorption element that allows one or more portions of the EM energy that enter or exit the first dielectric to be absorbed by the absorber material.

2. The antenna system of claim 1, wherein each of the absorption channels is adjacent to one of the radiation channels.

3. The antenna system of claim 1, wherein the absorber material extends to an absorption layer.

4. The antenna system of claim 3, wherein the absorption layer extends under the radiation channels.

5. The antenna system of claim 1, wherein the first dielectric is a non-air dielectric.

6. The antenna system of claim 1, further comprising a routing portion comprising one or more routing channels, each of the routing channels:
    filled with an air dielectric,
    electromagnetically coupled to one or more of the radiation channels to allow for a transfer of at least a part of the EM energy between the radiation channels and the respective routing channel, and
    connected to a channel of the radar device via the feed portion.

7. The antenna system of claim 1, wherein:
    each of the radiation channels comprises a plurality of radiation elements;
    each of the absorption channels comprises a plurality of absorption elements; and
    the radiation elements and the absorption elements share a common pattern.

* * * * *